(12) United States Patent
Kurisawa et al.

(10) Patent No.: US 8,460,576 B2
(45) Date of Patent: *Jun. 11, 2013

(54) LIQUID CRYSTAL COMPOSITION CONTAINING POLYMERIZABLE COMPOUND AND LIQUID CRYSTAL DISPLAY ELEMENT USING THE SAME

(75) Inventors: Kazuki Kurisawa, Saitama (JP); Takeshi Kuriyama, Saitama (JP); Shotaro Kawakami, Saitama (JP)

(73) Assignee: DIC Corporation, Tokyo (JP)

( * ) Notice: Subject to any disclaimer, the term of this patent is extended or adjusted under 35 U.S.C. 154(b) by 119 days.

This patent is subject to a terminal disclaimer.

(21) Appl. No.: 13/087,717

(22) Filed: Apr. 15, 2011

(65) Prior Publication Data

US 2011/0253936 A1    Oct. 20, 2011

(30) Foreign Application Priority Data

Apr. 16, 2010  (JP) ................................ 2010-094921

(51) Int. Cl.
- *C09K 19/00* (2006.01)
- *C09K 19/06* (2006.01)
- *C09K 19/34* (2006.01)
- *C09K 19/52* (2006.01)

(52) U.S. Cl.
USPC .............. 252/299.6; 252/299.01; 252/299.61; 252/299.62; 252/299.4; 428/1.1; 428/1.3

(58) Field of Classification Search
USPC ................. 252/299.01, 299.4, 299.6, 299.61, 252/299.62; 428/1.1, 1.3
See application file for complete search history.

(56) References Cited

U.S. PATENT DOCUMENTS

2011/0253933 A1 * 10/2011 Hirata et al. ............... 252/299.4

FOREIGN PATENT DOCUMENTS

| JP | 2003-307720 A | 10/2003 |
|---|---|---|
| JP | 2004-302096 A | 10/2004 |
| JP | 2008-116931 A | 5/2008 |

* cited by examiner

*Primary Examiner* — Geraldina Visconti
(74) *Attorney, Agent, or Firm* — McDermott Will & Emery LLP

(57) ABSTRACT

Provided are a liquid crystal composition containing, as a first component, a polymerizable compound represented by general formula (I):

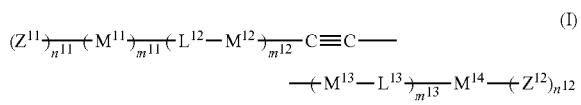

and a liquid crystal display element using the liquid crystal composition.

9 Claims, No Drawings

LIQUID CRYSTAL COMPOSITION CONTAINING POLYMERIZABLE COMPOUND AND LIQUID CRYSTAL DISPLAY ELEMENT USING THE SAME

CROSS REFERENCE TO RELATED APPLICATIONS

The present application claims priority under 35 U.S.C. §119 to Japanese Patent Application No. 2010-094921, filed Apr. 16, 2010, which is incorporated herein by reference.

FIELD OF THE INVENTION

The present invention relates to a liquid crystal composition containing a polymerizable compound and a liquid crystal display element using the liquid crystal composition.

BACKGROUND OF THE INVENTION

Polymer sustained alignment (PSA) liquid crystal display elements have a structure in which a polymer structure is formed in a cell in order to control the pretilt angle of liquid crystal molecules, and are expected to become next-generation liquid crystal display elements because of their high-speed responsiveness and high contrast.

Such a PSA liquid crystal display element is produced by injecting a polymerizable composition containing a liquid crystal compound and a polymerizable compound between substrates, and polymerizing the polymerizable compound while aligning liquid crystal molecules by applying a voltage, thus fixing the alignment of the liquid crystal molecules. In this case, image sticking of a display in the fabricated display element is caused by the residual polymerizable compound that is not completely polymerized. Therefore, it is necessary to minimize the amount of such a polymerizable compound remaining after the polymerization. However, when a large amount of polymerization initiator is added in order to completely carry out the polymerization, a voltage-holding ratio of the display element is decreased by the residual polymerization initiator, resulting in an adverse effect on the display quality. On the other hand, when the amount of polymerization initiator used in the polymerization is reduced in order to suppress the decrease in the voltage-holding ratio, the polymerizable compound remains because the polymerization does not completely proceed, and thus image sticking due to the residual polymerizable compound inevitably occurs. In order to suppress the amount of residual polymerizable compound by completely curing (i.e., hardening) a polymerizable compound with a small amount of polymerization initiator added, it is necessary to apply a large amount of energy, specifically, for example, it is necessary to apply strong ultraviolet light for a long time during the polymerization. However, this method causes an increase in the size of a production apparatus and a decrease in the production efficiency. Thus, in existing liquid crystal compositions containing a polymerizable compound, it is difficult to reduce both the amount of residual uncured polymerizable compound and the amount of residual polymerization initiator at the same time. Accordingly, it has been desired to develop a liquid crystal composition containing a polymerizable compound that is completely polymerized without using a polymerization initiator.

Meanwhile, it is known that image sticking may be caused due to the pretilt angle of liquid crystal molecules in a liquid crystal composition containing a polymerizable compound. Specifically, in the case where a polymer obtained by curing a polymerizable compound is flexible, when a display element is fabricated and a certain pattern is continued to be displayed for a long time, the structure of the polymer changes, resulting in the change in the pretilt angle. Since such a change in the pretilt angle may become a cause of image sticking, it is necessary to use a polymerizable compound capable of forming a polymer which has a rigid structure and whose structure does not change.

Hitherto, in order to prevent image sticking by improving the rigidity of a polymer, a display element has been constituted by using a polymerizable compound having a structure such as a 1,4-phenylene group having only a ring structure and polymerizable functional groups (refer to Japanese Unexamined Patent Application Publication No. 2003-307720) and a display element has been constituted by using a polymerizable compound having a biaryl structure (refer to Japanese Unexamined Patent Application Publication No. 2008-116931). However, these polymerizable compounds have low compatibility with liquid crystal compounds, and thus deposition of the polymerizable compounds occurs when a liquid crystal composition is prepared. Thus, it is difficult to apply these polymerizable compounds to a liquid crystal composition suitable for practical use.

In addition, in order to prevent image sticking by improving the rigidity of a polymer, it has been proposed that a display element is constituted by using a mixed liquid crystal composition containing a bifunctional polymerizable compound and a trifunctional or higher functional polymerizable compound such as dipentaerythritol pentaacrylate or dipentaerythritol hexaacrylate (refer to Japanese Unexamined Patent Application Publication No. 2004-302096). However, since dipentaerythritol pentaacrylate and dipentaerythritol hexaacrylate have no ring structure in their molecules, the affinity of these polymerizable compounds with liquid crystal compounds is weak and a force that controls the alignment is also weak. Accordingly, sufficient alignment stability is not achieved. Furthermore, it is essential to add a polymerization initiator in polymerization of these polymerizable compounds. Unless a polymerization initiator is added, these polymerizable compounds remain after the polymerization.

As described above, it is difficult to satisfy characteristics desired in polymerizable-compound-containing liquid crystal compositions, such as image sticking characteristics of a display element, alignment stability, stability of the composition having such a property that no deposition is produced, and the production efficiency in the fabrication of a PSA liquid crystal display element, and this difficulty inhibits practical application of this display element.

SUMMARY OF THE INVENTION

Accordingly, it is an object of the present invention to provide a polymerizable-compound-containing liquid crystal composition in which a polymerizable compound is satisfactorily compatible with liquid crystal materials, the alignment after polymerization is further stabilized, and a problem in display characteristics such as image sticking does not occur. Furthermore, it is another object of the present invention to provide a liquid crystal display element to which a liquid crystal alignment capability is provided by polymerization of a polymerizable-compound-containing liquid crystal composition, the liquid crystal display element having a good display performance.

As a result of intensive studies on various polymerizable compounds and various non-polymerizable liquid crystal materials, the inventors of the present invention found that a polymerizable-compound-containing liquid crystal composition containing a polymerizable compound and non-polymerizable liquid crystal materials, all of which have specific structures can achieve the above objects, and this finding led to the realization of the present invention.

The present invention provides a polymerizable-compound-containing liquid crystal composition described below and a liquid crystal display element using the liquid crystal composition.

Specifically, the polymerizable-compound-containing liquid crystal composition contains, as a first component, at least one polymerizable compound represented by general formula (I):

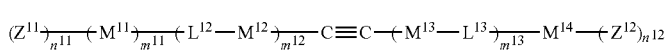
(I)

(wherein $Z^{11}$ and $Z^{12}$ each independently represent a hydrogen atom, a fluorine atom, a chlorine atom, a cyano group, a thiocyanate group, a trifluoromethoxy group, or an alkyl group having 1 to 12 carbon atoms where a methylene group in the alkyl group may be substituted with an oxygen atom, a sulfur atom, —CO—, —COO—, —OCO—, —OCOO—, —CH=CH—, or —C≡C— as long as oxygen atoms are not directly bonded to each other, $Z^{11}$ represents -$L^{15}$—$S^{15}$—$R^{15}$, or $Z^{12}$ represents -$L^{16}$-$S^{16}$—$R^{16}$, however, at least one of $Z^{11}$ and $Z^{12}$ represents -$L^{15}$-$S^{15}$—$R^{15}$ or -$L^{16}$-$S^{16}$—$R^6$ (where $R^{15}$ and $R^{16}$ each independently represent any one of formulae (R-1) to (R-15):

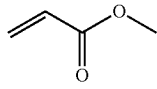
(R-1)

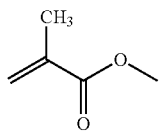
(R-2)

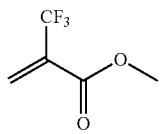
(R-3)

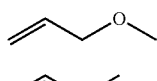
(R-4)

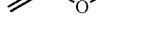
(R-5)

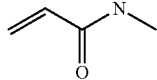
(R-6)

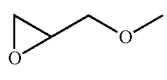
(R-7)

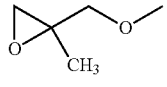
(R-8)

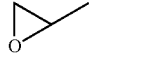
(R-9)

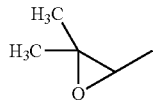
(R-10)

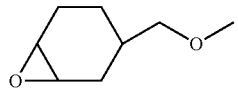
(R-11)

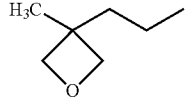
(R-12)

(R-13)

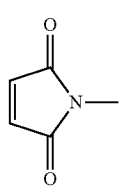
(R-14)

HS—
(R-15)

$S^{15}$ and $S^{16}$ each independently represent an alkylene group having 1 to 12 carbon atoms or a single bond, where a methylene group in the alkylene group may be substituted with an oxygen atom, a sulfur atom, —CO—, —COO—, —OCO—, —OCOO—, —CH=CH—, or —C≡C— as long as oxygen atoms are not directly bonded to each other), $L^{12}$, $L^{13}$, $L^{15}$, and $L^{16}$ each independently represent a single bond, —O—, —S—, —CH$_2$—, —OCH$_2$—, —CH$_2$O—, —CO—, —C$_2$H$_4$—, —COO—, —OCO—, —OCOOCH$_2$—, —CH$_2$OCOO—, —CO—NR$^{111}$—, —NR$^{111}$—CO—, —SCH$_2$—, —CH$_2$S—, —CH=CR$^{111}$—COO—, —CH=CR$^{111}$—OCO—, —COO—CR$^{111}$=CH—, —OCO—CR$^{111}$=CH—, —COO—CR$^{111}$=CH—COO—, —COO—CR$^{111}$=CH—OCO—, —OCO—CR$^{111}$=CH—COO—, —OCO—CR$^{111}$=CH—OCO—, —COOC$_2$H$_4$—, —OCOC$_2$H$_4$—, —C$_2$H$_4$OCO—, —C$_2$H$_4$COO—, —CH$_2$COO—, —CH$_2$OCO—, —COOCH$_2$—, —OCOCH$_2$—, —CH=CH—, —CF=CF—, —CF=CH—, —CH=CF—, —CF$_2$—, —CF$_2$O—, —OCF$_2$—, —CF$_2$CH$_2$—, —CH$_2$CF$_2$—, —CF$_2$CF$_2$—, or —C≡C— (where $R^{111}$s each independently represent a hydrogen atom or an alkyl group having 1 to 4 carbon atoms), $M^{12}$ and $M^{13}$ each independently represent a 1,4-phenylene group, a 1,4-cyclohexylene group, a pyridine-2,5-diyl group, a pyrimidine-2,5-diyl group, a naphthalene-2,6-diyl group, a 1,2,3,4-tetrahydronaphthalene-2,6-diyl group, or a 1,3-dioxane-2,5-diyl group, $M^{11}$ and $M^{14}$ each independently represent a 1,4-phenylene group, a benzene-1,3,5-triyl group, a benzene-1,3,4-triyl group, a benzene-1,3,4,5-tetrayl group, a 1,4-cyclohexylene group, a cyclohexane-1,3,5-triyl group, a cyclohexane-1,3,4-triyl group, a cyclohexane-1,3,4,5-tetrayl group, a pyridine-2,5-diyl group, a pyrimidine-2,5-diyl group, a naphthalene-2,6-diyl group, a naphthalene-2,5,6-triyl group, a naphthalene-2,5,6,7-tetrayl group, a 1,2,3,4-tetrahydronaphthalene-2,6-diyl group, a 1,2,3,4-tetrahydronaphthalene-2,5,6-triyl group, a 1,2,3,4-tetrahydronaphthalene-2,5,6,7-tetrayl group, or a 1,3-dioxane-2, 5-diyl group, $M^{11}$, $M^{12}$, $M^{13}$, and $M^{14}$ may each be independently unsubstituted or substituted with an alkyl group having 1 to 12 carbon atoms, a halogenated alkyl group having 1 to 12 carbon atoms, an alkoxy group having 1 to 12 carbon atoms, a halogenated alkoxy group having 1 to 12 carbon atoms, a halogen, a cyano group, or a nitro group, $m^{11}$ and $m^{12}$ each independently represent 0 or 1, $m^{13}$ represents 0, 1, 2, or 3, $n^{11}$ and $n^{12}$ each independently represent 1, 2, or 3, when a plurality of $Z^{11}$s, $Z^{12}$s, $M^{13}$s and/or $L^{13}$s are present, they may be the same or different, $m^{11}+m^{12}+m^{13}$ represents 1, 2, or 3, and $m^{11} \geqq m^{12}$);

as a second component, at least one compound represented by general formula (II):

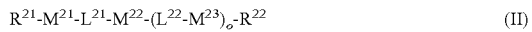

(wherein $R^{21}$ and $R^{22}$ each independently represent an alkyl group having 1 to 10 carbon atoms or an alkenyl group having 2 to 10 carbon atoms, one methylene group or two or more non-adjacent methylene groups in the alkyl group or the alkenyl group may each be substituted with —O— or —S—, and one or more hydrogen atoms in the alkyl group or the alkenyl group may each be substituted with a fluorine atom or a chlorine atom, $M^{21}$, $M^{22}$, and $M^{23}$ each independently represent a group selected from the groups consisting of
(a) a trans-1,4-cyclohexylene group (where one methylene group or two or more non-adjacent methylene groups in the trans-1,4-cyclohexylene group may each be substituted with —O— or —S—),
(b) a 1,4-phenylene group (where one —CH= or two or more non-adjacent —CH= in the 1,4-phenylene group may each be substituted with a nitrogen atom), a 3-fluoro-1,4-phenylene group, and a 3,5-difluoro-1,4-phenylene group, and
(c) a 1,4-cyclohexenylene group, a 1,4-bicyclo[2.2.2]octylene group, apiperidine-2,5-diyl group, anaphthalene-2,6-diyl group, a decahydronaphthalene-2,6-diyl group, and a 1,2,3,4-tetrahydronaphthalene-2,6-diyl group, o represents 0, 1, or 2,
$L^{21}$ and $L^{22}$ each independently represent a single bond, —CH$_2$CH$_2$—, —(CH$_2$)$_4$—, —OCH$_2$—, —CH$_2$O—, —OCF$_2$—, —CF$_2$O—, —CH=CH—, —CH=N— N=CH—, or —C≡C—, when a plurality of $L^{22}$s and/or $M^{23}$s are present, they may be the same or different); and as a third component, at least one compound selected from the group consisting of compounds represented by general formulae (IIIa), (IIIb), and (IIIc):

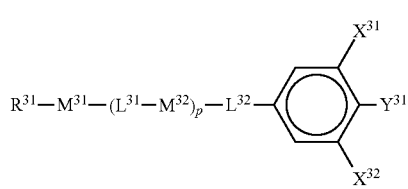

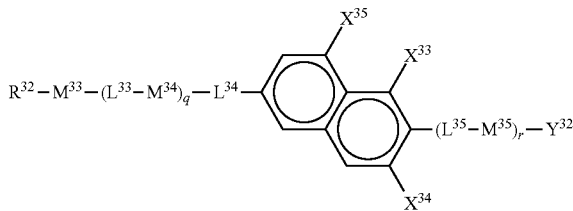

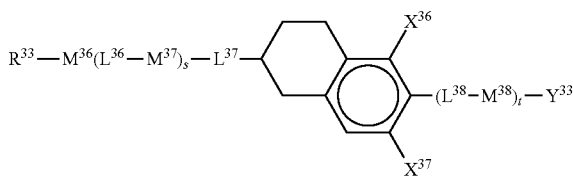

(wherein $R^{31}$, $R^{32}$, and $R^{33}$ each independently represent an alkyl group having 1 to 10 carbon atoms or an alkenyl group having 2 to 10 carbon atoms , one methylene group or two or more non-adjacent methylene groups in the alkyl group or the alkenyl group may each be substituted with —O— or —S—, and one or more hydrogen atoms in the alkyl group or the alkenyl group may each be substituted with a fluorine atom or a chlorine atom, $M^{31}$, $M^{32}$, $M^{33}$, $M^{34}$, $M^{35}$, $M^{36}$, $M^{37}$, and $M^{38}$ each independently represent a group selected from the groups consisting of
(d) a trans-1,4-cyclohexylene group (where one methylene group or two or more non-adjacent methylene groups in the trans-1,4-cyclohexylene group may each be substituted with —O— or —S—),
(e) a 1,4-phenylene group (where one —CH= or two or more non-adjacent —CH= in the 1,4-phenylene group may each be substituted with a nitrogen atom), a 3-fluoro-1,4-phenylene group, and a 3,5-difluoro-1,4-phenylene group, and
(f) a 1,4-cyclohexenylene group, a 1,4-bicyclo[2.2.2]octylene group, a piperidine-2,5-diyl group, a naphthalene-2, 6-diyl group, a 1,2,3,4-tetrahydronaphthalene-2,6-diyl group, and a decahydronaphthalene-2,6-diyl group, a hydrogen atom contained in any of the groups (d), (e), and (f) may be substituted with a cyano group, a fluorine atom, a trifluoromethyl group, a trifluoromethoxy group, or a chlorine atom, $L^{31}$, $L^{32}$, $L^{33}$, $L^{34}$, $L^{35}$, $L^{36}$, $L^{37}$, and $L^{38}$ each independently represent a single bond, —COO—, —OCO—, —CH$_2$CH$_2$—, —(CH$_2$)$_4$—, —OCH$_2$—, —CH$_2$O—, —OCF$_2$—, —CF$_2$O—, or —C≡C— when a plurality of $M^{32}$s, $M^{34}$s, $M^{35}$s, $M^{37}$s, $M^{38}$s, $L^{31}$s, $L^{33}$s, $L^{35}$s, $L^{36}$s, and/or $L^{38}$s are present, they may be the same or different, $X^{31}$, $X^{32}$, $X^{33}$, $X^{34}$, $X^{35}$, $X^{36}$, and $X^{37}$ each independently represent a hydrogen atom or a fluorine atom, $Y^{31}$, $Y^{32}$, and $Y^{33}$ each independently represent a hydrogen atom, a fluorine atom, a chlorine atom, a cyano group, a thiocyanate group, a trifluoromethoxy group, a trifluoromethyl group, a 2,2,2-trifluoroethyl group, or a difluoromethoxy group, at least one of $X^{31}$, $X^{32}$, and $Y^{31}$ represents a fluorine atom, a chlorine atom, a cyano group, a thiocyanate group, a trifluoromethoxy group, a trifluoromethyl group, a 2,2,2-trifluoroethyl group, or a difluoromethoxy group, or at least one hydrogen atom contained in $M^{31}$ or $M^{32}$ represents a cyano group, a fluorine atom, a trifluoromethyl group, a trifluoromethoxy group, or a chlorine atom, at least one of $X^{33}$, $X^{34}$, $X^{35}$, and $Y^{32}$ represents a fluorine atom, a chlorine atom, a cyano group, a thiocyanate group, a trifluoromethoxy group, a trifluoromethyl group, a 2,2,2-trifluoroethyl group, or a difluoromethoxy group, or at least one hydrogen atom contained in $M^{33}$, $M^{34}$, or $M^{35}$ represents a cyano group, a fluorine atom, a trifluoromethyl group, a trifluoromethoxy group, or a chlorine atom, at least one of $X^{36}$, $X^{37}$, and $Y^{33}$ represents a fluorine atom, a chlorine atom, a cyano group, a thiocyanate group, a trifluoromethoxy group, a trifluoromethyl group, a 2,2,2-trifluoroethyl group, or a difluoromethoxy group, or at least one hydrogen atom contained in $M^{36}$, $M^{37}$, or $M^{38}$ represents a cyano group, a fluorine atom, a trifluoromethyl group, a trifluoromethoxy group, or a chlorine atom, and p, q, r, s, and t each independently represent 0, 1, or 2, but q+r and s+t are each 2 or less), or at least one compound selected from the group consisting of compounds represented by general formulae (IVa), (IVb), and (IVc):

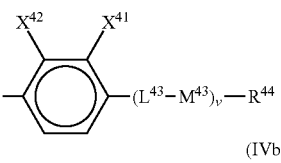
(IVa)

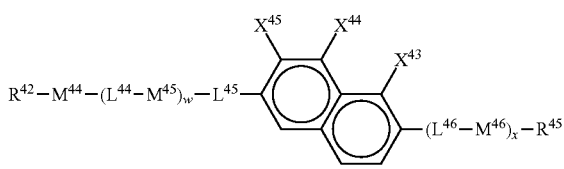
(IVb)

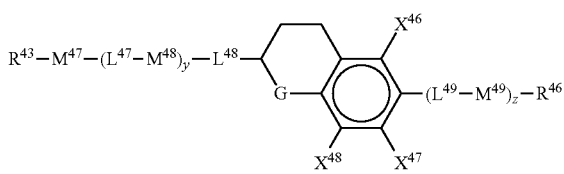
(IVc)

(wherein $R^{41}$, $R^{42}$, $R^{43}$, $R^{44}$, $R^{45}$, and $R^{46}$ each independently represent an alkyl group having 1 to 10 carbon atoms or an alkenyl group having 2 to 10 carbon atoms, one methylene group or two or more non-adjacent methylene groups in the alkyl group or the alkenyl group may each be substituted with —O— or —S—, and one or more hydrogen atoms in the alkyl group or the alkenyl group may each be substituted with a fluorine atom or a chlorine atom, $M^{41}$, $M^{42}$, $M^{44}$, $M^{44}$, $M^{45}$, $M^{46}$, $M^{47}$, $M^{48}$, and $M^{49}$ each independently represent a group selected from the groups consisting of (g) a trans-1,4-cyclohexylene group (where one methylene group or two or more non-adjacent methylene groups in the trans-1,4-cyclohexylene group may each be substituted with —O— or —S—), (h) a 1,4-phenylene group (where one —CH= or two or more non-adjacent —CH= in the 1,4-phenylene group may each be substituted with a nitrogen atom), and (i) a 1,4-cyclohexenylene group, a 1,4-bicyclo[2.2.2]octylene group, a piperidine-2,5-diyl group, a naphthalene-2,6-diyl group, a 1,2,3,4-tetrahydronaphthalene-2,6-diyl group, and a decahydronaphthalene-2,6-diyl group, a hydrogen atom contained in any of the groups (g), (h), and (i) may be substituted with a cyano group, a fluorine atom, a trifluoromethyl group, a trifluoromethoxy group, or a chlorine atom, $L^{41}$, $L^{42}$, $L^{43}$, $L^{44}$, $L^{45}$, $L^{46}$, $L^{47}$, $L^{48}$, and $L^{49}$ each independently represent a single bond, —COO—, —OCO—, —CH$_2$CH$_2$—, —(CH$_2$)$_4$—, —OCH$_2$—, —CH$_2$O—, —OCF$_2$—, —CF$_2$O—, or —C≡C— when a plurality of $M^{42}$s, $M^{43}$s, $M^{45}$s, $M^{46}$s, $M^{48}$s, $M^{49}$s, $L^{41}$s $L^{43}$s, $L^{44}$s, $L^{46}$s, $L^{47}$s and/or $L^{49}$s are present, they may be the same or different, $X^{41}$, $X^{42}$, $X^{43}$, $X^{44}$, $X^{45}$, $X^{46}$, $X^{47}$ and $X^{48}$ each independently represent a hydrogen atom, a trifluoromethyl group, a trifluoromethoxy group, or a fluorine atom, however, at least one of $X^{41}$ and X42 represents a fluorine atom, at least one of $X^{43}$, $X^{44}$, and $X^{45}$ represents a fluorine atom, at least one of $X^{46}$, $X^{47}$, and $X^{48}$ represents a fluorine atom, $X^{46}$ and $X^{47}$ do not represent fluorine atoms at the same time, and $X^{46}$ and $X^{48}$ do not represent fluorine atoms at the same time, G represents a methylene group or —O—, and u, v, w, x, y, and z each independently represent 0, 1, or 2, but u+v, w+x, and y+z are each 2 or less).

Since the polymerizable compound which is an essential component of the present invention has a good compatibility with other non-polymerizable liquid crystal materials, a stable liquid crystal composition can be obtained. In addition, the polymerizable compound has a skeleton similar to that of a liquid crystal compound, and thus has a strong force that controls the alignment of the liquid crystal compound. Furthermore, according to the liquid crystal composition containing the polymerizable compound, the polymerizable compound can be polymerized without using a photoinitiator or by adding a very small amount of a photoinitiator, and an unpolymerized polymerizable compound does not remain after polymerization or the amount of such an unpolymerized polymerizable compound is very small. In addition, energy necessary for the polymerization of the polymerizable compound can be significantly reduced. Consequently, it is possible to markedly reduce display damage of a liquid crystal display element to which a liquid crystal alignment capability is provided by polymerizing a polymerizable compound in a liquid crystal material. It is also possible to reduce the energy cost for the production and to improve the production efficiency. Thus, the liquid crystal composition containing the polymerizable compound is useful as a liquid crystal material for the liquid crystal display element.

DETAILED DESCRIPTION OF THE PRESENT INVENTION

A polymerizable compound used as a first component in a polymerizable-compound-containing liquid crystal composition according to the present invention is a compound represented by general formula (I).

In general formula (I), $Z^{11}$ is preferably a hydrogen atom, a fluorine atom, a chlorine atom, a cyano group, a thiocyanate group, a trifluoromethoxy group, an alkyl group having 1 to 12 carbon atoms where a methylene group in the alkyl group may be substituted with an oxygen atom, a sulfur atom, —CO—, —COO—, —OCO—, —OCOO—, —CH═CH—, or —C≡C— as long as oxygen atoms are not directly bonded to each other, or -$L^{15}$-$S^{15}$—$R^{15}$. More preferably, $Z^{11}$ is a hydrogen atom, a fluorine atom, an alkyl group having 1 to 12 carbon atoms where a methylene group in the alkyl group may be substituted with an oxygen atom, a sulfur atom, —CO—, —COO—, —OCO—, —OCOO—, —CH═CH—, or as long as oxygen atoms are not directly bonded to each other, or -$L^{15}$-$S^{15}$—$R^{15}$. Still more preferably, $Z^{11}$ is a hydrogen atom, an alkyl group having 1 to 12 carbon atoms where a methylene group in the alkyl group may be substituted with an oxygen atom as long as oxygen atoms are not directly bonded to each other, or -$L^{15}$-$S^{15}$—$R^{15}$. When $Z^{11}$ is $L^{15}$-$S^{15}$—$R^{15}$, $S^{15}$ represents a spacer group or a single bond. The spacer group is preferably a single bond or an alkylene group having 2 to 12 carbon atoms. More preferably, the spacer group is a single bond or an alkylene group having 2 to 12 carbon atoms where a methylene group in the alkylene group may be substituted with an oxygen atom, —COO—, —OCO—, or —OCOO— as long as oxygen atoms are not directly bonded to each other.

$Z^{12}$ is preferably a hydrogen atom, a fluorine atom, a chlorine atom, a cyano group, a thiocyanate group, a trifluoromethoxy group, an alkyl group having 1 to 12 carbon atoms where a methylene group in the alkyl group may be substituted with an oxygen atom, a sulfur atom, —CO—, —COO—, —OCO—, —OCOO—, —CH═CH—, or —C≡C— as long as oxygen atoms are not directly bonded to each other, or -$L^{16}$-$S^{16}$—$R^{16}$. More preferably, $Z^{12}$ is a hydrogen atom, a fluorine atom, an alkyl group having 1 to 12 carbon atoms where a methylene group in the alkyl group may be substituted with an oxygen atom, a sulfur atom, —CO—, —COO—, —OCO—, —OCOO—, —CH═CH—, or —C≡C— as long as oxygen atoms are not directly bonded to each other, or -$L^{16}$-$S^{16}$—$R^{16}$. Still more preferably, $Z^{12}$ is a hydrogen atom, an alkyl group having 1 to 12 carbon atoms where a methylene group in the alkyl group may be substituted with an oxygen atom as long as oxygen atoms are not directly bonded to each other, or -$L^{16}$-$S^{16}$—$R^{16}$. When $Z^{12}$ is $L^{16}$-$S^{16}$—$R^{16}$, $S^{16}$ represents a spacer group or a single bond. The spacer group is preferably a single bond or an alkylene group having 2 to 12 carbon atoms. More preferably, the spacer group is a single bond or an alkylene group having 2 to 12 carbon atoms where a methylene group in the alkylene group may be substituted with an oxygen atom, —COO—, —OCO—, or —OCOO— as long as oxygen atoms are not directly bonded to each other.

$R^{15}$ and $R^{16}$ each represent a polymerizable group. Specific examples of the polymerizable group include structures shown below.

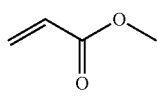
(R-1)

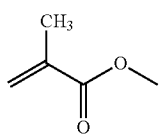
(R-2)

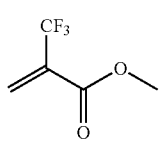
(R-3)

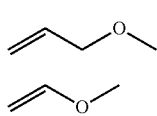
(R-4)

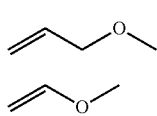
(R-5)

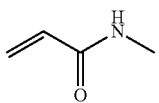
(R-6)

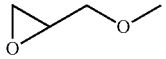
(R-7)

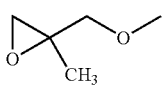
(R-8)

(R-9)

(R-10)

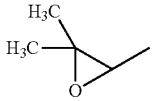
(R-11)

(R-12)

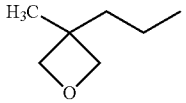
(R-13)

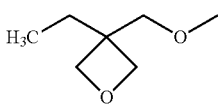
(R-14)

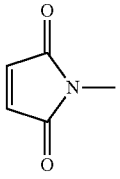
(R-15)

These polymerizable groups are cured by radical polymerization, radical addition polymerization, cationic polymerization, and anionic polymerization. In particular, when ultraviolet polymerization is conducted as a polymerization method, the polymerizable group represented by formula (R-1), formula (R-2), formula (R-4), formula (R-5), formula (R-7), formula (R-11), formula (R-13), or formula (R-15) is preferable, the polymerizable group represented by formula (R-1), formula (R-2), formula (R-7), formula (R-11), or formula (R-13) is more preferable, and the polymerizable group represented by formula (R-1) or formula (R-2) is still more preferable. When a plurality of $R^{15}$s and $R^{16}$s are present in the molecule, they may be the same or different.

$L^{12}$, $L^{13}$, $L^{15}$, and $L^{16}$ are each independently preferably a single bond, —O—, —S—, —$CH_2$—, —$OCH_2$—, —$CH_2O$—, —CO—, —$C_2H_4$—, —COO—, —OCO—, —$OCOOCH_2$—, —$CH_2OCOO$—, —CO—$NR^{111}$—, —$NR^{111}$—CO—, —$SCH_2$—, —$CH_2S$—, —CH═$CCH_3$—COO—, —CH═CH—COO—, —COO—CH═CH—, —OCO—CH═CH—, —OCO—CH═CH—COO—, —COO—CH═CH—OCO—, —$COOC_2H_4$—, —$OCOC_2H_4$—, —$C_2H_4OCO$—, —$C_2H_4COO$—, —$OCOCH_2$—, —$CH_2COO$—, —CH═CH—, —CF=CH—, —CH=CF—, —CF$_2$—, —CF$_2$O—, —OCF$_2$—, —CF$_2$CH$_2$—, —CH$_2$CF$_2$—, —CF$_2$CF$_2$—, or —C≡C— (where R$^{111}$s each independently represent an alkyl group having 1 to 4 carbon atoms); more preferably, a single bond, —O—, —OCH$_2$—, —CH$_2$O—, —CO—, —C$_2$H$_4$—, —COO—, —OCO—, —OCOOCH$_2$—, —CH$_2$OCOO—, —CH=CCH$_3$—COO—, —CH=CH—COO—, —COO—CH=CH—, —OCO—CH=CH—COO—, —COOC$_2$H$_4$—, —OCOC$_2$H$_4$—, —C$_2$H$_4$OCO—, —C$_2$H$_4$COO—, —OCOCH$_2$—, —CH$_2$COO—, or —CH=CH—; and still more preferably a single bond, —O—, —OCH$_2$—, —CH$_2$O—, —OCO—CCH$_3$=CH—, —CH=CCH$_3$—COO—, —CH=CH—COO—, —COO—CH=CH—, —COOC$_2$H$_4$—, —OCOC$_2$H$_4$—, —C$_2$H$_4$OCO—, —C$_2$H$_4$COO—, —OCOCH$_2$—, —CH$_2$COO—, or —CH=CH—. In order to more rapidly carry out polymerization by ultraviolet light, a connecting group having a π-electron is preferable. In order to improve the compatibility with other liquid crystal materials, a single bond or a connecting group having an ether bond or an ester bond is preferable.

In order to improve the force that controls the alignment of the liquid crystal molecules, $m^{11}+m^{12}+m^{13}$ is preferably 1, 2, or 3. In order to improve the compatibility with other liquid crystal materials, $m^{11}+m^{12}+m^{13}$ is preferably 1 or 2.

$n^{11}$ and $n^{12}$ are each independently preferably 1 or 2. The numbers of $Z^{11}$s and $Z^{12}$s change depending on the values of $n^{11}$ and $n^{12}$, respectively. In particular, the number of polymerizable functional groups represented by -L$^{15}$-S$^{15}$—R$^{15}$ and -L$^{16}$S$^{16}$—R$^{16}$ contained in the molecule is important from the standpoint of determining the strength of a cured product after polymerization.

With the increase in the number of polymerizable functional groups, the strength of the cured product after polymerization increases. Accordingly, in order to improve the strength, the number of polymerizable functional groups is preferably 2 to 6. In order to improve the compatibility with liquid crystal materials, the number of polymerizable functional groups is preferably 1 to 4. From the standpoint of the balance of these, the number of polymerizable functional groups is preferably 1 to 4, and more preferably 1 to 3.

$M^{11}$ and $M^{14}$ are each independently preferably a 1,4-phenylene group, a benzene-1,3,5-triyl group, a benzene-1,3,4-triyl group, a benzene-1,3,4,5-tetrayl group, a 1,4-cyclohexylene group, a cyclohexane-1,3,5-triyl group, a cyclohexane-1,3,4-triyl group, a cyclohexane-1,3,4,5-tetrayl group, a naphthalene-2,6-diyl group, a naphthalene-2,5,6-triyl group, or a naphthalene-2,5,6,7-tetrayl group. Although the number of positions into which a substituent is introduced changes depending on the numbers of $Z^{11}$s and $Z^{12}$s, a benzene skeleton, a cyclohexane skeleton, or a naphthalene skeleton is preferable. In addition, the above groups constituting $M^{11}$ and $M^{14}$ may each be independently unsubstituted or substituted with an alkyl group having 1 to 12 carbon atoms, a halogenated alkyl group having 1 to 12 carbon atoms, an alkoxy group having 1 to 12 carbon atoms, a halogenated alkoxy group having 1 to 12 carbon atoms, a halogen, a cyano group, or a nitro group. In order to improve the compatibility with other liquid crystal materials, the above groups constituting $M^{11}$ and $M^{14}$ are each independently preferably unsubstituted or substituted with a halogen, an alkyl group having 1 to 4 carbon atoms, a halogenated alkyl group having 1 to 4 carbon atoms, an alkoxy group having 1 to 4 carbon atoms, or a halogenated alkoxy group having 1 to 4 carbon atoms.

$M^{12}$ and $M^{13}$ each independently represent a 1,4-phenylene group, a 1,4-cyclohexylene group, or a naphthalene-2,6-diyl group. In order to improve the compatibility with other liquid crystal materials, these groups constituting $M^{12}$ and $M^{13}$ are each independently preferably unsubstituted or substituted with a halogen, an alkyl group having 1 to 4 carbon atoms, a halogenated alkyl group having 1 to 4 carbon atoms, an alkoxy group having 1 to 4 carbon atoms, or a halogenated alkoxy group having 1 to 4 carbon atoms.

In order to improve the rate of polymerization by ultraviolet light, $M^{11}$, $M^{12}$, $M^{13}$, and $M^{14}$ are each preferably aromatic. In order to provide moderate flexibility, $M^{11}$, $M^{12}$, $M^{13}$, and $M^{14}$ each preferably have a cyclohexane skeleton.

Among the structures formed by the combinations of the above alternatives, —CH=CH—CH=CH—, —C≡C—C≡C—, and —CH=CH—C≡C— are not preferable from the standpoint of chemical stability. Similarly, structures in which a hydrogen atom in any of these structures is substituted with a fluorine atom are also not preferable. Similarly, structures in which oxygen atoms are bonded to each other, structures in which sulfur atoms are bonded to each other, and structures in which a sulfur atom is bonded to an oxygen atom are also not preferable. Similarly, structures in which nitrogen atoms are bonded to each other, structures in which a nitrogen atom is bonded to an oxygen atom, and structures in which a nitrogen atom is bonded to a sulfur atom are also not preferable.

More specifically, the compound represented by general formula (I) is preferably selected from compounds represented by general formulae (I-1) to (I-159):

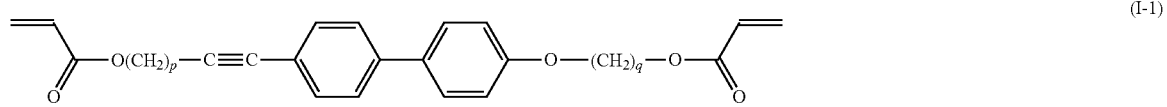

(I-1)

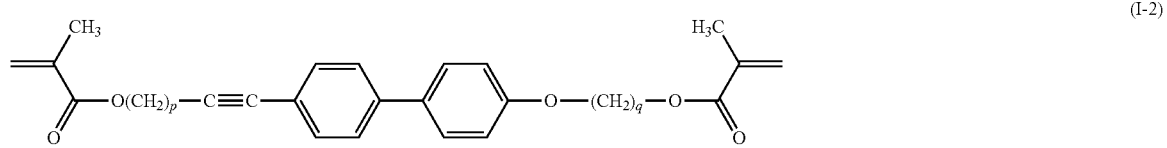

(I-2)

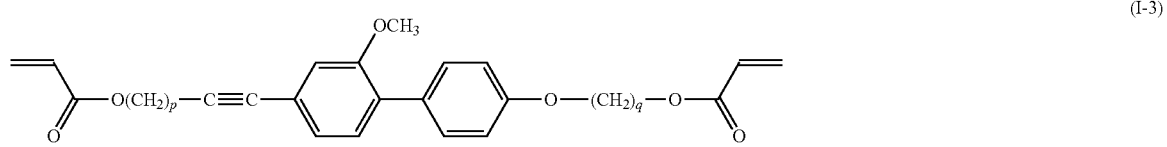

(I-3)

-continued
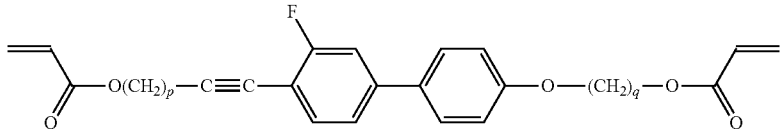
(I-4)
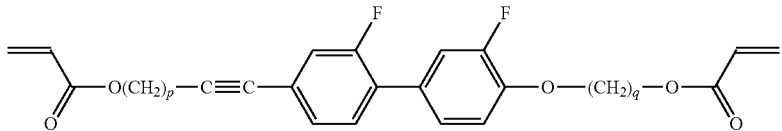
(I-5)
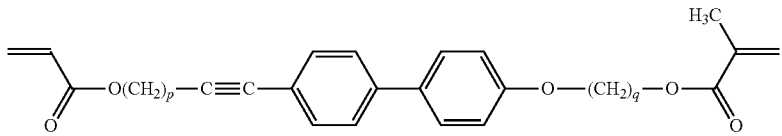
(I-6)
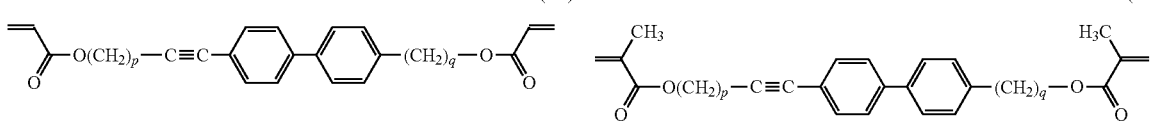
(I-7)     (I-8)
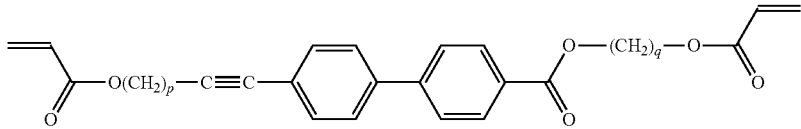
(I-9)
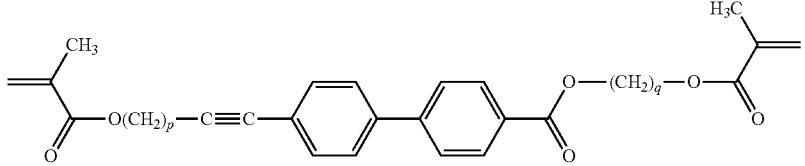
(I-10)
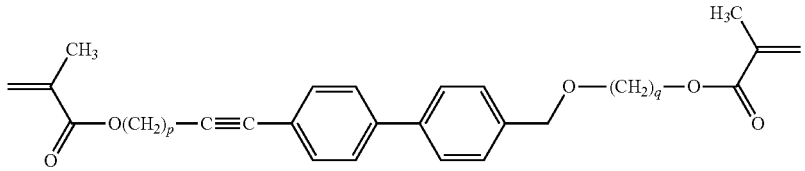
(I-11)
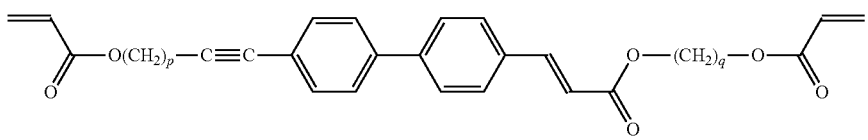
(I-12)
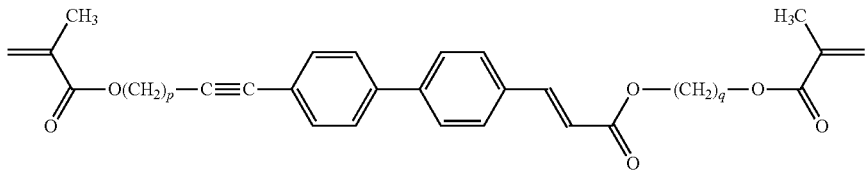
(I-13)
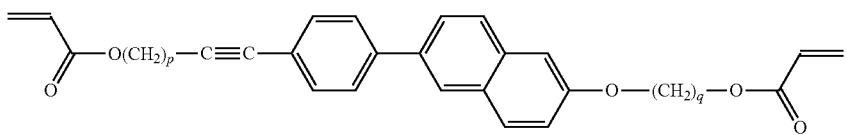
(I-14)

-continued
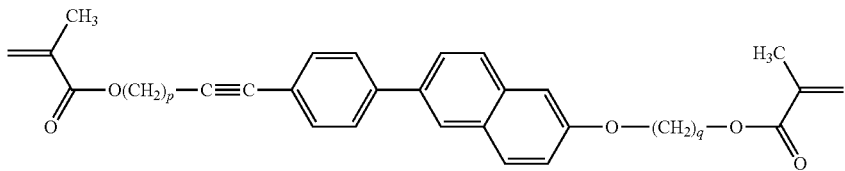
(I-15)
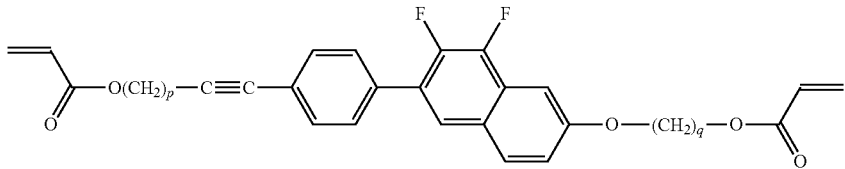
(I-16)
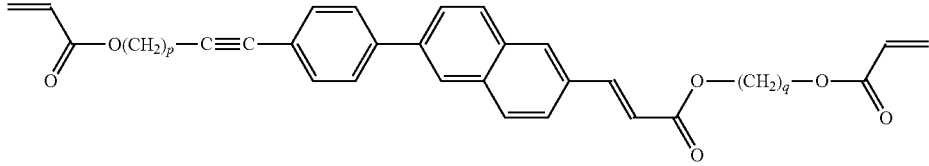
(I-17)
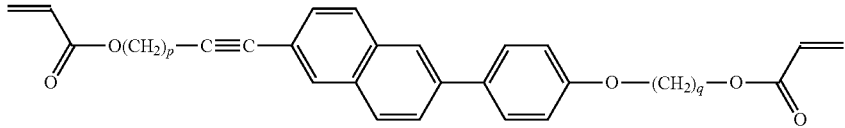
(I-18)
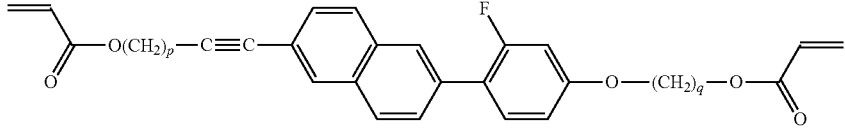
(I-19)
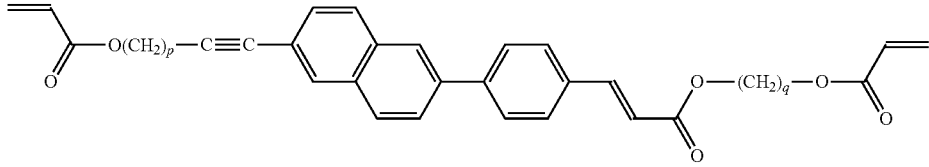
(I-20)
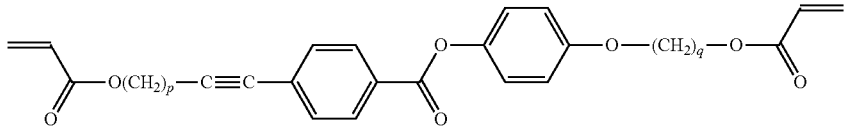
(I-21)
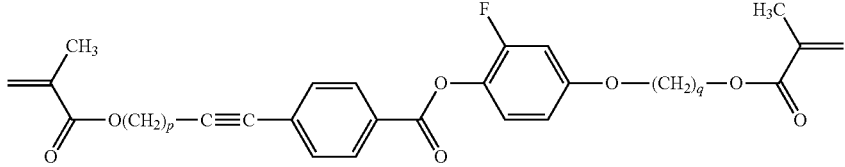
(I-22)
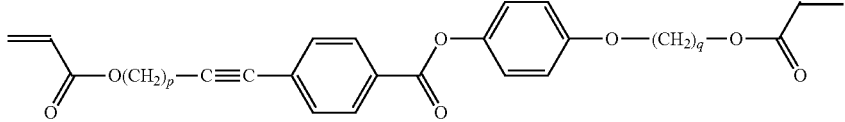
(I-23)
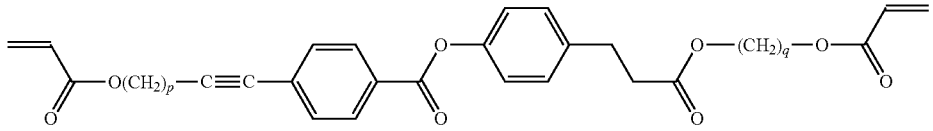
(I-24)

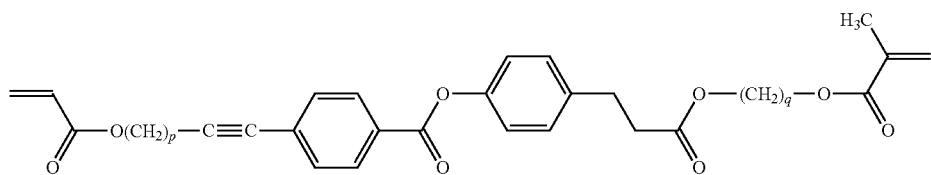
(I-25)
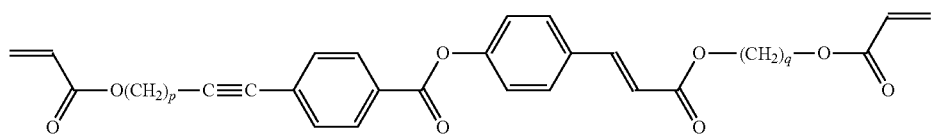
(I-26)
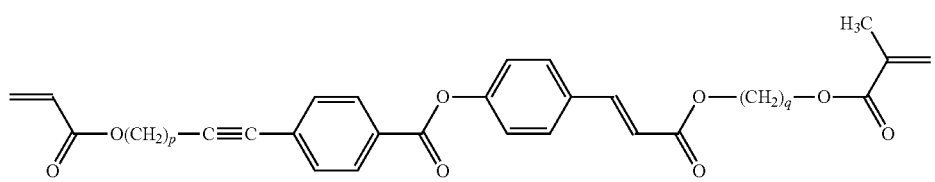
(I-27)
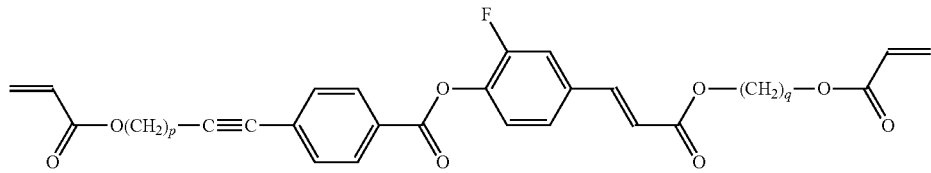
(I-28)
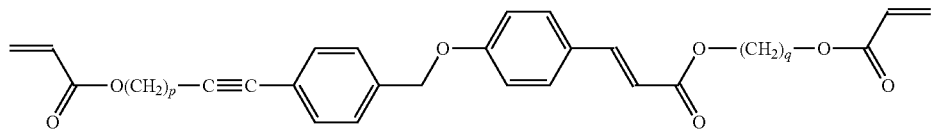
(I-29)
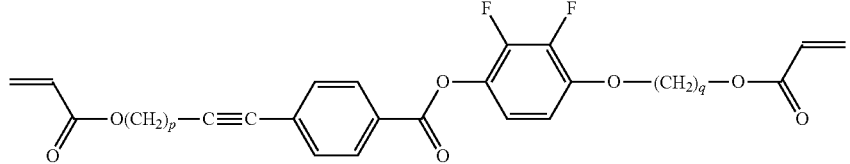
(I-30)
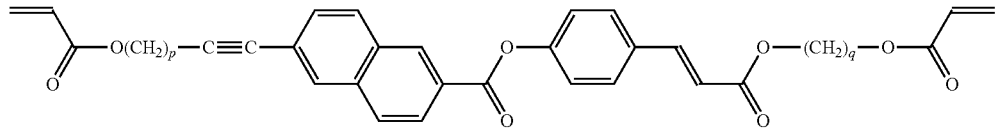
(I-31)
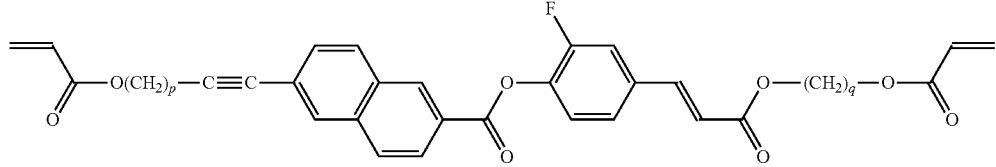
(I-32)
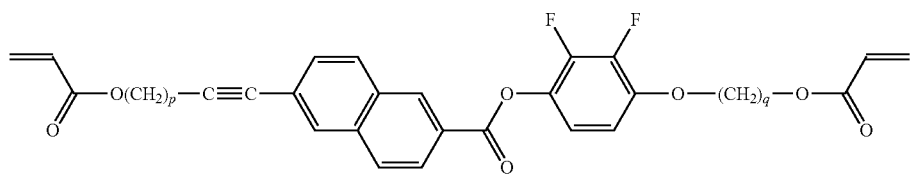
(I-33)

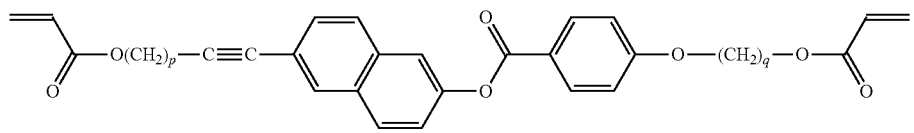
(I-34)
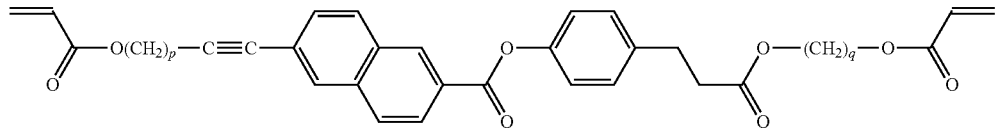
(I-35)
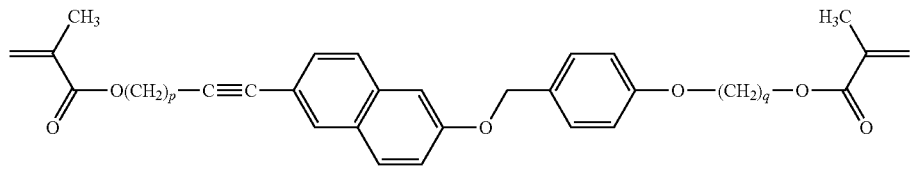
(I-36)
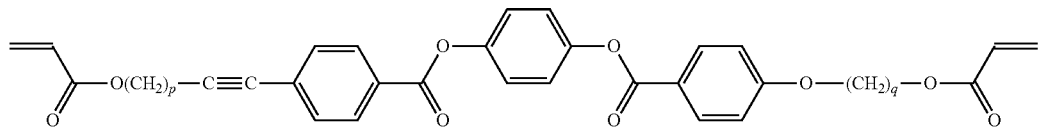
(I-37)
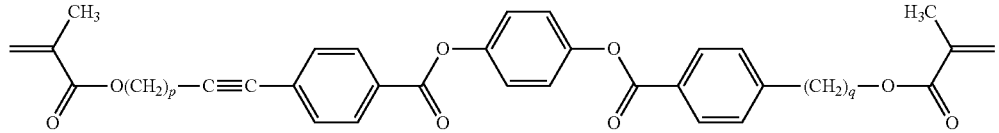
(I-38)
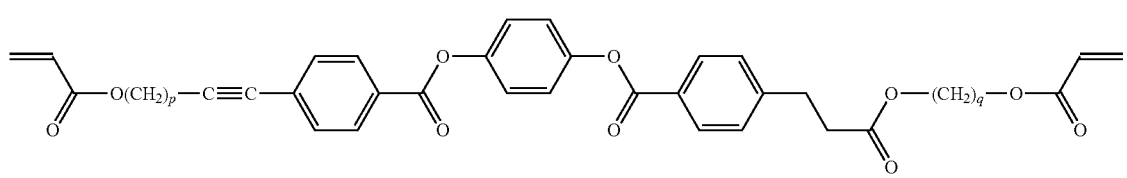
(I-39)
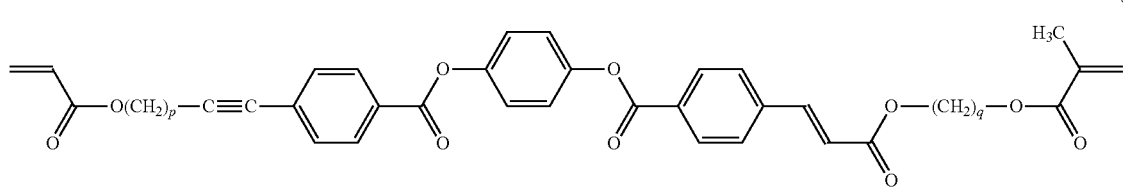
(I-40)
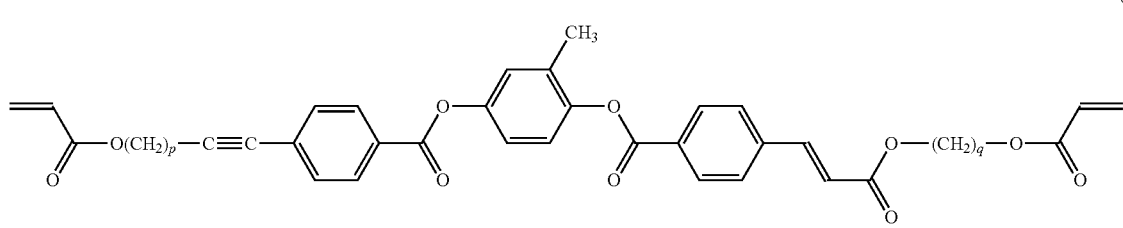
(I-41)
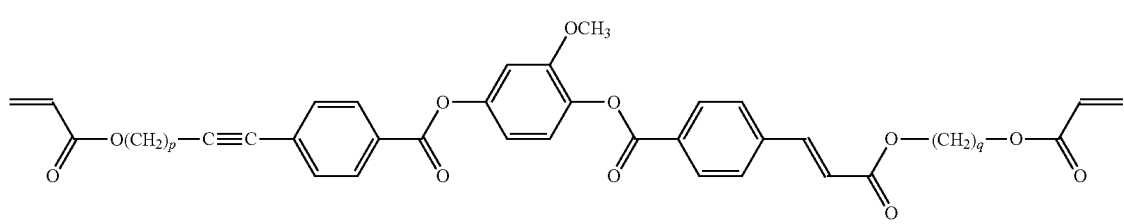
(I-42)

-continued
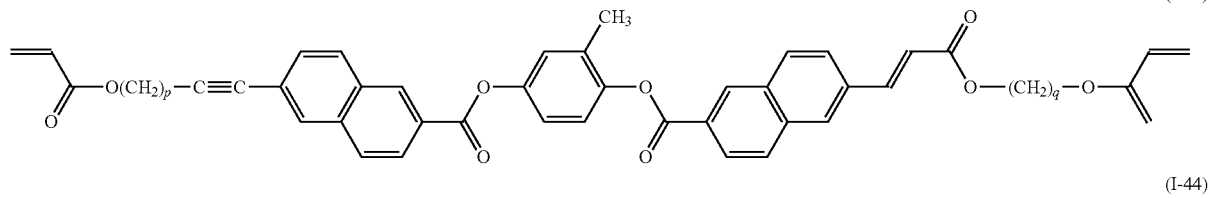
(I-43)
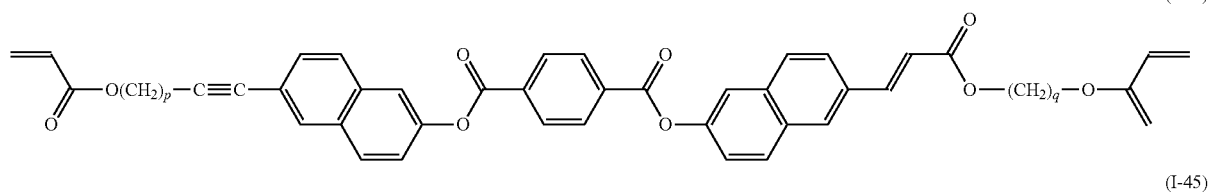
(I-44)
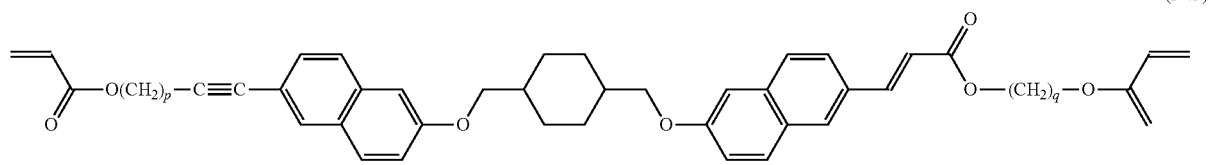
(I-45)
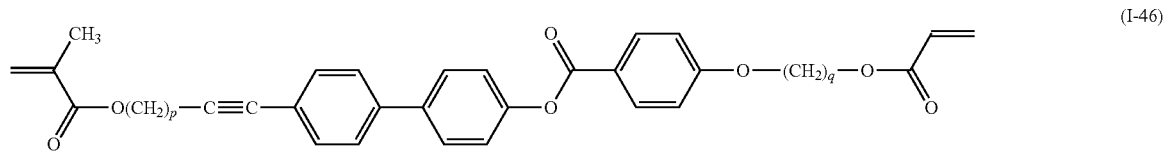
(I-46)
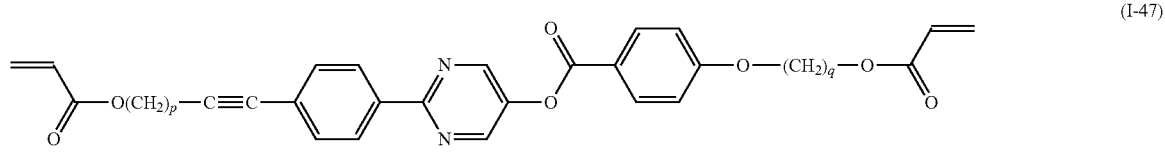
(I-47)
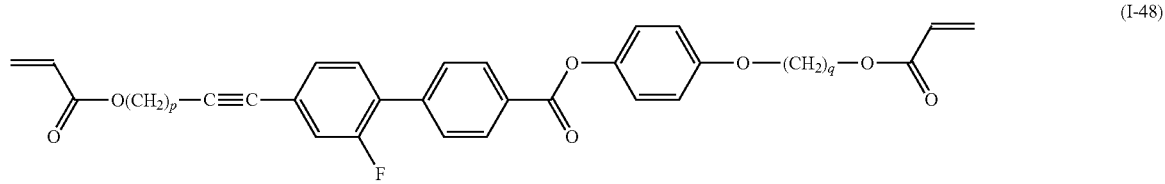
(I-48)
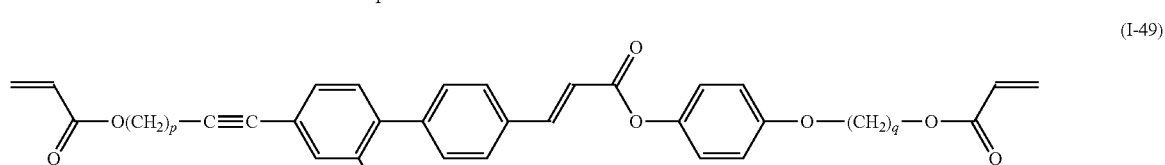
(I-49)
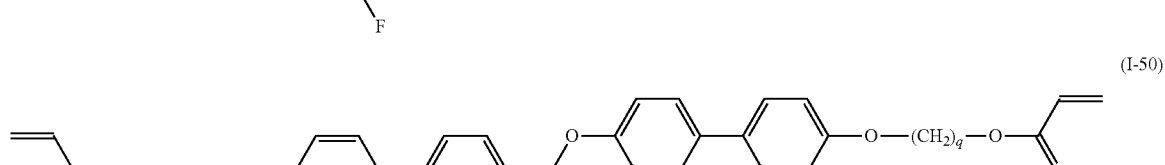
(I-50)
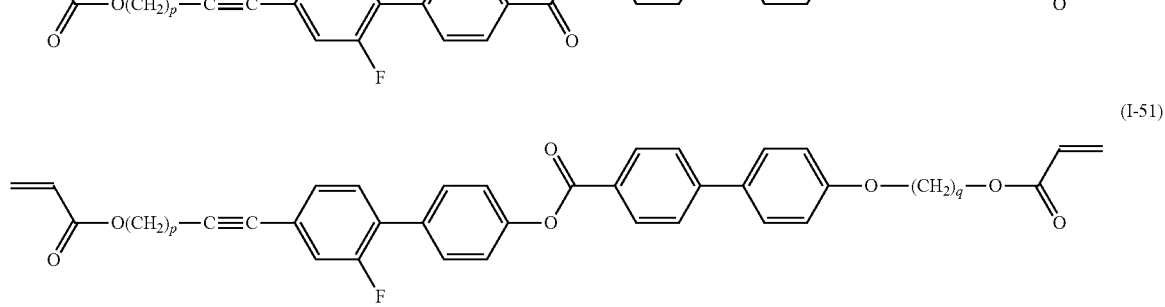
(I-51)

-continued
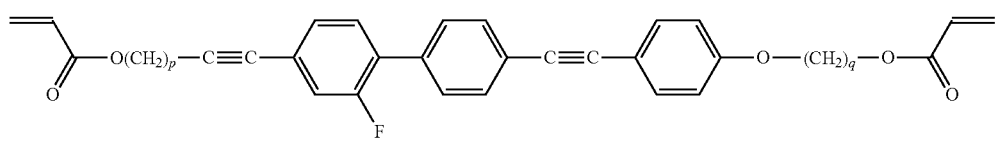 (I-52)
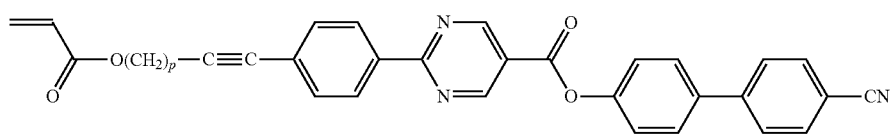 (I-53)
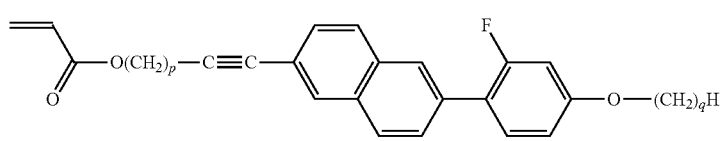 (I-54)
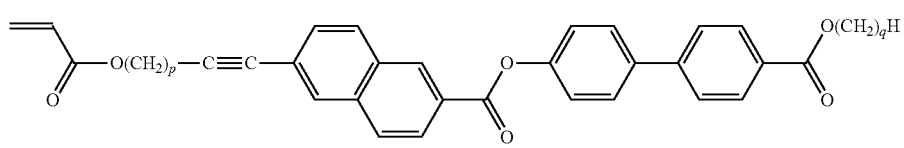 (I-55)
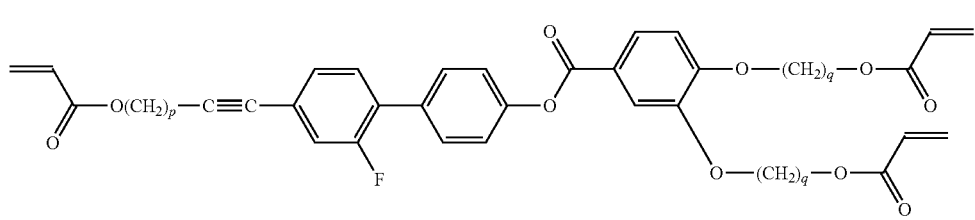 (I-56)
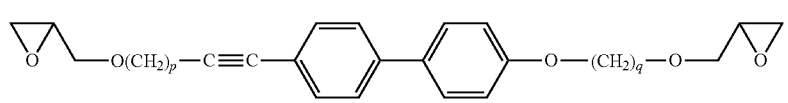 (I-57)
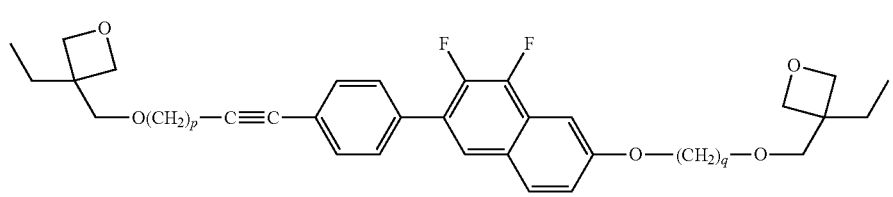 (I-58)
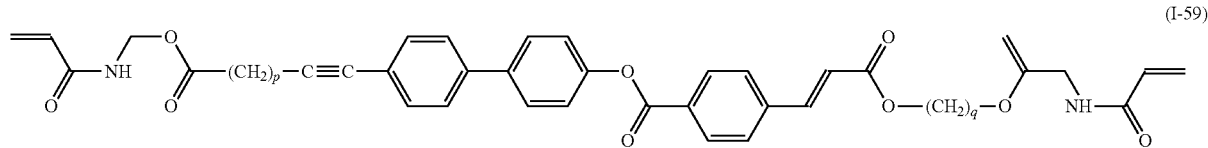 (I-59)
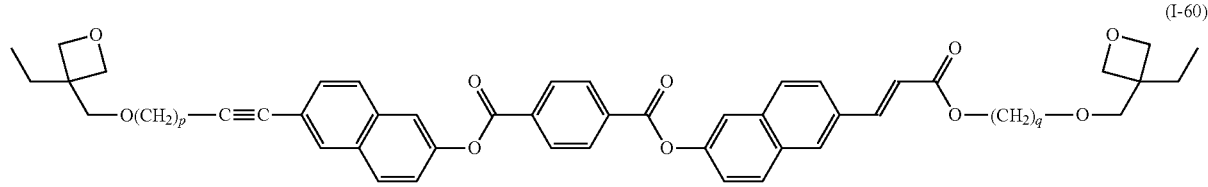 (I-60)
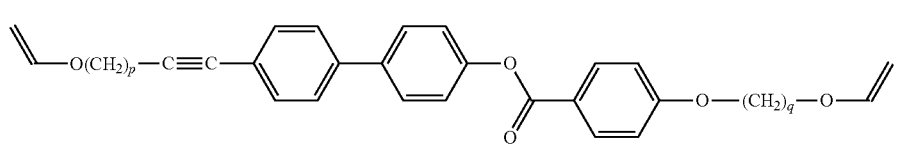 (I-61)

(I-62)
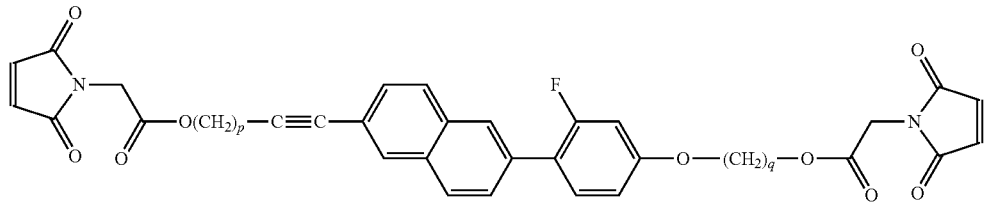
(I-63)
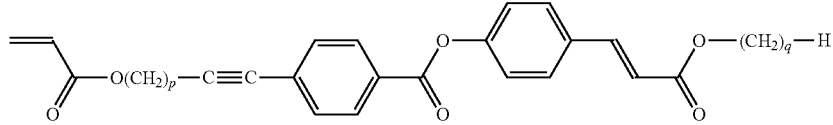
(I-64)
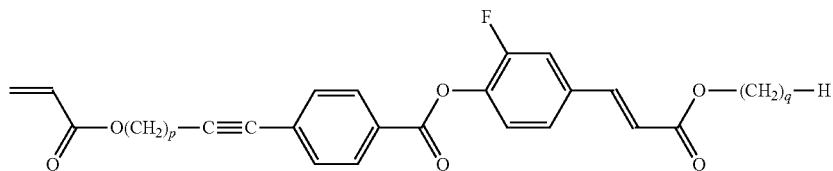
(I-65)
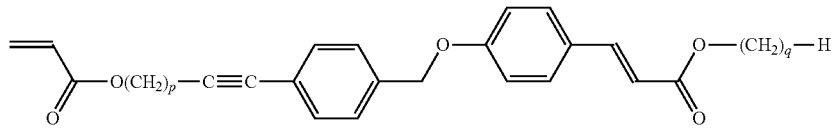
(I-66)
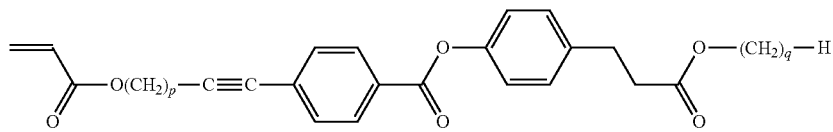
(I-67)
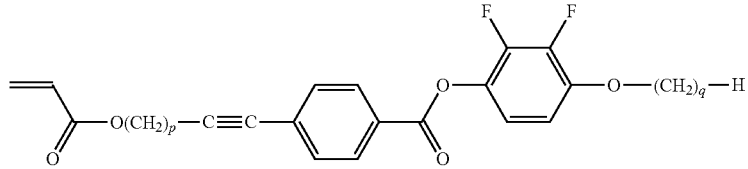
(I-68)
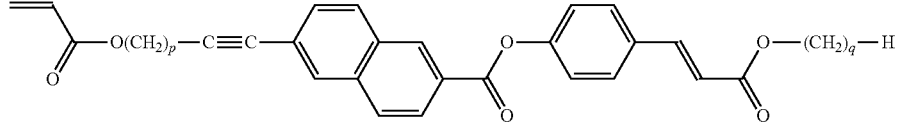
(I-69)
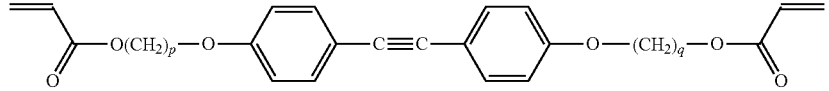
(I-70)
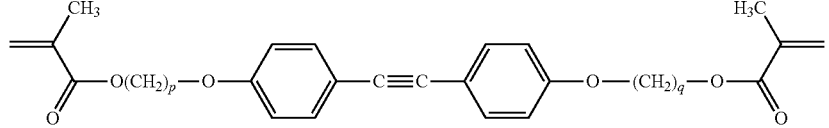
(I-71)
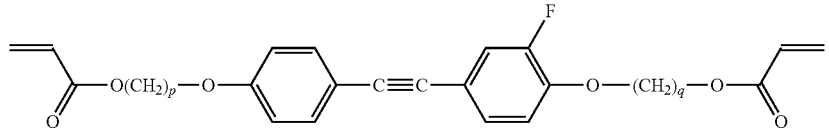

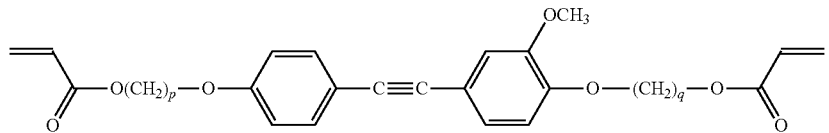
(I-72)
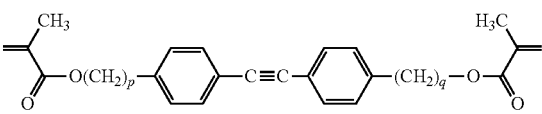
(I-73) (I-74)
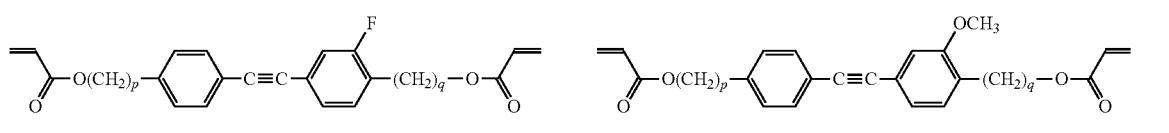
(I-75) (I-76)
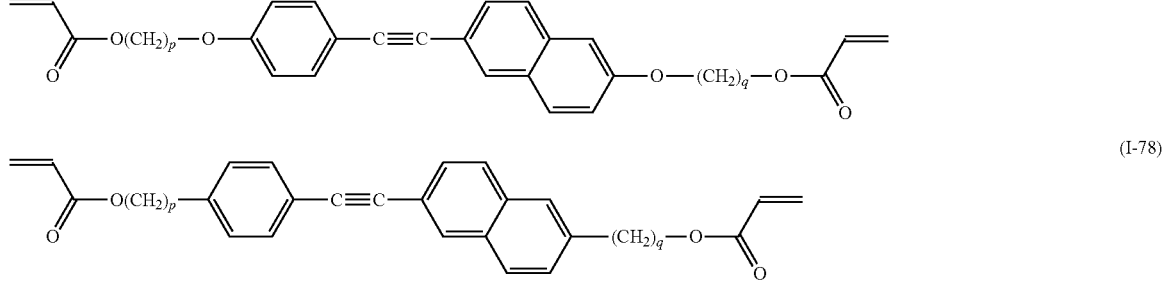
(I-77)
(I-78)
(I-79)
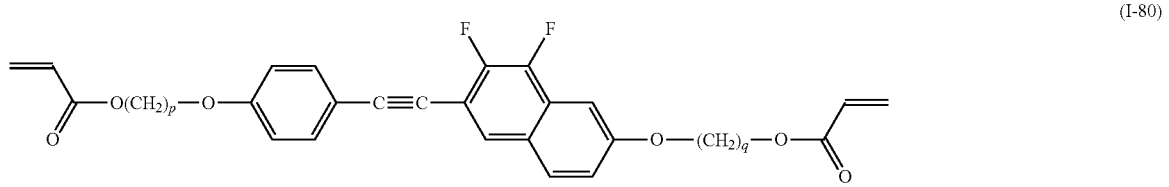
(I-80)
(I-81)
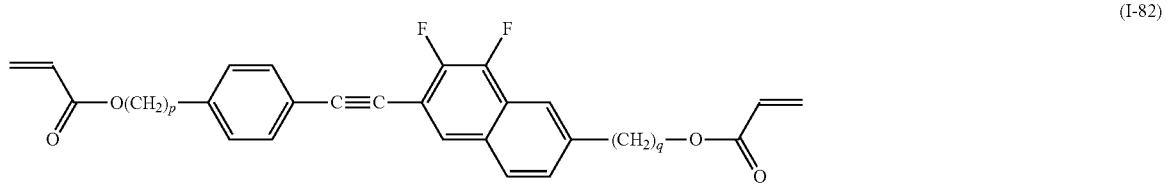
(I-82)
(I-83)

-continued
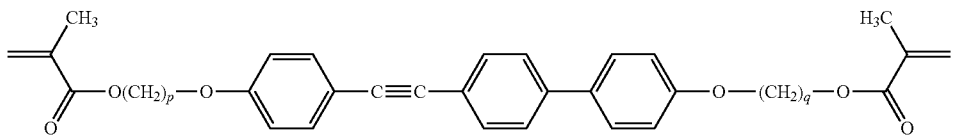
(I-84)
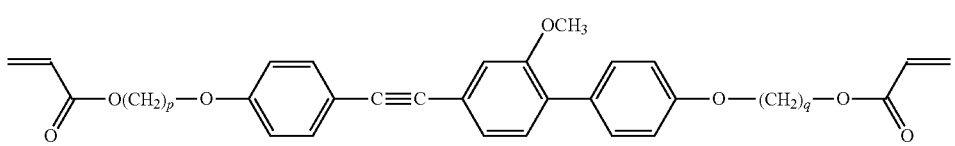
(I-85)
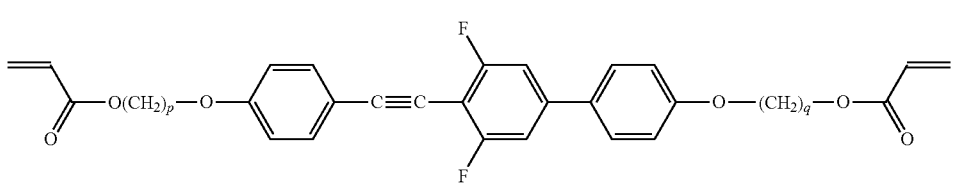
(I-86)
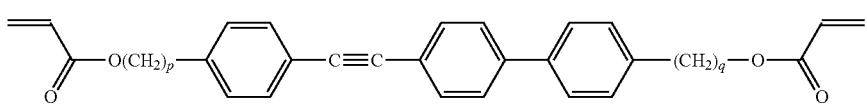
(I-87)
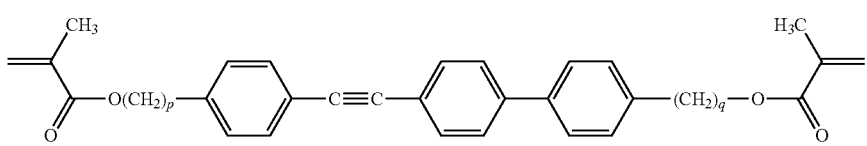
(I-88)
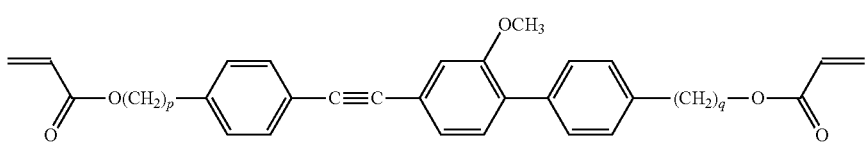
(I-89)
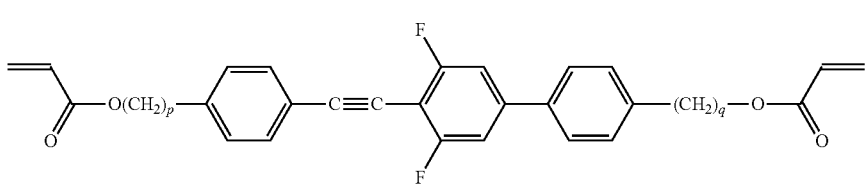
(I-90)
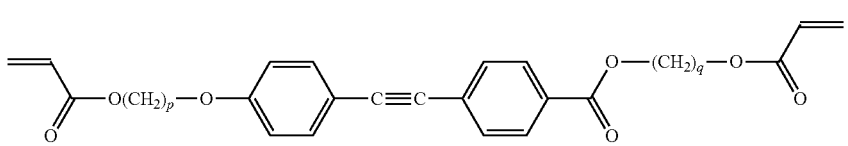
(I-91)
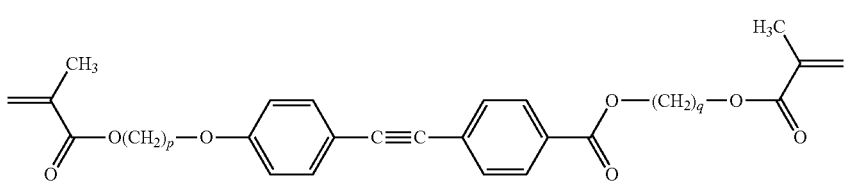
(I-92)
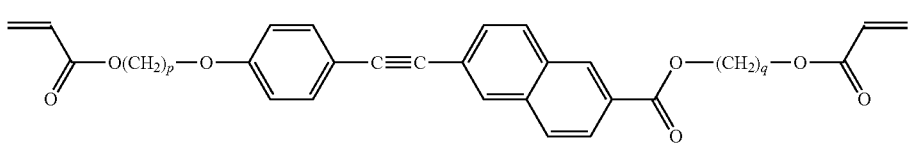
(I-93)

-continued
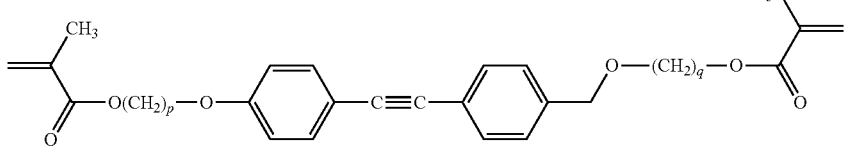
(I-94)
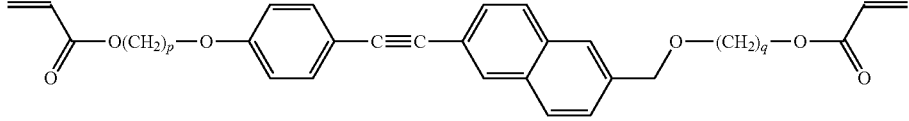
(I-95)
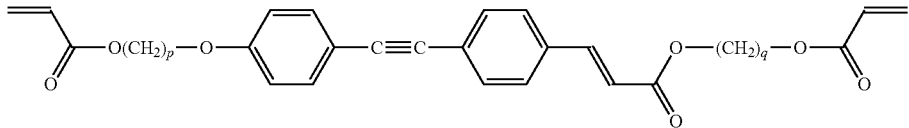
(I-96)
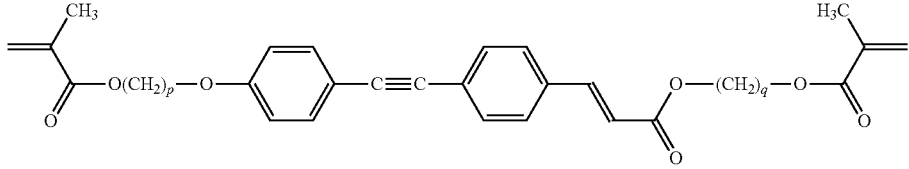
(I-97)
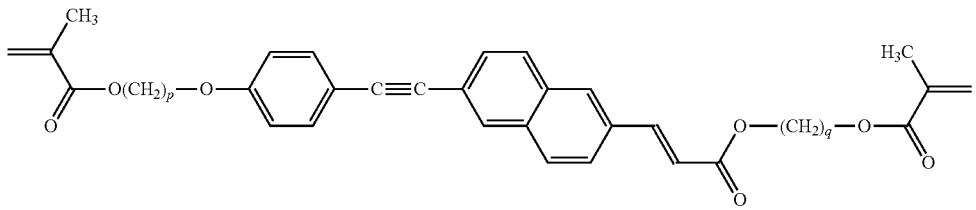
(I-98)
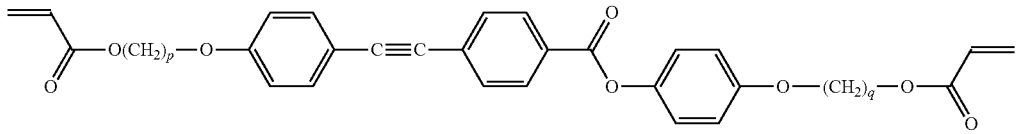
(I-99)
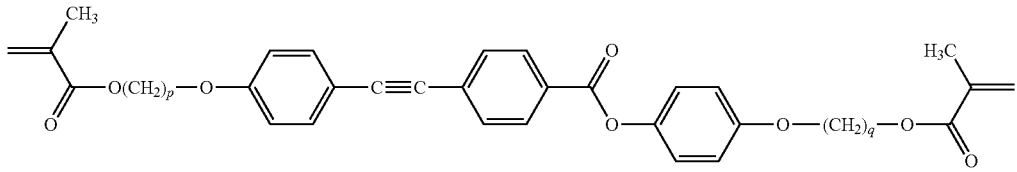
(I-100)
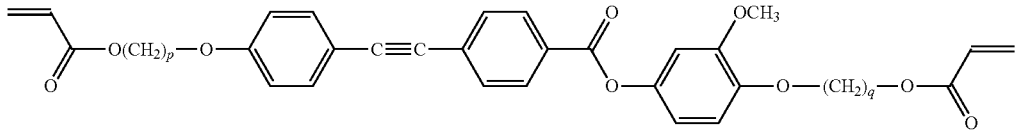
(I-101)
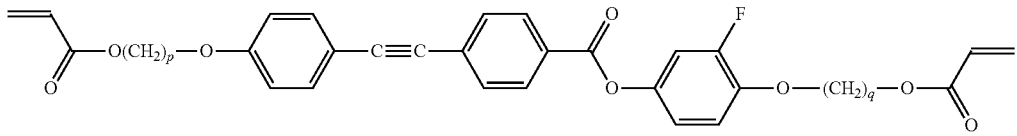
(I-102)
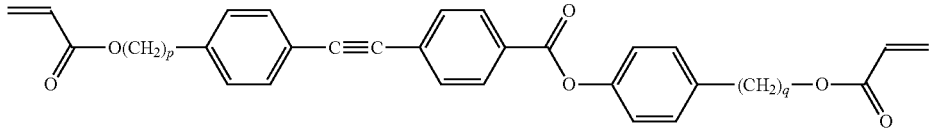
(I-103)

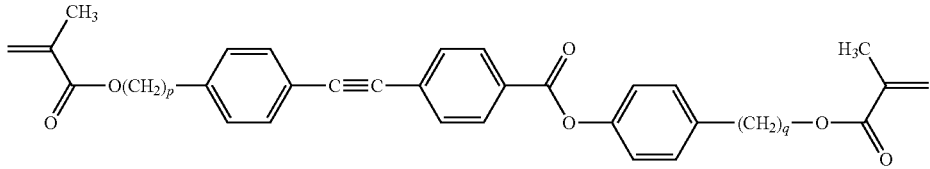
(I-104)
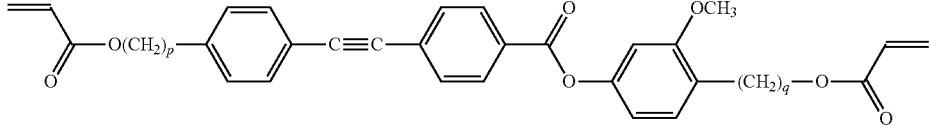
(I-105)
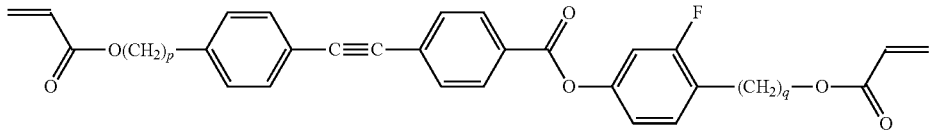
(I-106)
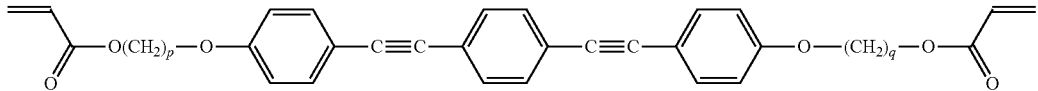
(I-107)
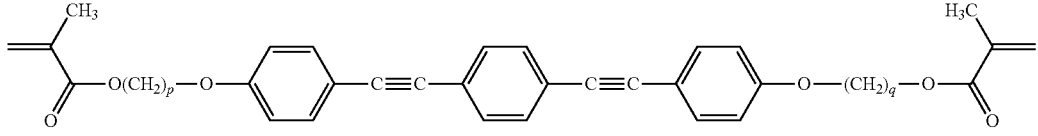
(I-108)
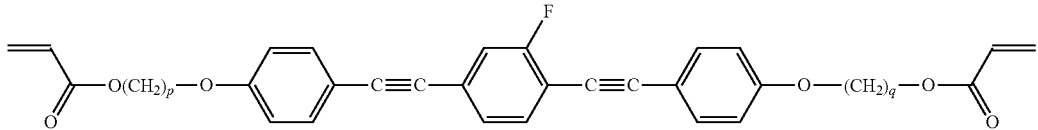
(I-109)
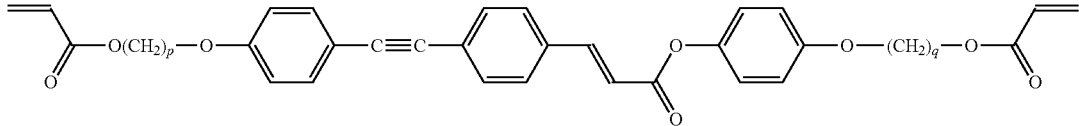
(I-110)
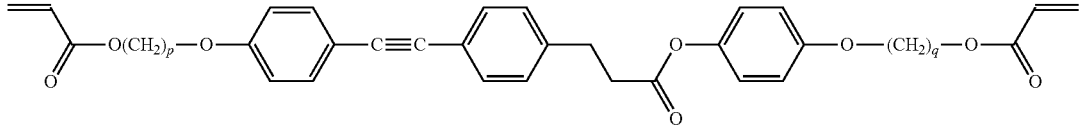
(I-111)
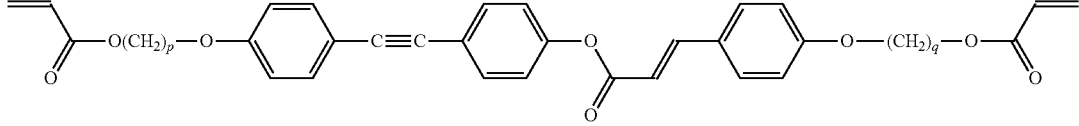
(I-112)
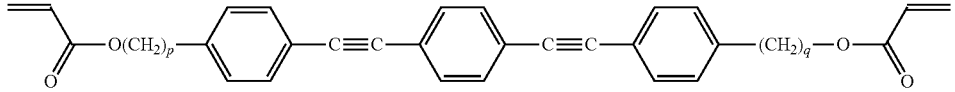
(I-113)
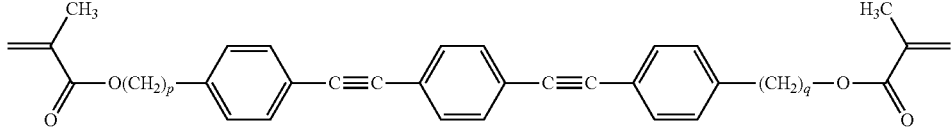
(I-114)

-continued
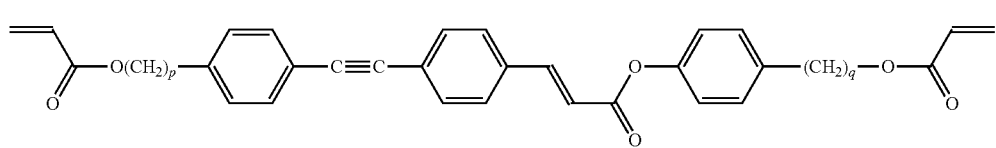
(I-115)
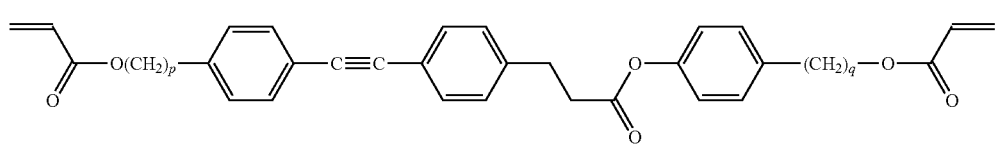
(I-116)
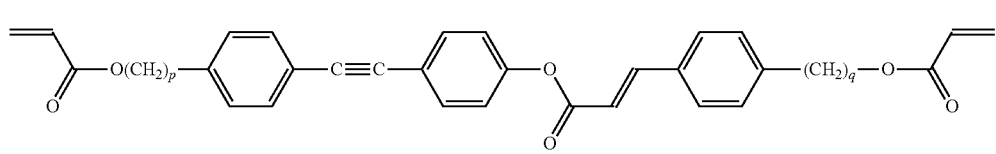
(I-117)
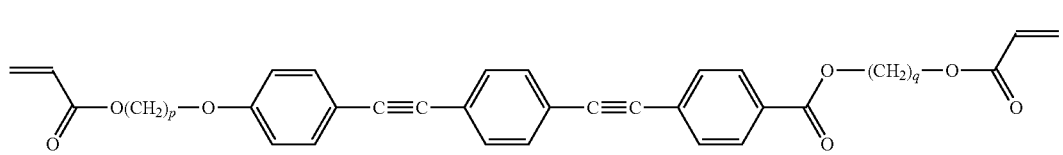
(I-118)
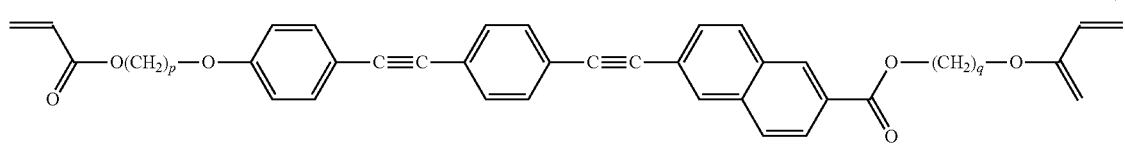
(I-119)
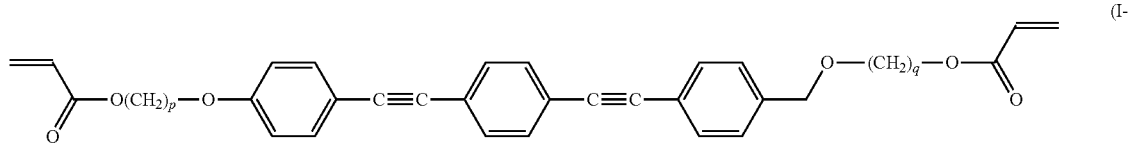
(I-120)
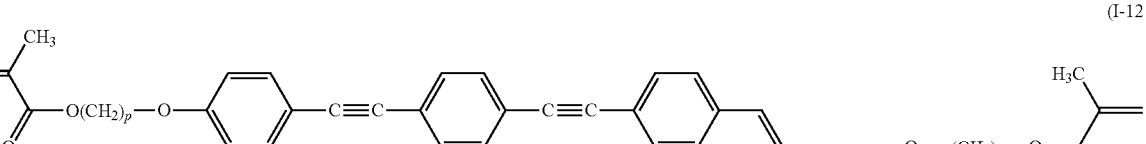
(I-121)
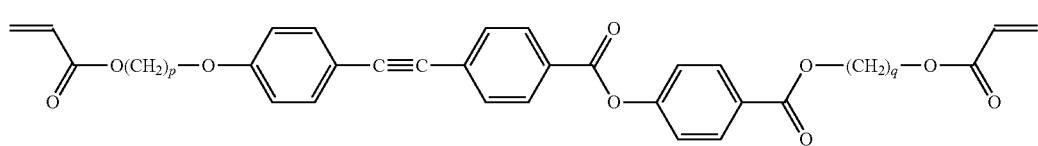
(I-122)
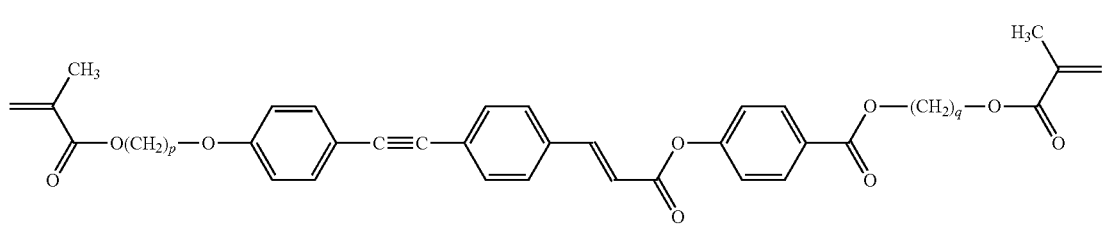
(I-123)

-continued
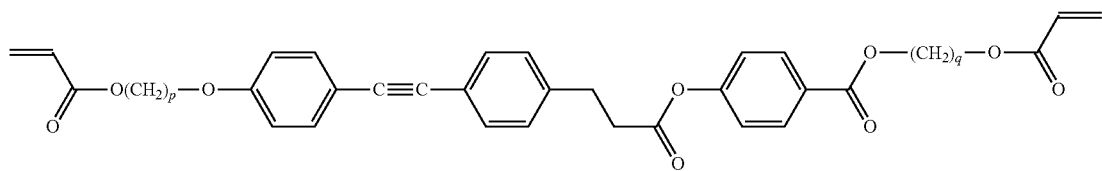
(I-124)
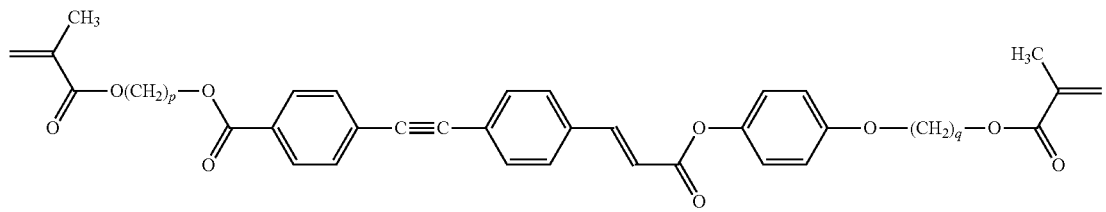
(I-125)
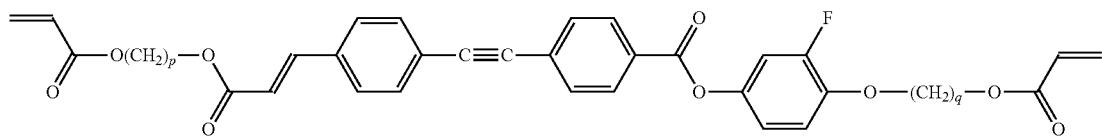
(I-126)
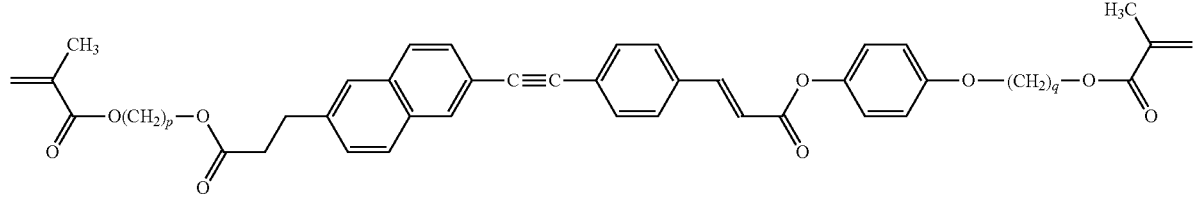
(I-127)
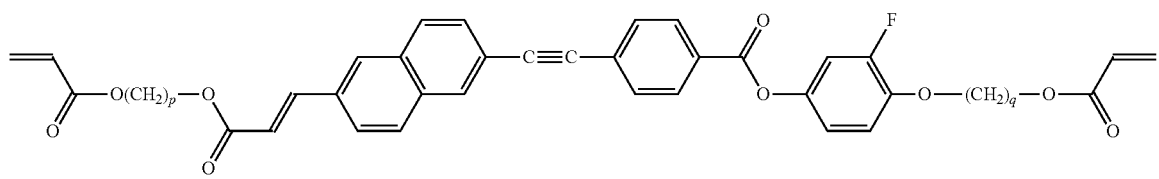
(I-128)
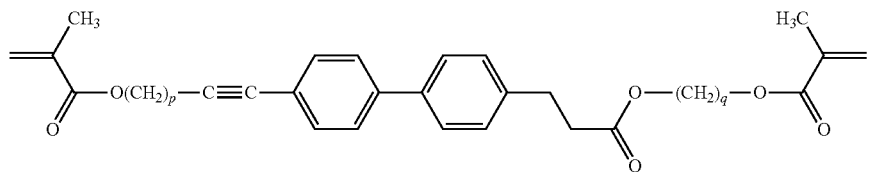
(I-129)
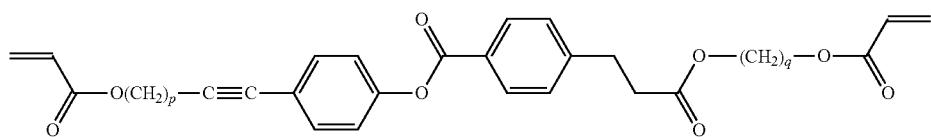
(I-130)
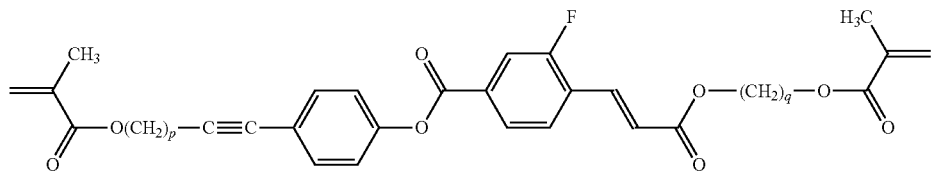
(I-131)

-continued
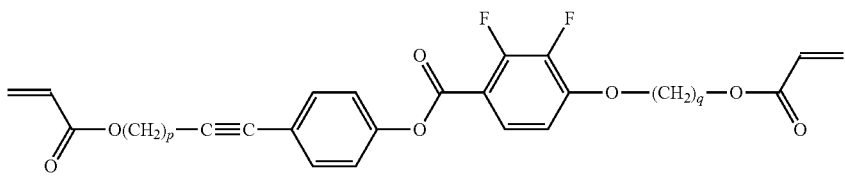
(I-132)
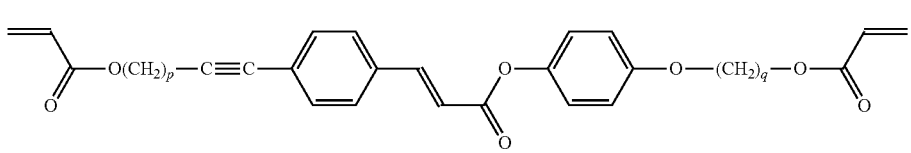
(I-133)
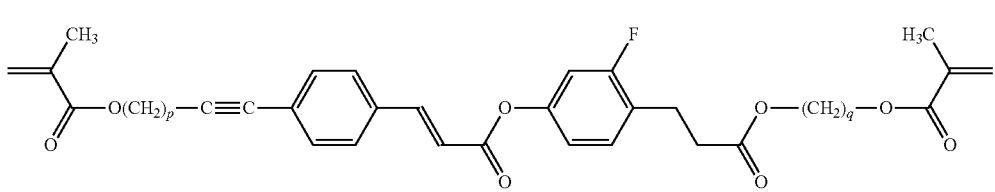
(I-134)
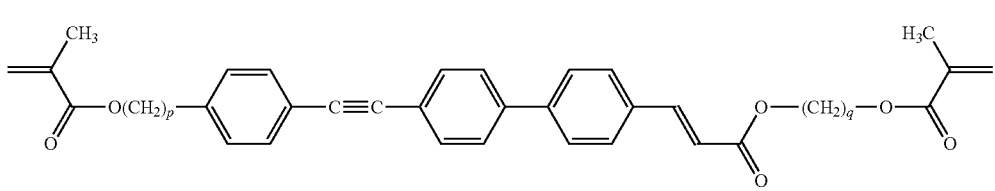
(I-135)
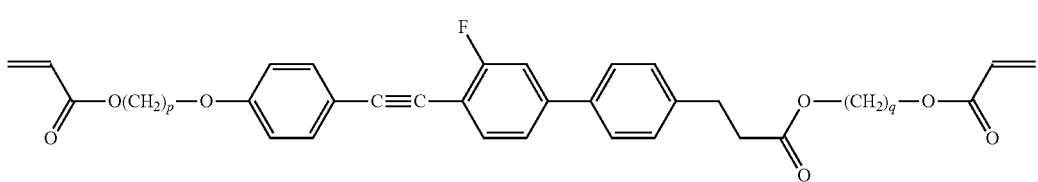
(I-136)
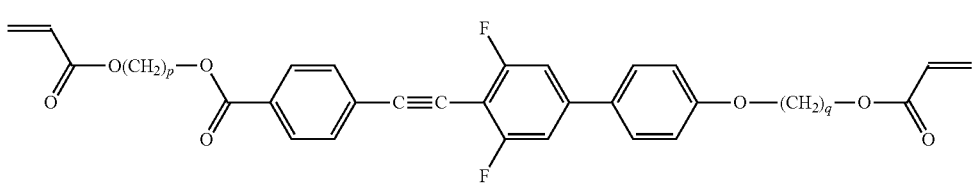
(I-137)
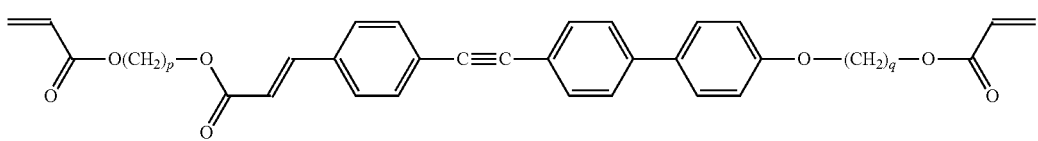
(I-138)
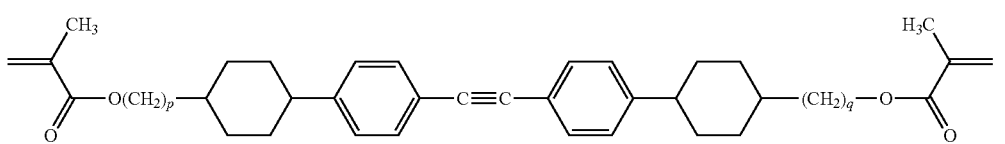
(I-139)
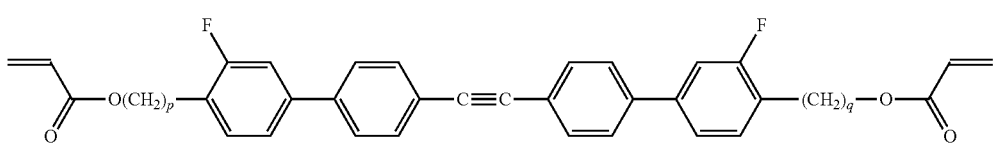
(I-140)

-continued
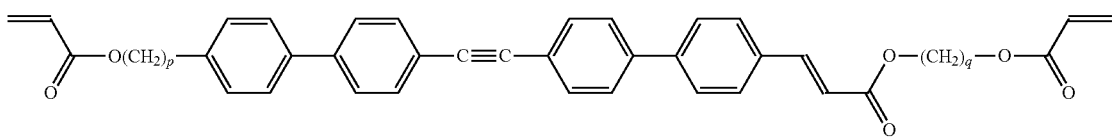
(I-141)
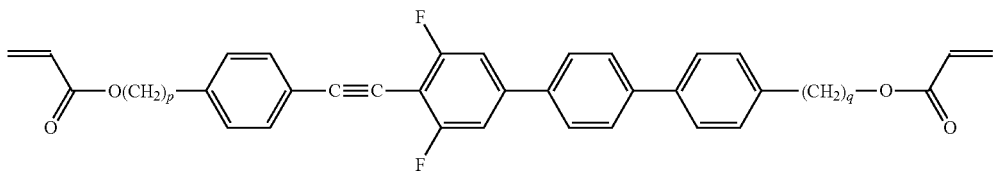
(I-142)
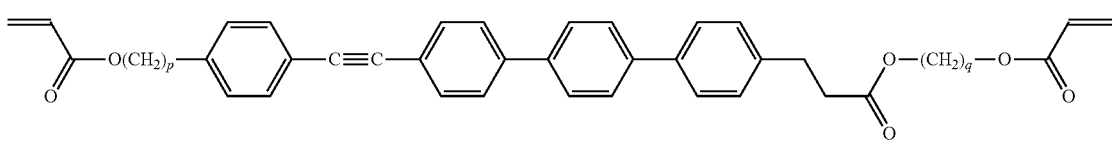
(I-143)
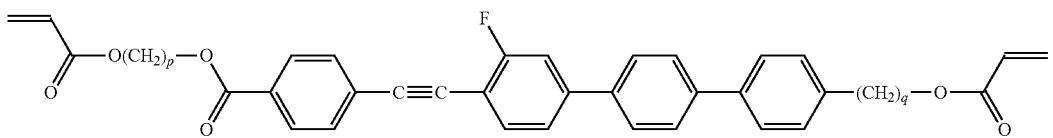
(I-144)
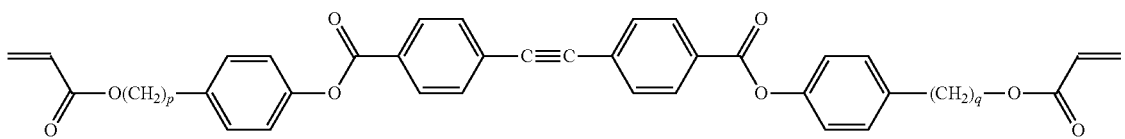
(I-145)
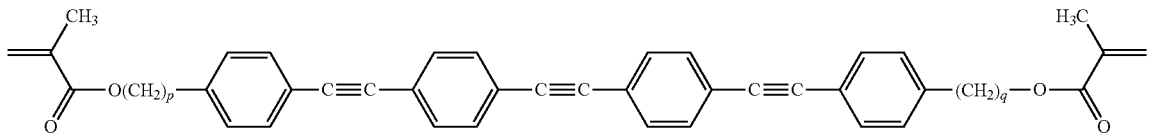
(I-146)
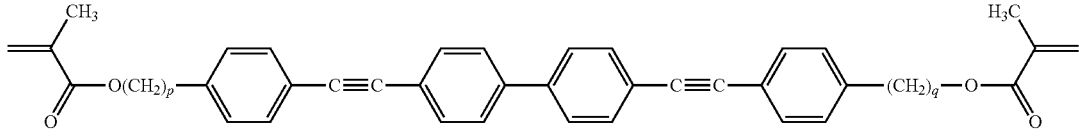
(I-147)
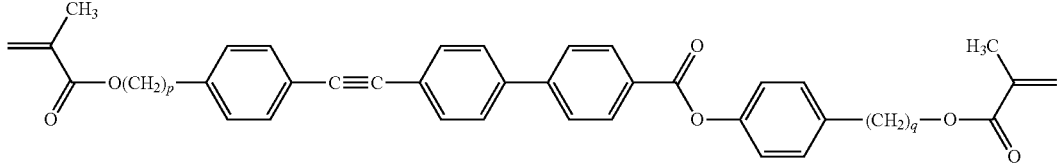
(I-148)
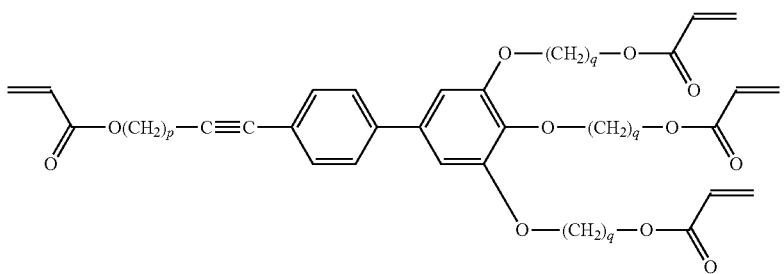
(I-149)

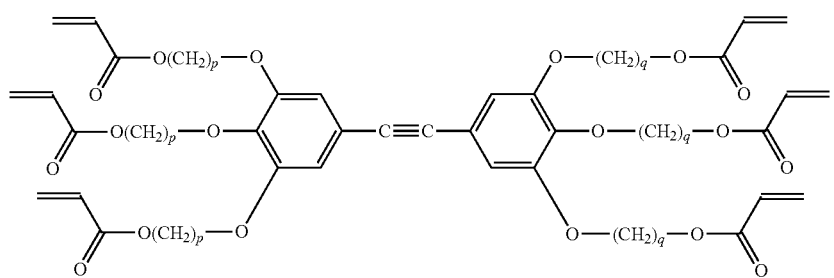
(I-150)
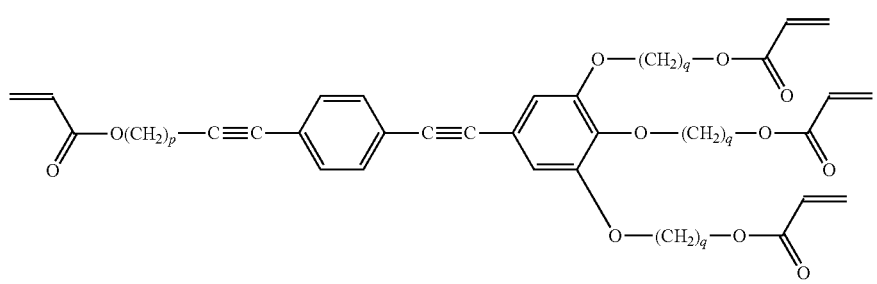
(I-151)
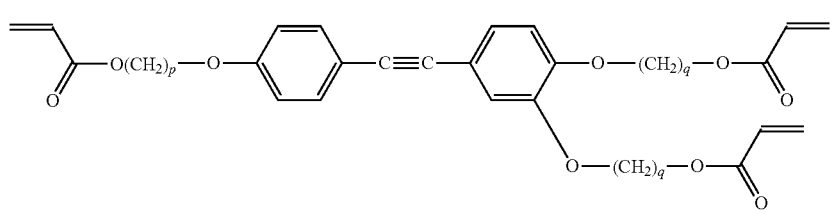
(I-152)
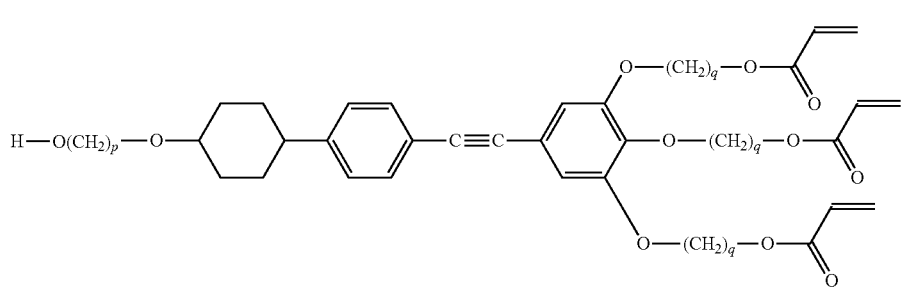
(I-153)
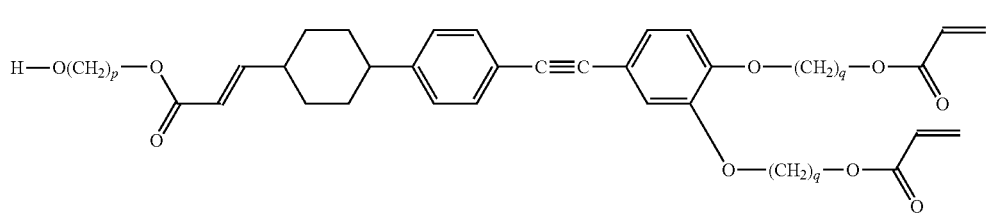
(I-154)
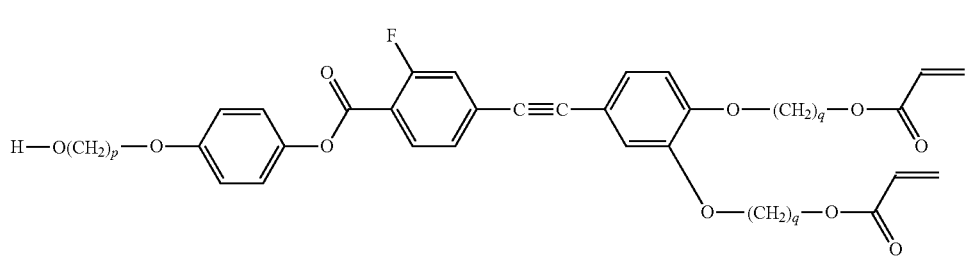
(I-155)
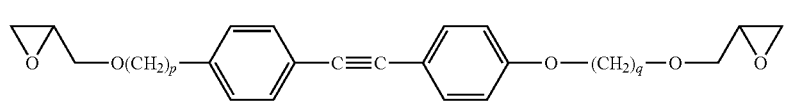
(I-156)

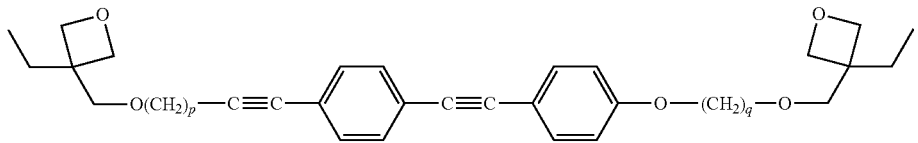
(I-157)

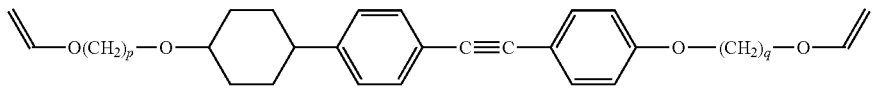
(I-158)

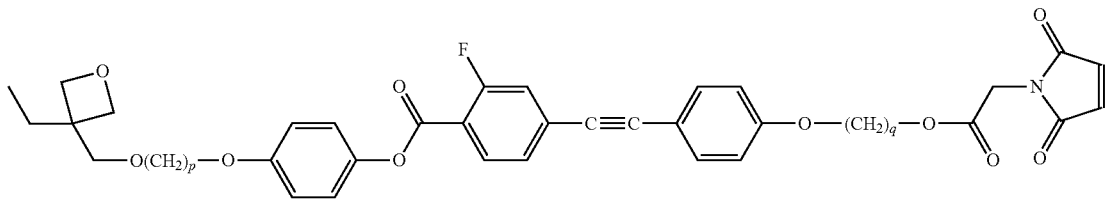
(I-159)

wherein p and q each independently represent an integer of 0 to 12, but when at least one of p and q is 0 and a formula represents a structure in which oxygen atoms are directly bonded to each other, one of the oxygen atoms is removed.

Compounds represented by general formulae (I-1) to (I-36), general formulae (I-63) to (I-82), and general formulae (I-91) to (I-138) are more preferable. Compounds represented by general formulae (I-1) to (I-36), general formulae (I-63) to (I-82), and general formulae (I-91) to (I-98) are still more preferable.

The polymerizable-compound-containing liquid crystal composition of the present invention contains at least one polymerizable compound represented by general formula (I). The polymerizable-compound-containing liquid crystal composition of the present invention contains preferably one to five, and particularly preferably one to three polymerizable compounds represented by general formula (I). When the content of the compound represented by general formula (I) is small, the force that controls the alignment of non-polymerizable liquid crystal compounds is weakened. When the content of the compound represented by general formula (I) is too large, energy necessary for the polymerization increases, and the amount of polymerizable compound that remains without being polymerized increases.

Accordingly, the lower limit of the amount of compound represented by general formula (I) is preferably 0.01% by mass, and more preferably 0.03% by mass. The upper limit thereof is preferably 2.0% by mass, and more preferably 1.0% by mass.

In the compound represented by general formula (II), the compound being used as a second component, $R^{21}$ and $R^{22}$ are each independently preferably an alkyl group having 1 to 10 carbon atoms or an alkenyl group having 2 to 10 carbon atoms (where one methylene group or two or more non-adjacent methylene groups in the alkyl group or the alkenyl group may each be substituted with —O— or —S—, or one or more hydrogen atoms in the alkyl group or the alkenyl group may each be substituted with a fluorine atom or a chlorine atom). Among these, an alkyl group having 1 to 5 carbon atoms, an alkoxy group having 1 to 5 carbon atoms, an alkenyl group having 2 to 5 carbon atoms, or an alkenyloxy group having 3 to 6 carbon atoms is more preferable, and an alkyl group having 1 to 5 carbon atoms or an alkoxy group having 1 to 5 carbon atoms is particularly preferable.

$M^{21}$, $M^{22}$, and $M^{23}$ are each independently preferably a trans-1,4-cyclohexylene group (where one —$CH_2$— group or two non-adjacent —$CH_2$— groups in this trans-1,4-cyclohexylene group may each be substituted with an oxygen atom), a 1,4-phenylene group (where one —CH= or two or more —CH= in this 1,4-phenylene group may each be substituted with a nitrogen atom), a 3-fluoro-1,4-phenylene group, a 3,5-difluoro-1,4-phenylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, or a 1,2,3,4-tetrahydronaphthalene-2,6-diyl group. Among these, a trans-1,4-cyclohexylene group, a 1,4-phenylene group, or a 1,4-bicyclo[2.2.2]octylene group is more preferable, and a trans-1,4-cyclohexylene group or a 1,4-phenylene group is particularly preferable. In the compound represented by general formula (II), o is preferably 0, 1, or 2, and more preferably 0 or 1. $L^{21}$ and $L^{22}$ are each independently preferably a single bond, —$CH_2CH_2$—, —$(CH_2)_4$—, —$OCH_2$—, —$CH_2O$—, —$OCF_2$—, —$CF_2O$—, —CH=CH—, —CH=N—N=CH—, or —C≡C—. Among these, a single bond, —$CH_2CH_2$—, —$(CH_2)_4$—, —$OCH_2$—, or —$CH_2O$— is more preferable, and a single bond or —$CH_2CH_2$— is still more preferable.

Among the structures formed by the combinations of the above alternatives, —CH=CH—CH=CH—, —C≡C—C≡C—, and —CH=CH—C≡C— are not preferable from the standpoint of chemical stability. Similarly, structures in which a hydrogen atom in any of these structures is substituted with a fluorine atom are also not preferable. Similarly, structures in which oxygen atoms are bonded to each other, structures in which sulfur atoms are bonded to each other, and structures in which a sulfur atom is bonded to an oxygen atom are also not preferable. Similarly, structures in which nitrogen atoms are bonded to each other, structures in which a nitrogen atom is bonded to an oxygen atom, and structures in which a nitrogen atom is bonded to a sulfur atom are also not preferable.

More specifically, the compound represented by general formula (II) is preferably selected from compounds represented by the group consisting of general formulae (II-A) to (II-P):

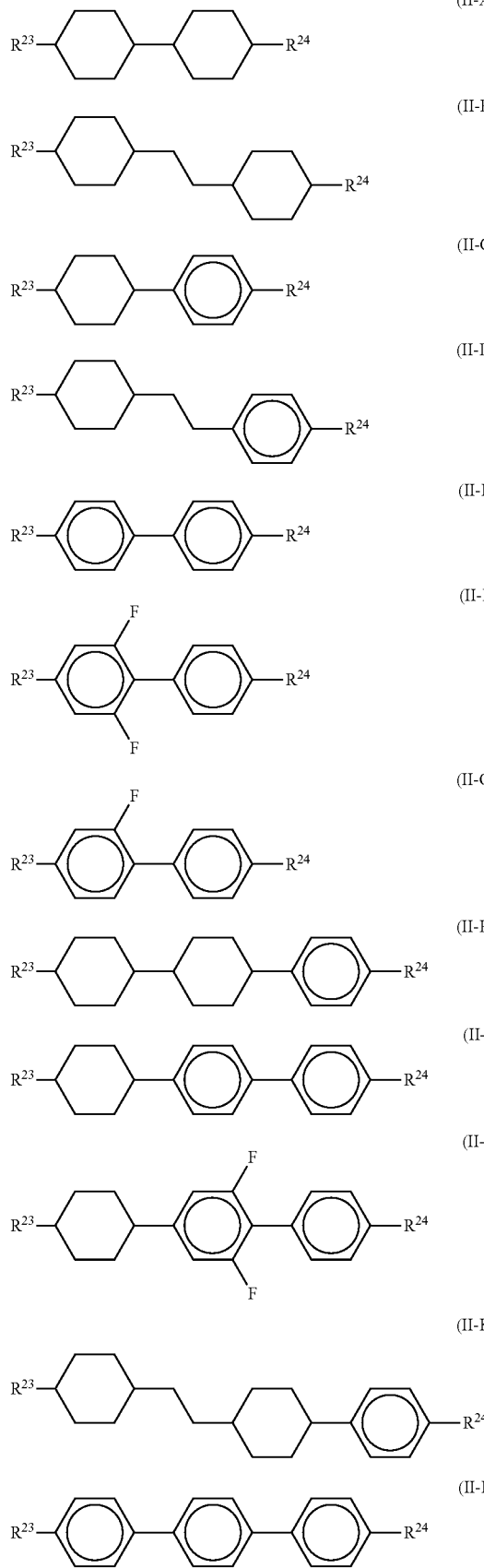
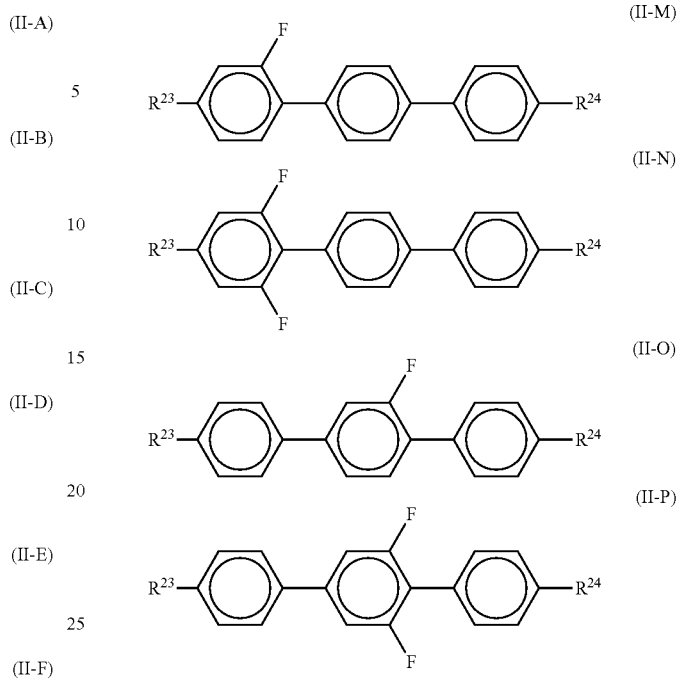

wherein $R^{23}$ and $R^{24}$ each independently represent an alkyl group having 1 to 10 carbon atoms, an alkoxy group having 1 to 10 carbon atoms, an alkenyl group having 2 to 10 carbon atoms, or an alkenyloxy group having 3 to 10 carbon atoms.

$R^{23}$ and $R^{24}$ are each independently more preferably an alkyl group having 1 to 10 carbon atoms, an alkoxy group having 1 to 10 carbon atoms, or an alkenyl group having 2 to 10 carbon atoms, and still more preferably an alkyl group having 1 to 5 carbon atoms or an alkoxy group having 1 to 10 carbon atoms.

Among the compounds represented by general formulae (II-A) to (II-P), compounds represented by general formulae (II-A), (II-B), (II-C), (II-E), (II-H), (II-I), and (II-K) are preferable, and compounds represented by general formulae (II-A), (II-C), (II-E), (II-H), and (II-I) are more preferable.

The polymerizable-compound-containing liquid crystal composition of the present invention contains at least one compound represented by general formula (II). The polymerizable-compound-containing liquid crystal composition of the present invention contains preferably one to ten, and particularly preferably two to eight compounds represented by general formula (II). The lower limit of the content of the compound represented by general formula (II) is preferably 5% by mass, more preferably 10% by mass, still more preferably 20% by mass, and particularly preferably 30% by mass. The upper limit of the content of the compound represented by general formula (II) is preferably 80% by mass, more preferably 70% by mass, and still more preferably 60% by mass.

In the compounds represented by general formulae (IIIa), (IIIb), and (IIIc), the compounds being used as a third component, $R^{31}$, $R^{32}$, and $R^{33}$ are each independently preferably a linear alkyl group having 1 to 15 carbon atoms or an alkenyl group having 2 to 15 carbon atoms (where one methylene group or two or more non-adjacent methylene groups in the linear alkyl group or the alkenyl group may each be substituted with —O— or —S—, and one or more hydrogen atoms in the linear alkyl group or the alkenyl group may each be substituted with a fluorine atom or a chlorine atom), more preferably a linear alkyl group having 1 to 10 carbon atoms, a linear alkoxy group having 1 to 10 carbon atoms, or an alkenyl group having 2 to 10 carbon atoms, and particularly preferably a linear alkyl group having 1 to 8 carbon atoms or an alkoxy group having 1 to 8 carbon atoms.

$M^{31}$, $M^{32}$, $M^{33}$, $M^{34}$, $M^{35}$, $M^{36}$, $M^{37}$, and $M^{38}$ each independently preferably a trans-1,4-cyclohexylene group (where one methylene group or two or more non-adjacent methylene groups in this trans-1,4-cyclohexylene group may each be substituted with —O— or —S—), a 1,4-phenylene group (where one —CH= or two or more non-adjacent —CH= in this 1,4-phenylene group may each be substituted with a nitrogen atom), a 1,4-cyclohexenylene group, a 1,4-bicyclo [2.2.2]octylene group, a piperidine-1,4-diyl group, a naphthalene-2,6-diyl group, a 1,2,3,4-tetrahydronaphthalene-2,6-diyl group, or a decahydronaphthalene-2,6-diyl group (where a hydrogen atom contained in any of these groups may be substituted with a cyano group, a fluorine atom, a trifluoromethyl group, a trifluoromethoxy group, or a chlorine atom). Among these, a trans-1,4-cyclohexylene group, a 1,4-phenylene group, a 3-fluoro-1,4-phenylene group, or a 3,5-difluoro-1,4-phenylene group is more preferable, a trans-1,4-cyclohexylene group or a 1,4-phenylene group is still more preferable, and a trans-1,4-cyclohexylene group is particularly preferable.

$L^{31}$, $L^{32}$, $L^{33}$, $L^{34}$, $L^{35}$, $L^{36}$, $L^{37}$, and $L^{38}$ each independently preferably a single bond, —OCO—, —COO—, —CH$_2$CH$_2$—, —(CH$_2$)$_4$—, —OCH$_2$—, —CH$_2$O—, —OCF$_2$—, —CF$_2$O—, or —C≡C—. Among these, a single bond, —CH$_2$CH$_2$—, —(CH$_2$)$_4$—, or —C≡C— is more preferable, and a single bond or —CH$_2$CH$_2$— is particularly preferable. $X^{31}$, $X^{32}$, $X^{33}$, $X^{34}$, $X^{35}$, $X^{36}$, and $X^{37}$ each independently represent a hydrogen atom or a fluorine atom. $Y^{31}$, $Y^{32}$, and $Y^{33}$ each independently represent preferably a hydrogen atom, a fluorine atom, a chlorine atom, a cyano group, a thiocyanate group, a trifluoromethoxy group, a trifluoromethyl group, a 2,2,2-trifluoroethyl group, a difluoromethoxy group, or an alkyl group having 1 to 12 carbon atoms, more preferably a hydrogen atom, a fluorine atom, a chlorine atom, a cyano group, a trifluoromethoxy group, a trifluoromethyl group, a 2,2,2-trifluoroethyl group, or an alkyl group having 1 to 12 carbon atoms, and particularly preferably a fluorine atom. In the compounds represented by general formulae (IIIa), (IIIb), and (IIIc), p, q, r, s, and t each independently represent 0, 1, or 2, but q+r and s+t each represent 2 or less.

Among the structures formed by the combinations of the above alternatives, —CH=CH—CH=CH—, —C≡C—C≡C—, and —CH=CH—C≡C— are not preferable from the standpoint of chemical stability. Similarly, structures in which a hydrogen atom in any of these structures is substituted with a fluorine atom are also not preferable. Similarly, structures in which oxygen atoms are bonded to each other, structures in which sulfur atoms are bonded to each other, and structures in which a sulfur atom is bonded to an oxygen atom are also not preferable. Similarly, structures in which nitrogen atoms are bonded to each other, structures in which a nitrogen atom is bonded to an oxygen atom, and structures in which a nitrogen atom is bonded to a sulfur atom are also not preferable.

Specifically, a structure represented by general formula (IIIa-1) below is preferable.

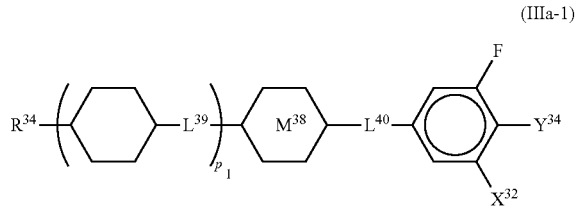

(IIIa-1)

In general formula (IIIa-1), $R^{34}$ represents an alkyl group having 1 to 8 carbon atoms, an alkoxyl group having 1 to 8 carbon atoms, or an alkenyl group having 2 to 8 carbon atoms, $L^{39}$ and $L^{40}$ each independently represent a single bond, —CH$_2$CH$_2$—, —(CH$_2$)$_4$—, —OCH$_2$—, —CH$_2$O—, —OCF$_2$—, —CF$_2$O—, or $M^{38}$ represents a 1,4-phenylene group or a trans-1,4-cyclohexylene group, $X^{32}$ represents a hydrogen atom or a fluorine atom, $p_i$ represents 0 or 1, and $Y^{34}$ represents a cyano group, a fluorine atom, a chlorine atom, a trifluoromethyl group, a fluoromethoxy group, a difluoromethoxy group, or a trifluoromethoxy group.

More specifically, structures represented by general formulae (IIIa-2a) to (IIIa-4d) below are preferable.

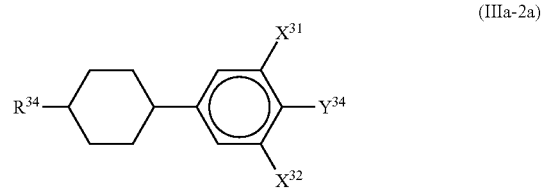

(IIIa-2a)

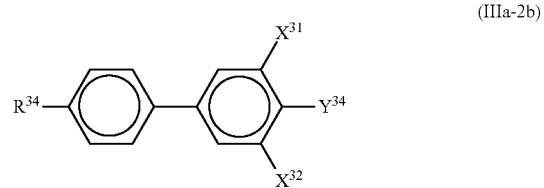

(IIIa-2b)

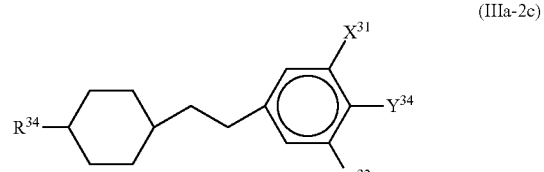

(IIIa-2c)

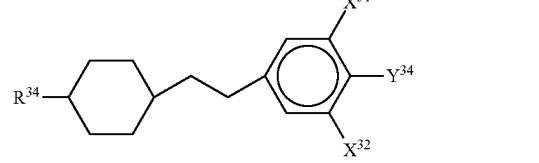

(IIIa-2d)

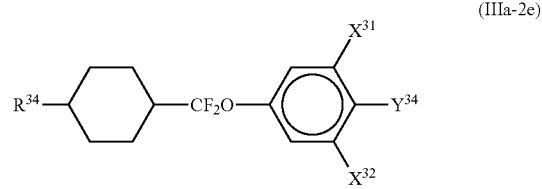

(IIIa-2e)

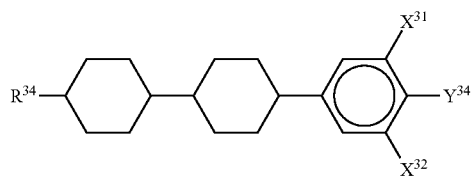
(IIIa-3a)

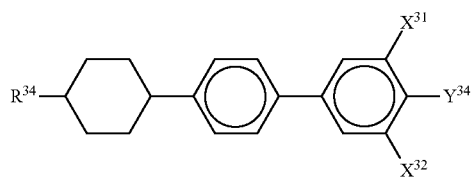
(IIIa-3b)

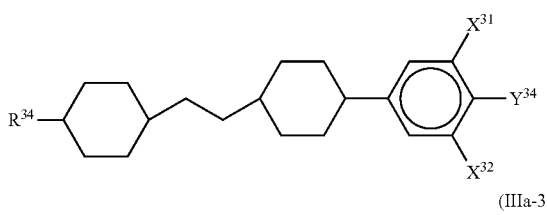
(IIIa-3c)

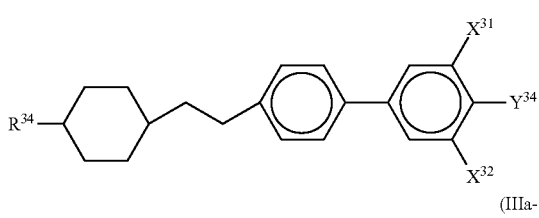
(IIIa-3d)

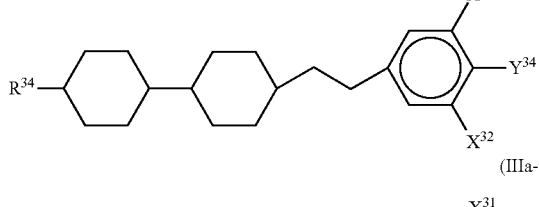
(IIIa-3e)

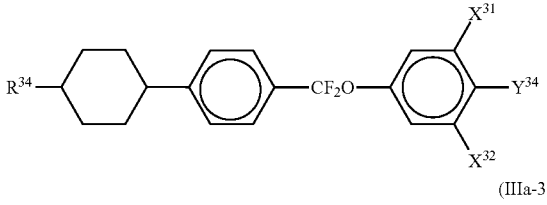
(IIIa-3f)

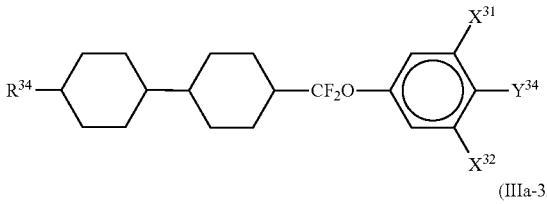
(IIIa-3g)

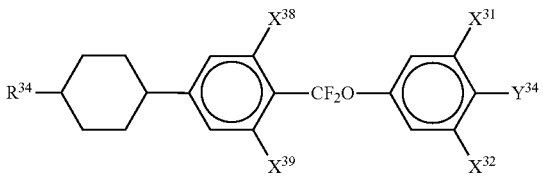
(IIIa-3h)

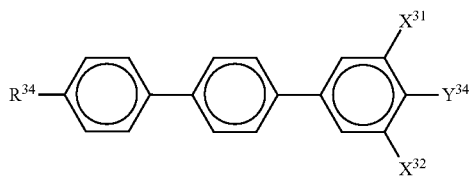
(IIIa-3i)

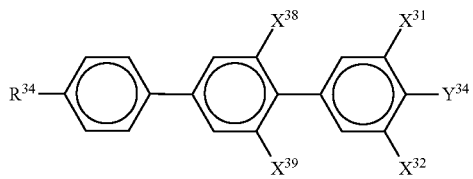
(IIIa-3j)

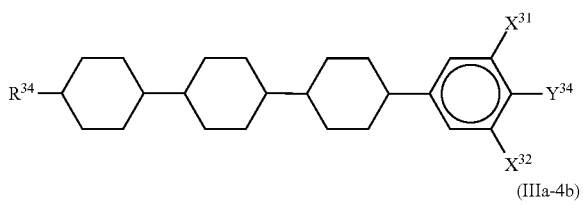
(IIIa-4a)

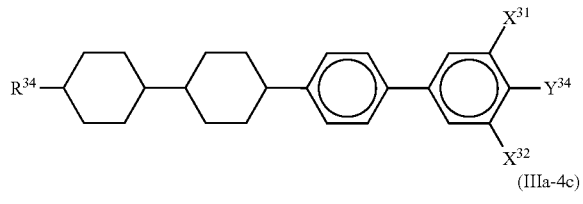
(IIIa-4b)

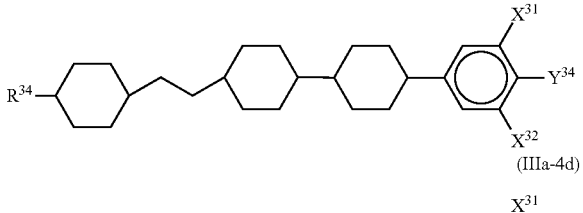
(IIIa-4c)

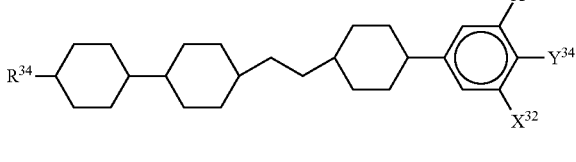
(IIIa-4d)

In general formulae (IIIa-2a) to (IIIa-4d), $R^{34}$ represents an alkyl group having 1 to 8 carbon atoms, an alkoxyl group having 1 to 8 carbon atoms, or an alkenyl group having 2 to 8 carbon atoms, $X^{31}$ and $X^{32}$ each independently represent a hydrogen atom or a fluorine atom, and $Y^{34}$ represents a cyano group, a fluorine atom, a chlorine atom, a trifluoromethyl group, a fluoromethoxy group, a difluoromethoxy group, or a trifluoromethoxy group.

Furthermore, structures represented by general formulae below are also preferable.

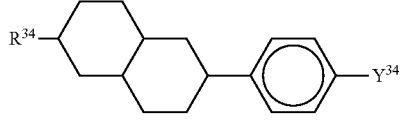

-continued

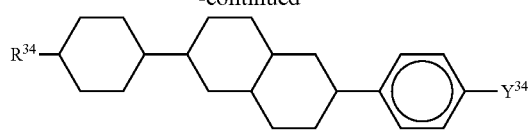
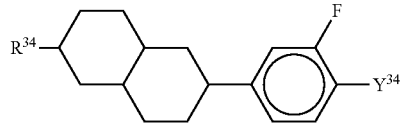
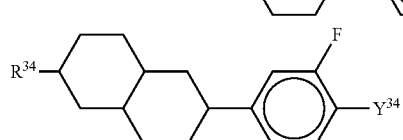
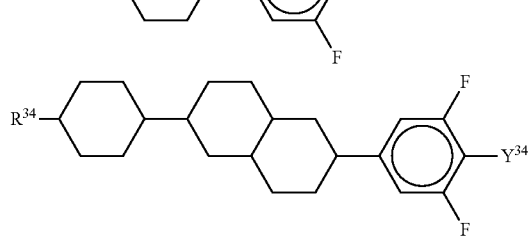

In the above general formulae, $R^{34}$ represents an alkyl group having 1 to 8 carbon atoms, an alkoxyl group having 1 to 8 carbon atoms, or an alkenyl group having 2 to 8 carbon atoms, and $Y^{34}$ represents a cyano group, a fluorine atom, a chlorine atom, a trifluoromethyl group, a fluoromethoxy group, a difluoromethoxy group, or a trifluoromethoxy group.

As for general formula (IIIb), specific structures represented by general formulae below are preferable.

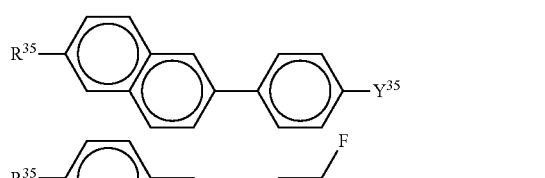
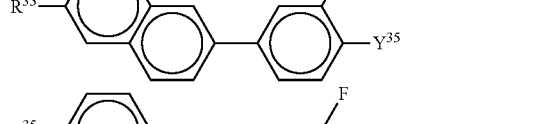
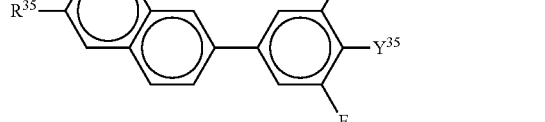
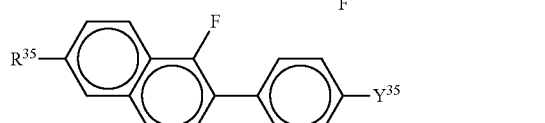
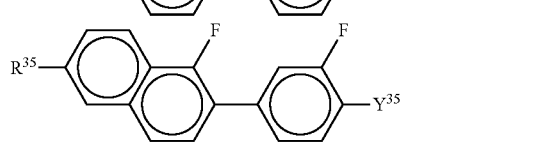
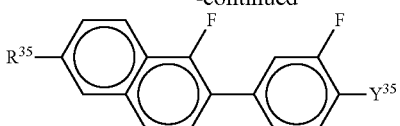
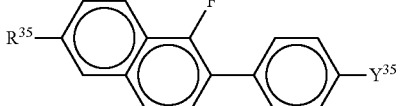
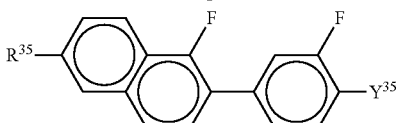
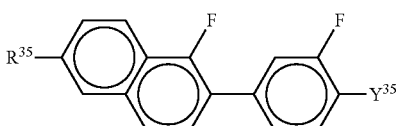
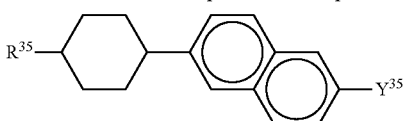
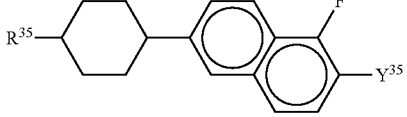
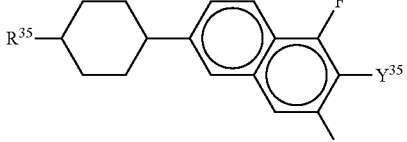
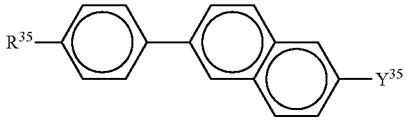
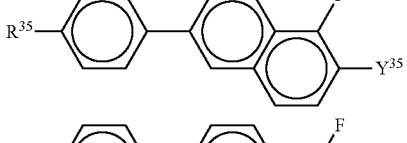
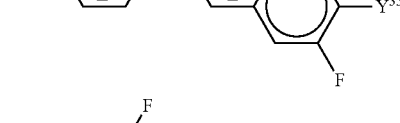

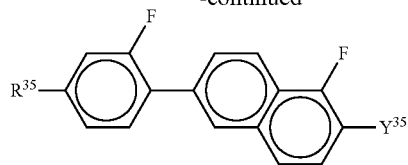
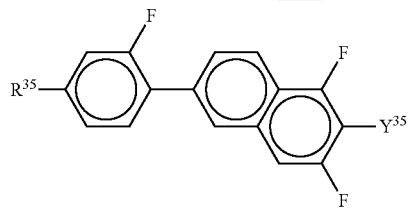
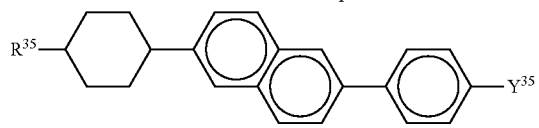
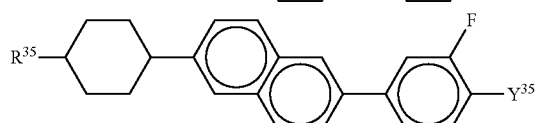
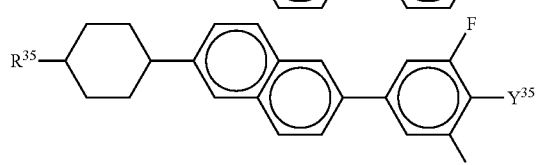
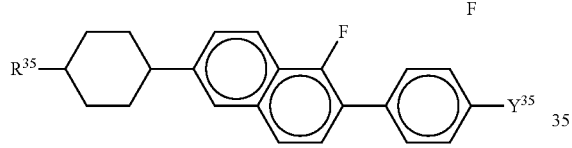
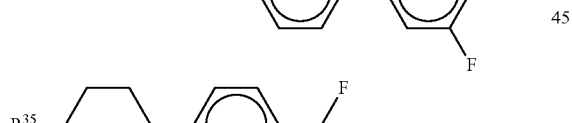
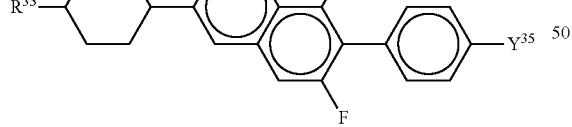
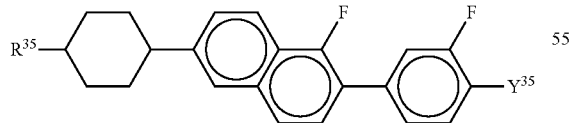
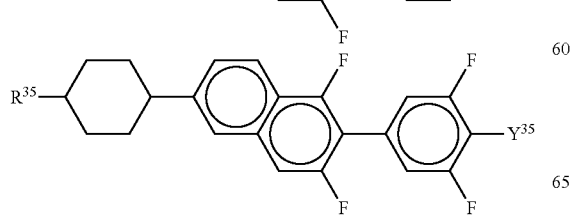
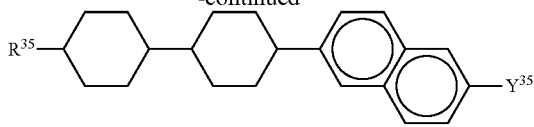
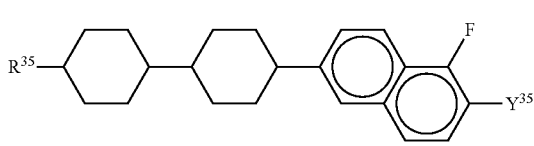
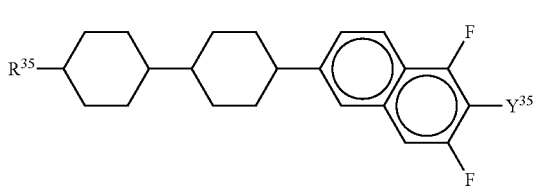
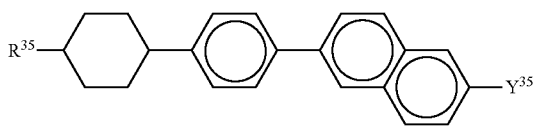
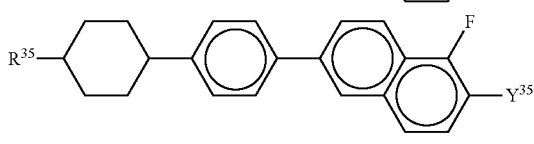
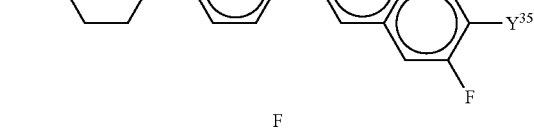
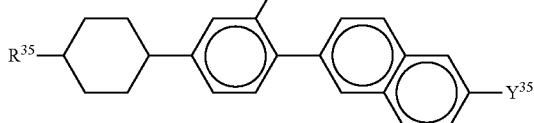
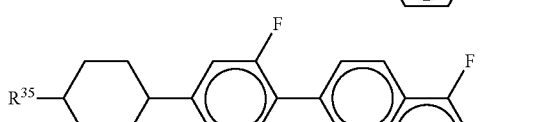
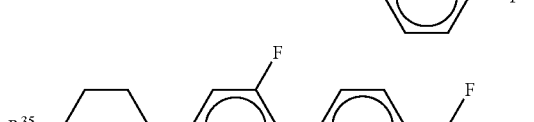
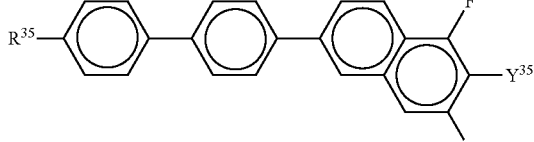

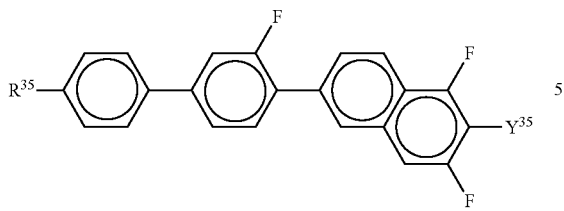

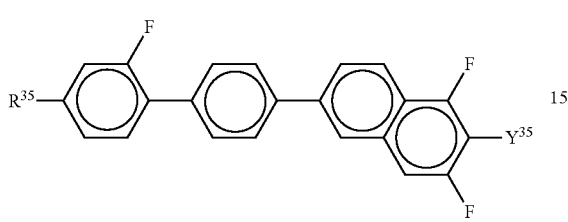

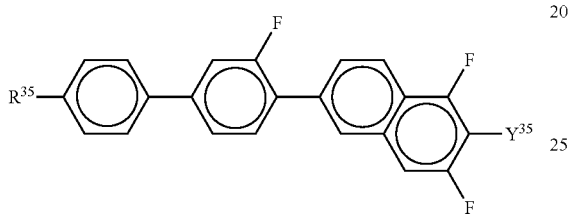

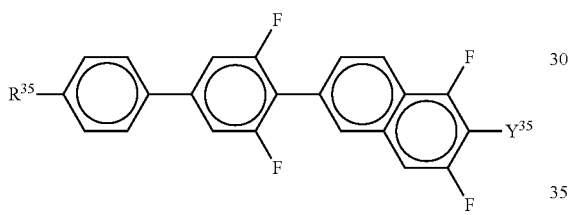

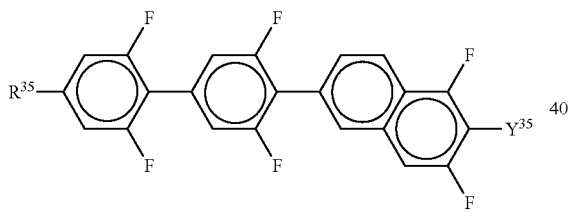

In the above general formulae, $R^{35}$ represents an alkyl group having 1 to 8 carbon atoms, an alkoxyl group having 1 to 8 carbon atoms, or an alkenyl group having 2 to 8 carbon atoms, and $Y^{35}$ represents a cyano group, a fluorine atom, a chlorine atom, a trifluoromethyl group, a fluoromethoxy group, a difluoromethoxy group, or a trifluoromethoxy group.

As for general formula (IIIc), specific structures represented by general formulae below are preferable.

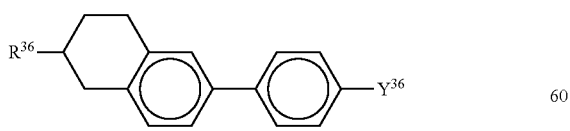

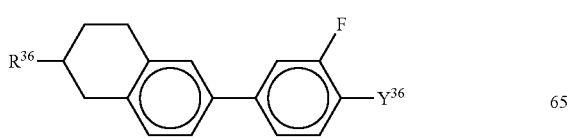

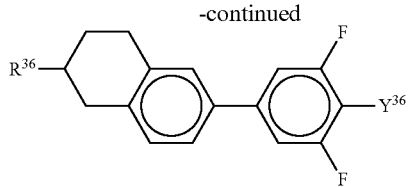

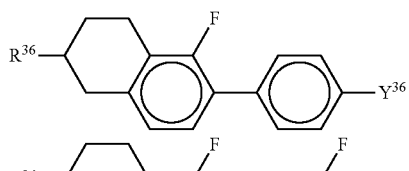

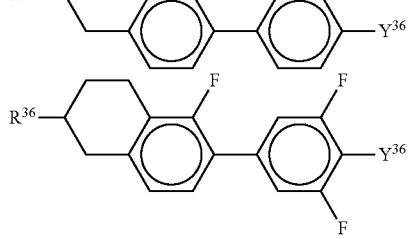

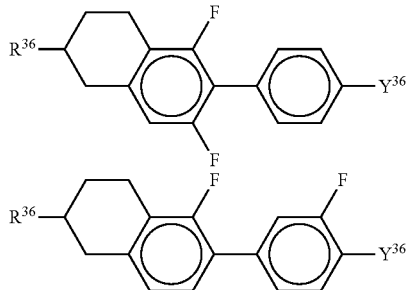

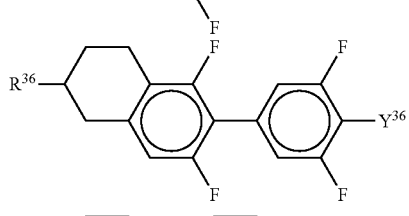

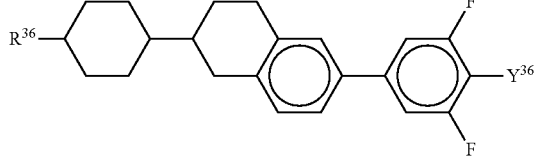

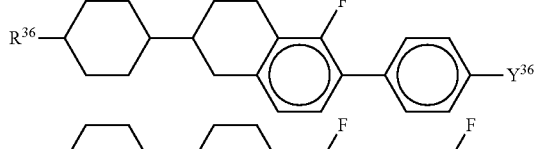

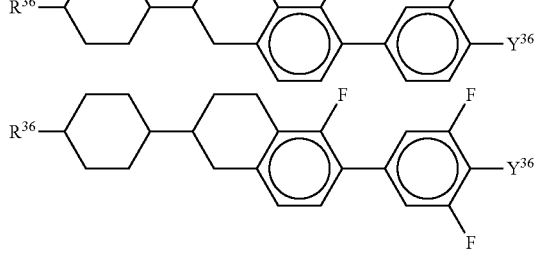

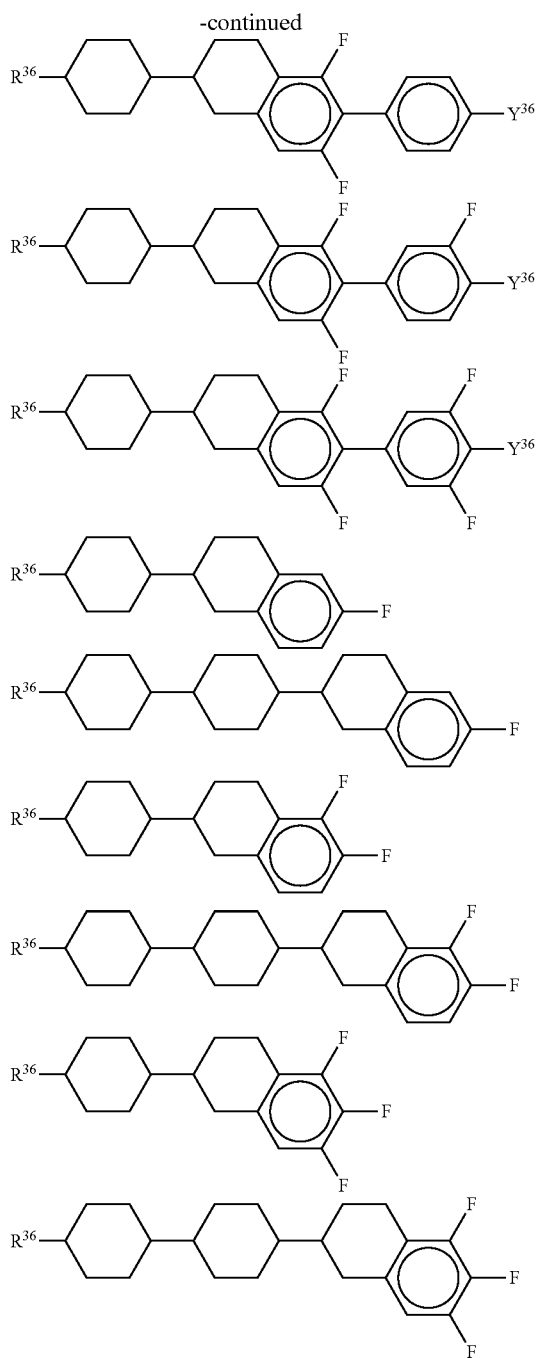

In the above general formulae, $R^{36}$ represents an alkyl group having 1 to 8 carbon atoms, an alkoxyl group having 1 to 8 carbon atoms, or an alkenyl group having 2 to 8 carbon atoms, and $Y^{36}$ represents a cyano group, a fluorine atom, a chlorine atom, a trifluoromethyl group, a fluoromethoxy group, a difluoromethoxy group, or a trifluoromethoxy group.

The polymerizable-compound-containing liquid crystal composition of the present invention may contain at least one compound selected from the group consisting of the compounds represented by general formulae (IIIa), (IIIb), and (IIIc). The polymerizable-compound-containing liquid crystal composition of the present invention contains preferably one to ten, and particularly preferably two to eight compounds selected from the group consisting of the compounds represented by general formulae (IIIa), (IIIb), and (IIIc). The lower limit of the content of the at least one compound selected from the group consisting of the compounds represented by general formulae (IIIa), (IIIb), and (IIIc) is preferably 5% by mass, more preferably 10% by mass, and particularly preferably 20% by mass. The upper limit of the content thereof is preferably 80% by mass, more preferably 70% by mass, still more preferably 60% by mass, and particularly preferably 50% by mass.

In the compounds represented by general formulae (IVa), (IVb), and (IVc), $R^{41}$, $R^{42}$, $R^{43}$, $R^{44}$, $R^{45}$, and $R^{46}$ are each independently preferably a linear alkyl group having 1 to 15 carbon atoms or an alkenyl group having 2 to 15 carbon atoms (where one methylene group or two or more non-adjacent methylene groups in the linear alkyl group or the alkenyl group may each be substituted with —O— or —S—, and one or more hydrogen atoms in the linear alkyl group or the alkenyl group may each be substituted with a fluorine atom or a chlorine atom), more preferably a linear alkyl group having 1 to 10 carbon atoms, a linear alkoxy group having 1 to 10 carbon atoms, or an alkenyl group having 2 to 10 carbon atoms, and particularly preferably a linear alkyl group having 1 to 8 carbon atoms or an alkoxy group having 1 to 8 carbon atoms. $M^{41}$, $M^{42}$, $M^{43}$, $M^{44}$, $M^{45}$, $M^{46}$, $M^{47}$, $M^{48}$, and $M^{49}$ are each independently preferably a trans-1,4-cyclohexylene group (where one methylene group or two or more non-adjacent methylene groups in this trans-1,4-cyclohexylene group may each be substituted with —O— or —S—) a 1,4-phenylene group (where one —CH= or two or more non-adjacent —CH= in this 1,4-phenylene group may each be substituted with a nitrogen atom), a 1,4-cyclohexenylene group, a 1,4-bicyclo[2.2.2]octylene group, a piperidine-2,5-diyl group, a naphthalene-2,6-diyl group, a 1,2,3,4-tetrahydronaphthalene-2,6-diyl group, or a decahydronaphthalene-2,6-diyl group (where a hydrogen atom contained in any of these groups may be substituted with a cyano group, a fluorine atom, a trifluoromethyl group, a trifluoromethoxy group, or a chlorine atom). Among these, a trans-1,4-cyclohexylene group, a 1,4-phenylene group, a 3-fluoro-1,4-phenylene group, or a 2,3-difluoro-1,4-phenylene group is more preferable, a trans-1,4-cyclohexylene group or a 1,4-phenylene group is still more preferable, and a trans-1,4-cyclohexylene group is particularly preferable. $L^{41}$, $L^{42}$, $L^{43}$, $L^{44}$, $L^{45}$, $L^{46}$, $L^{47}$, $L^{48}$, and $L^{49}$ are each independently preferably a single bond, —CH$_2$CH$_2$—, —(CH$_2$)$_4$—, —OCO—, —COO—, —OCH$_2$—, —CH$_2$O—, —OCF$_2$—, —CF$_2$O—, or —C≡C—. Among these, a single bond, —CH$_2$CH$_2$—, —OCH$_2$—, or —CH$_2$O— is more preferable. $X^{41}$, $X^{42}$, $X^{43}$, $X^{44}$, $X^{45}$, $X^{46}$, $X^{47}$ and $X^{48}$ each independently represent a hydrogen atom or a fluorine atom. G represents a methylene group or —O—. In the compounds represented by general formulae (IVa), (IVb), and (IVc), u, v, w, x, y, and z each independently represent 0, 1, or 2, but u+v, w+x, and y+z each represent 2 or less.

Among the structures formed by the combinations of the above alternatives, —CH=CH—CH=CH—, —C≡C—C≡C—, and —CH=CH—C≡C— are not preferable from the standpoint of chemical stability. Similarly, structures in which a hydrogen atom in any of these structures is substituted with a fluorine atom are also not preferable. Similarly, structures in which oxygen atoms are bonded to each other, structures in which sulfur atoms are bonded to each other, and structures in which a sulfur atom is bonded to an oxygen atom are also not preferable. Similarly, structures in which nitrogen atoms are bonded to each other, structures in which a nitrogen atom is bonded to an oxygen atom, and structures in which a nitrogen atom is bonded to a sulfur atom are also not preferable.

Specifically, the compound represented by general formula (IVa) preferably represents a structure represented by general formula (IVa-1):

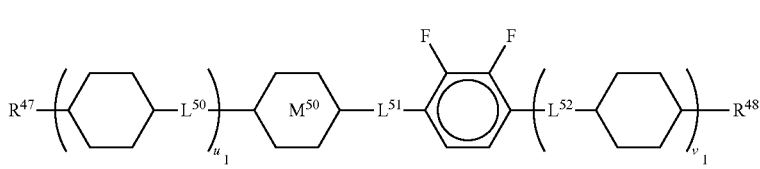
(IVa-1)

wherein $R^{47}$ and $R^{48}$ each independently represent an alkyl group having 1 to 8 carbon atoms, an alkoxyl group having 1 to 8 carbon atoms, or an alkenyl group having 2 to 8 carbon atoms, $L^{50}$, $L^{51}$, and $L^{52}$ each independently represent a single bond, —$CH_2CH_2$—, —$(CH_2)_4$—, —$OCH_2$—, —$CH_2O$—, —$OCF_2$—, —$CF_2O$—, or —C≡C—, $M^{50}$ represents a 1,4-phenylene group or a trans-1,4-cyclohexylene group, and $u_1$ and $v_1$ each independently represent 0 or 1.

More specifically, structures represented by general formulae (IVa-2a) to (IVa-3i) below are preferable.

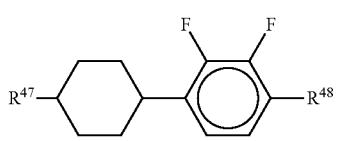
(IVa-2a)

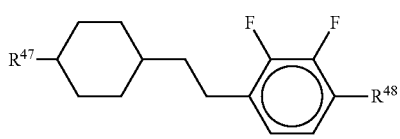
(IVa-2b)

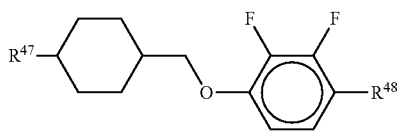
(IVa-2c)

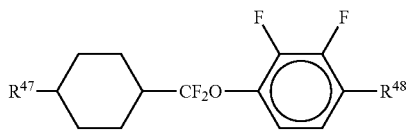
(IVa-2d)

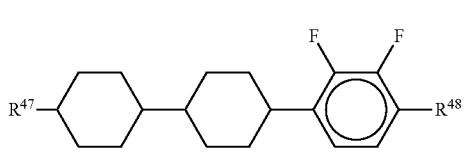
(IVa-3a)

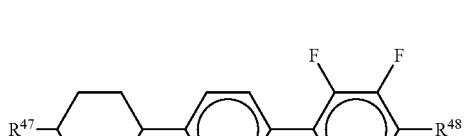
(IVa-3b)

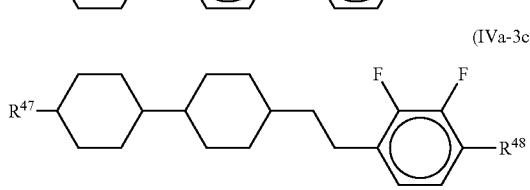
(IVa-3c)

-continued

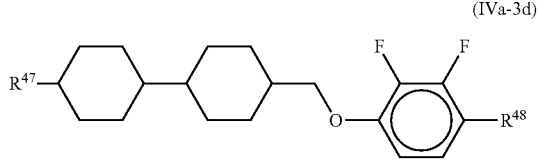
(IVa-3d)

(IVa-3e)

(IVa-3f)

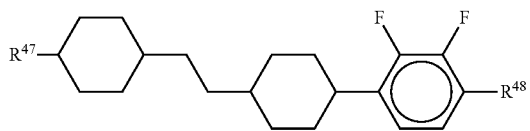
(IVa-3g)

(IVa-3h)

(IVa-3i)

In general formulae (IVa-2a) to (IVa-3i), $R^{47}$ and $R^{48}$ each independently represent an alkyl group having 1 to 8 carbon atoms, an alkoxyl group having 1 to 8 carbon atoms, or an alkenyl group having 2 to 8 carbon atoms. More preferably, $R^{47}$ and $R^{48}$ each independently represent an alkyl group having 1 to 8 carbon atoms or an alkoxyl group having 1 to 8 carbon atoms.

Specifically, the compound represented by general formula (IVb) preferably represents a structure represented by general formula (IVb-1):

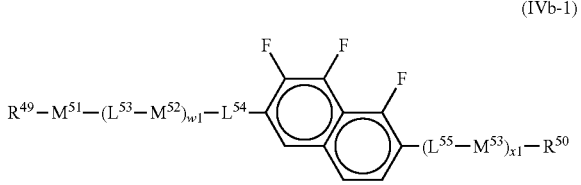

(IVb-1)

wherein $R^{49}$ and $R^{50}$ each independently represent an alkyl group having 1 to 8 carbon atoms, an alkoxyl group having 1 to 8 carbon atoms, or an alkenyl group having 2 to 8 carbon atoms, $L^{53}$, $L^{54}$, and $L^{55}$ each independently represent a single bond, —$CH_2CH_2$—, —$(CH_2)_4$—, —$OCH_2$—, —$CH_2O$—, —$OCF_2$—, $CF_2O$—, or —C≡C—, $M^{51}$, $M^{52}$, and $M^{53}$ each represent a 1,4-phenylene group or a trans-1,4-cyclohexylene group, and w1 and x1 each independently represent 0, 1, or 2 but w1+x1 represents 2 or less.

More specifically, structures represented by general formulae (IVb-2a) to (IVb-3f) below are preferable.

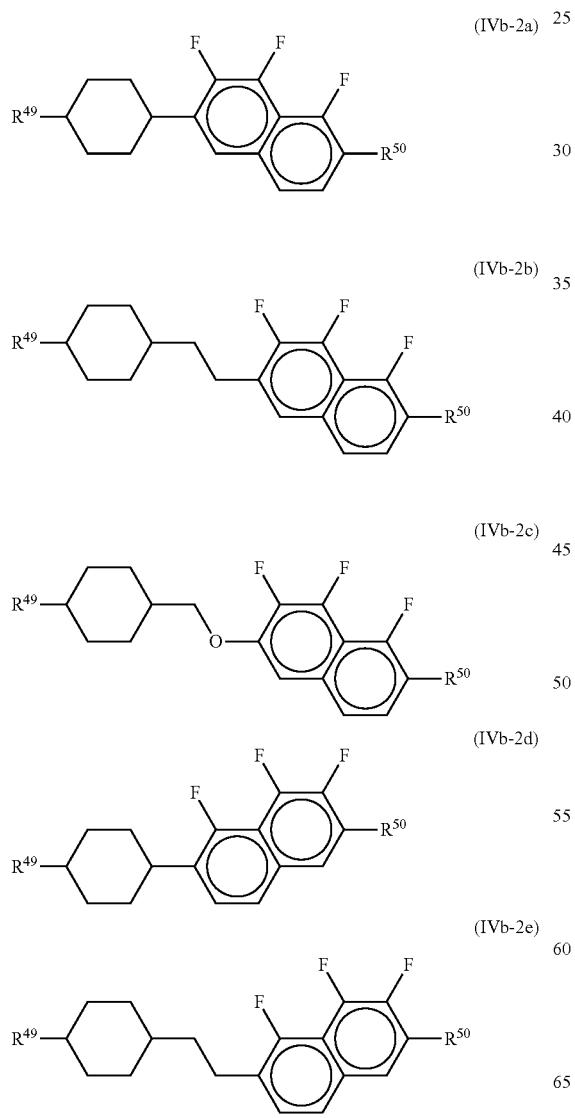

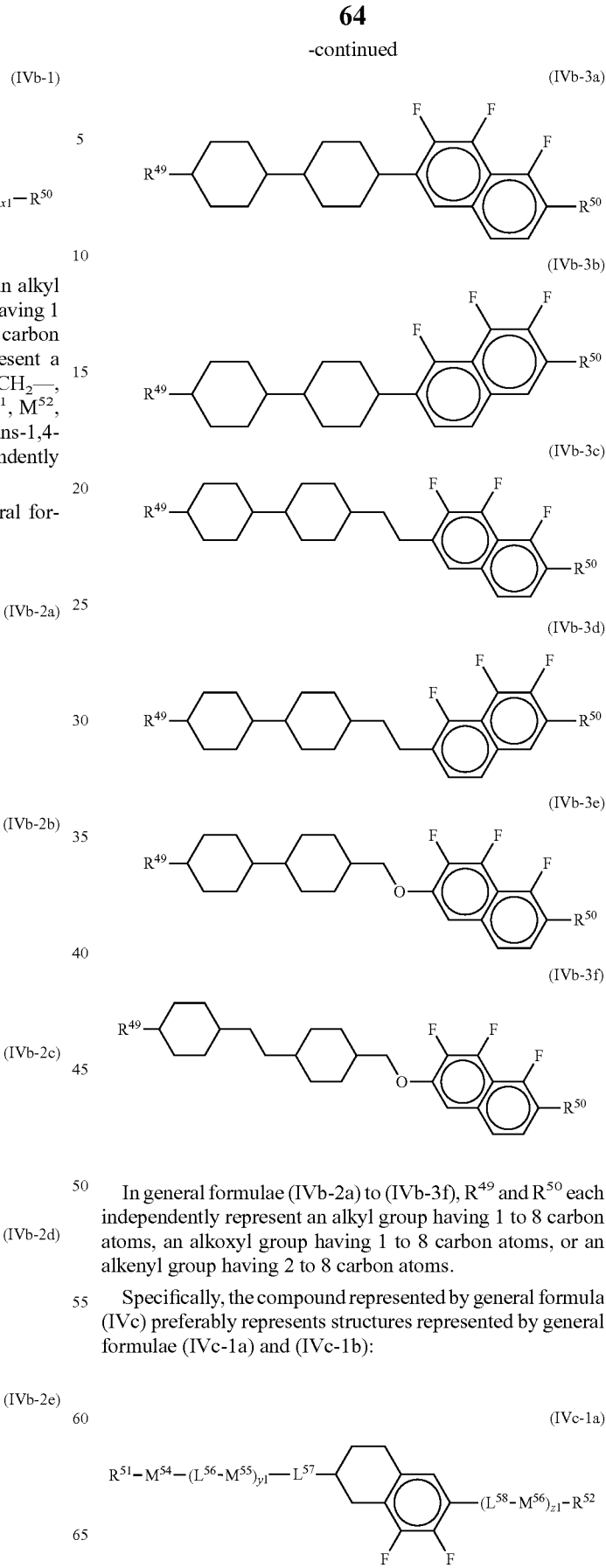

In general formulae (IVb-2a) to (IVb-3f), $R^{49}$ and $R^{50}$ each independently represent an alkyl group having 1 to 8 carbon atoms, an alkoxyl group having 1 to 8 carbon atoms, or an alkenyl group having 2 to 8 carbon atoms.

Specifically, the compound represented by general formula (IVc) preferably represents structures represented by general formulae (IVc-1a) and (IVc-1b):

(IVc-1b)

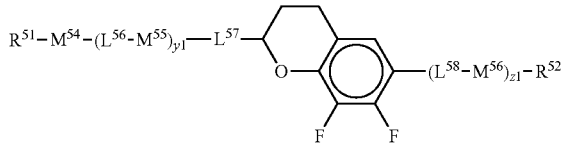

(IVc-2g)

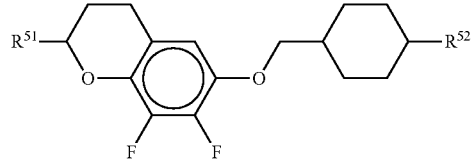

wherein $R^{51}$ and $R^{52}$ each independently represent an alkyl group having 1 to 8 carbon atoms, an alkoxyl group having 1 to 8 carbon atoms, or an alkenyl group having 2 to 8 carbon atoms, $L^{56}$, $L^{57}$, and $L^{58}$ each independently represent a single bond, —CH$_2$CH$_2$—, —(CH$_2$)$_4$—, —OCH$_2$—, —CH$_2$O—, —OCF$_2$—, —CF$_2$O—, or —C≡C—, $M^{54}$, $M^{55}$, and $M^{56}$ each represent a 1,4-phenylene group or a trans-1,4-cyclohexylene group, and y1 and z1 each independently represent 0, 1, or 2 but y1+z1 represents 2 or less.

More specifically, structures represented by general formulae (IVc-2a) to (IVc-2g) below are preferable.

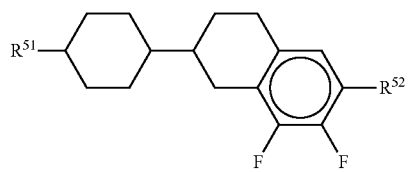
(IVc-2a)

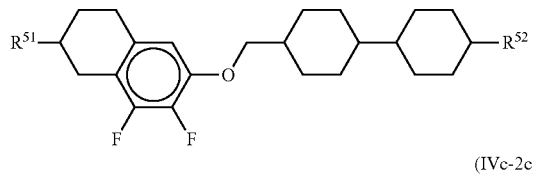
(IVc-2b)

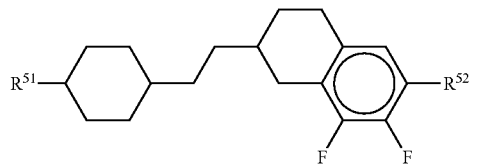
(IVc-2c)

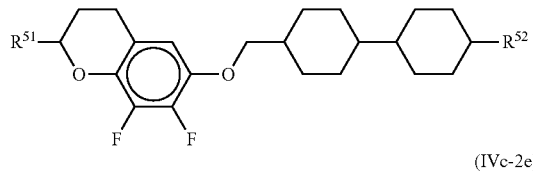
(IVc-2d)

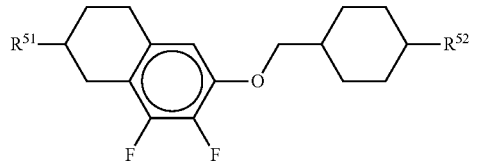
(IVc-2e)

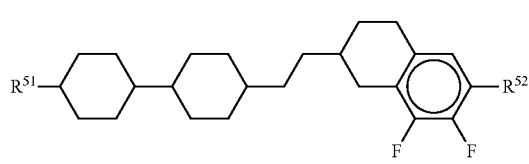
(IVc-2f)

In general formulae (IVc-2a) to (IVc-2g), $R^{51}$ and $R^{52}$ each independently represent an alkyl group having 1 to 8 carbon atoms, an alkoxyl group having 1 to 8 carbon atoms, or an alkenyl group having 2 to 8 carbon atoms.

The polymerizable-compound-containing liquid crystal composition of the present invention contains at least one compound selected from the group consisting of the compounds represented by general formulae (IIIa), (IIIb, and (IIIc) or at least one compound selected from the group consisting of the compounds represented by general formulae (IVa), (IVb), and (IVc), these compounds being used as the third component. The liquid crystal composition of the present invention contains preferably two to ten, and particularly preferably two to eight compounds selected from the group consisting of the compounds represented by general formulae (IIIa), (IIIb), and (Mc) or the compounds represented by general formulae (IVa), (IVb), and (IVc). The lower limit of the content of the at least one compound selected from the group consisting of the compounds represented by general formulae (IIIa), (IIIb), and (IIIc) or the compounds represented by general formulae (IVa), (IVb), and (IVc) is preferably 5% by mass, more preferably 10% by mass, and particularly preferably 20% by mass. The upper limit of the content thereof is preferably 80% by mass, more preferably 70% by mass, still more preferably 60% by mass, and particularly preferably 50% by mass.

In the liquid crystal composition of the present invention, a birefringence Δn is preferably in the range of 0.08 to 0.25.

In the liquid crystal composition of the present invention, a liquid crystal composition having a positive dielectric anisotropy Δε or a negative dielectric anisotropy Δε can be appropriately selected and used depending on the display mode of a liquid crystal display element. In a liquid crystal display element of the multi-domain vertical alignment (MVA) mode, a liquid crystal composition having a negative dielectric anisotropy Δε is used. In such a case, the dielectric anisotropy Δε is preferably −1 or less, and more preferably −2 or less.

The liquid crystal composition of the present invention has a wide liquid crystal phase temperature range (i.e., the absolute value of a difference between the liquid crystal phase lower limit temperature and the liquid crystal phase upper limit temperature). The liquid crystal phase temperature range is preferably 100° C. or more, and more preferably 120° C. or more. The liquid crystal phase upper limit temperature is preferably 70° C. or higher, and more preferably 80° C. or higher. Furthermore, the liquid crystal phase lower limit temperature is preferably −20° C. or lower, and more preferably −30° C. or lower.

The liquid crystal composition of the present invention may contain a commonly used nematic liquid crystal, smectic liquid crystal, cholesteric liquid crystal, or the like besides the compounds described above.

According to the polymerizable-compound-containing liquid crystal composition of the present invention, polymerization proceeds even in the absence of a polymerization initiator. However, the liquid crystal composition of the present invention may contain a polymerization initiator in order to accelerate the polymerization. Examples of the polymerization initiator include benzoin ethers, benzophenones, acetophenones, benzyl ketals, and acylphosphine oxides.

In order to improve the storage stability of the liquid crystal composition of the present invention, a stabilizer may be added to the liquid crystal composition. Examples of the stabilizer that can be used include hydroquinones, hydroquinone monoalkyl ethers, tertiary butyl catechols, pyrogallols, thiophenols, nitro compounds, β-naphthylamines, β-naphthols, and nitroso compounds. When the stabilizer is used, the amount of stabilizer added is preferably in the range of 0.005% to 1% by mass, more preferably 0.02% to 0.5% by mass, and particularly preferably 0.03% to 0.1% by mass relative to the liquid crystal composition.

To the liquid crystal composition of the present invention, a liquid crystal alignment capability is provided by polymerization of the polymerizable compound contained in the liquid crystal composition. The liquid crystal composition of the present invention is used in a liquid crystal display element in which the amount of transmitted light is controlled by using the birefringence of the liquid crystal composition. The liquid crystal composition of the present invention can be useful for various liquid crystal display elements, such as an active-matrix liquid crystal display element (AM-LCD), a twisted nematic liquid crystal display element (TN-LCD), a super twisted nematic liquid crystal display element (STN-LCD), an optically compensated birefringence liquid crystal display element (OCB-LCD), and an in-plane-switching liquid crystal display element (IPS-LCD). The liquid crystal composition of the present invention is particularly useful for an AM-LCD, and can be used in a transmissive or reflective liquid crystal display element.

Two substrates of a liquid crystal cell used in a liquid crystal display element may be composed of glass or a flexible transparent material such as a plastic material. One of the substrates may be composed of an opaque material such as silicon. A transparent substrate having a transparent electrode layer can be produced by, for example, sputtering indium tin oxide (ITO) on a transparent substrate such as a glass plate.

A color filter can be produced by, for example, a pigment dispersion method, a printing method, an electrodeposition method, or a staining method. A method for producing a color filter will be described by taking the pigment dispersion method as an example. First, a curable coloring composition for a color filter is applied onto the above-mentioned transparent substrate, and is then patterned. The curable coloring composition is then cured by heat or light irradiation. These steps are performed for each of three colors of red, green, and blue. Thus, pixel portions for the color filter can be formed. Furthermore, pixel electrodes each including an active element such as a thin-film transistor (TFT), a thin-film diode, or a metal-insulator-metal specific resistance element may be provided on the substrate.

The substrates are arranged so as to face each other such that the transparent electrode layer is disposed inside. In this step, the gap between the substrates may be adjusted by providing a spacer therebetween. In this case, the gap is preferably adjusted so that the thickness of a light-modulating layer obtained is in the range of 1 to 100 μm, and more preferably 1.5 to 10 μm. When a polarizer is used, it is preferable to adjust the product ($\Delta n \times d$) of the birefringence Δn of liquid crystals and a cell thickness d so that the maximum contrast is obtained. When two polarizers are provided, the adjustment may also be performed so that a satisfactory angle of view and contrast can be obtained by adjusting the polarizing axis of each of the polarizers. Furthermore, a retardation film for widening the angle of view may also be used. Examples of the spacer include glass particles, plastic particles, alumina particles, and photoresist materials. Subsequently, a sealant composed of an epoxy thermosetting composition or the like is applied onto the substrate by screen printing so as to form a liquid-crystal injection port. The substrates are then bonded to each other, and the sealant is thermally cured by heating.

As a method for interposing the liquid crystal composition between the two substrates, a commonly used vacuum injection method, a one-drop-fill (ODF) method, or the like can be employed.

As a method for polymerizing the polymerizable compound, a method in which polymerization is conducted by applying an active energy ray such as ultraviolet light or an electron beam is preferable because rapid progress of polymerization is desirable. In the case where ultraviolet light is used, either a polarized light source or an unpolarized light source may be used. When polymerization is conducted in a state in which the liquid crystal composition is interposed between two substrates, it is necessary that at least a substrate disposed on the irradiation surface side have transparency appropriate for the active energy ray. Also, only specific portions may be polymerized using a mask during light irradiation, and unpolymerized potions may then be polymerized by further applying an active energy ray while changing the alignment state of the unpolymerized potions by changing a condition such as the electric field, the magnetic field, or the temperature. In particular, when ultraviolet exposure is performed, the ultraviolet exposure is preferably performed while applying an AC electric field to the polymerizable-compound-containing liquid crystal composition. As for the AC electric field applied, a frequency of 10 Hz to 10 kHz is preferable, a frequency of 60 Hz to 10 kHz is more preferable, and the voltage is selected in accordance with a desired pretilt angle of the liquid crystal display element. That is, the pretilt angle of the liquid crystal display element can be controlled by the voltage applied. In a liquid crystal display element of the MVA mode, it is preferable to control the pretilt angle to 80 to 89 degrees from the standpoint of alignment stability and the contrast.

The temperature during the irradiation is preferably within a temperature range in which the liquid crystal state of the liquid crystal composition of the present invention is maintained. Polymerization is preferably conducted at a temperature close to room temperature, that is, typically at a temperature in the range of 15° C. to 35° C. A metal halide lamp, a high-pressure mercury lamp, an ultrahigh-pressure mercury lamp, or the like can be used as a lamp for generating ultraviolet light. As for the wavelength of ultraviolet light radiated, it is preferable to radiate ultraviolet light in a wavelength range which is not included in an absorption wavelength range of the liquid crystal composition. Preferably, a certain wavelength range of ultraviolet light is cutoff and used, as required. The intensity of ultraviolet light irradiated is preferably 0.1 mW/cm$^2$ to 100 W/cm$^2$, and more preferably 2 mW/cm$^2$ to 50 W/cm$^2$. The amount of energy of the ultraviolet light irradiated can be appropriately adjusted, but is preferably 1 mJ/cm$^2$ to 500 J/cm$^2$, and more preferably 100 mJ/cm$^2$ to 200 J/cm$^2$. During the irradiation of ultraviolet light, the intensity of the ultraviolet light may be changed. The ultraviolet-irradiation time is appropriately selected in accordance with the intensity of the ultraviolet light irradiated, but is preferably 10 to 3,600 seconds.

EXAMPLES

The present invention will be described in more detail by way of Examples, but the present invention is not limited to these Examples. It should be noted that "%" in compositions of Examples and Comparative Example described below represents "% by mass" unless otherwise stated.

Physical properties of liquid crystal compositions are represented as follows:

$T_{N-I}$ (° C.): Nematic phase-isotropic liquid phase transition temperature (liquid crystal phase upper limit temperature)
$\Delta\epsilon$: Dielectric anisotropy
$\Delta n$: Birefringence
$V_{th}$ (V): An applied voltage with which the transmittance is changed by 10% when a square wave with a frequency of 1 kHz is applied (threshold voltage)

Method for Measuring Amount of Residual Monomer After UV Curing

A liquid crystal composition was injected into a liquid crystal cell, and the cell was then irradiated with ultraviolet (UV) light to polymerize a polymerizable compound. Subsequently, the liquid crystal cell was disassembled, and an acetonitrile solution of an elution component containing liquid crystal materials, a polymerized product, and an unpolymerized polymerizable compound was prepared. This solution was analyzed by high-performance liquid chromatography (column: reversed-phase nonpolar column, developing solvent: acetonitrile) to measure the peak area of each component. The amount of residual polymerizable compound was determined from the ratio of the peak area of the unpolymerized polymerizable compound to the peak area of a liquid crystal material used as an indicator. The amount of residual monomer was determined from this value and the amount of polymerizable compound initially added. The detection limit of the amount of residual polymerizable compound was 1,000 ppm.

Example 1

A liquid crystal composition LC-1 containing at least one compound selected from the compounds represented by general formula (II) and at least one compound selected from the compounds represented by general formulae (IIIa), (IIIb), and (IIIc) or at least one compound selected from the compounds represented by general formulae (IVa), (IVb), and (IVc) was prepared. The compounds constituting the liquid crystal composition LC-1 and the proportions of the compounds are as follows.

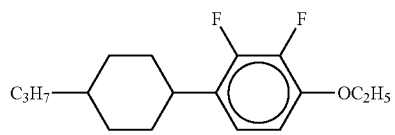

10%

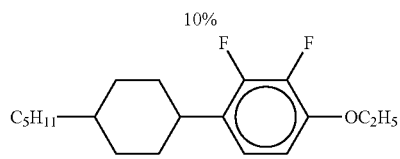

10%

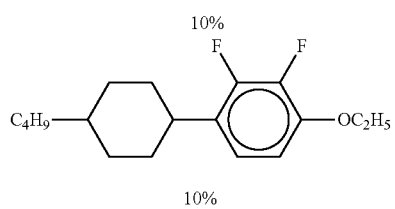

10%

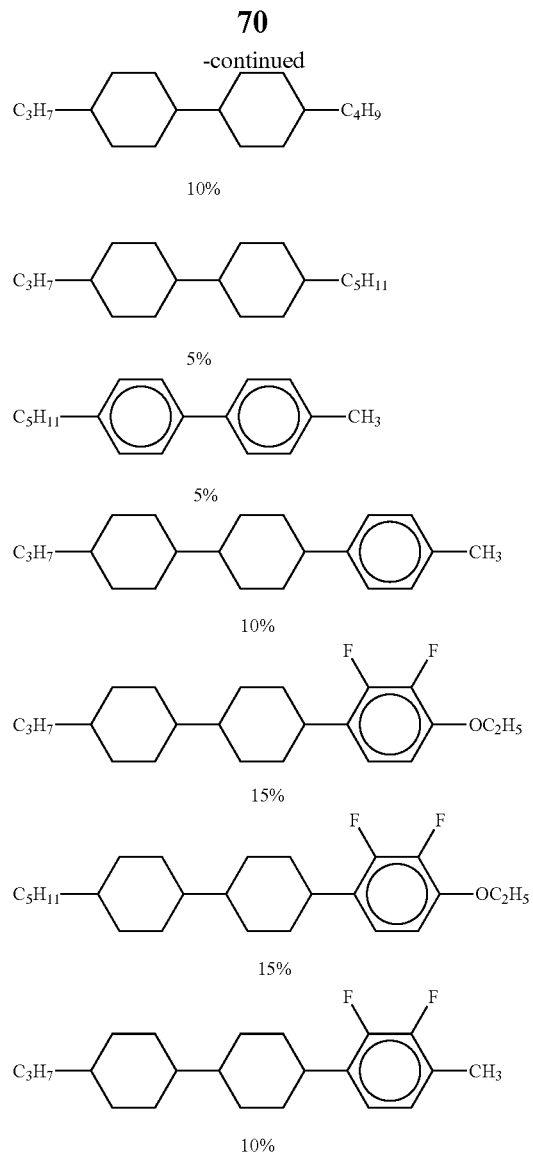

Table 1 shows the physical properties of the liquid crystal composition LC-1.

TABLE 1

| $T_{N-I}$ (° C.) | 80 |
|---|---|
| $\Delta\epsilon$ | −3.5 |
| $\Delta n$ | 0.087 |

A polymerizable-compound-containing liquid crystal composition CLC-1 was prepared by adding 0.3% of a polymerizable compound represented by formula (I-8-a) below to 99.7% of the liquid crystal composition LC-1 and uniformly dissolving the polymerizable compound.

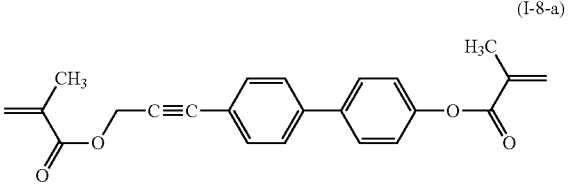 [SMILES: C=C(C)C(=O)OCC#Cc1ccc(-c2ccc(OC(=O)C(=C)C)cc2)cc1]

(I-8-a)

The physical properties of the polymerizable-compound-containing liquid crystal composition CLC-1 were substantially the same as those of the liquid crystal composition LC-1. Thus, it was found that the polymerizable compound represented by formula (I-8-a) did not degrade the liquid crystal properties of the liquid crystal composition added thereto. This polymerizable-compound-containing liquid crystal composition CLC-1 was stored in a cold place (at −20° C.) for one week. Consequently, deposition or the like did not occur. Thus, it was found that the polymerizable compound represented by formula (I-8-a) had a good compatibility with other liquid crystal compounds.

The polymerizable-compound-containing liquid crystal composition CLC-1 was injected, by a vacuum injection method, into a cell having an ITO electrode layer, the cell having a cell gap of 3.5 μm and including polyimide alignment layers that induce a homeotropic alignment. The pretilt angle of this cell was measured (by a crystal rotation method), and the liquid crystal cell was then irradiated with ultraviolet light using a high-pressure mercury lamp through a filter that cuts off ultraviolet light of 320 nm or less while applying a square wave of 1.8 V at a frequency of 1 kHz. The irradiation intensity on the surface of the cell was adjusted to 10 mW/cm$^2$, and the irradiation was performed for 600 seconds, thus obtaining a homeotropic-alignment liquid crystal display element in which the polymerizable compound in the polymerizable-compound-containing liquid crystal composition CLC-1 was polymerized. Table 2 shows the pretilt angles of the element measured before and after the ultraviolet irradiation and an electro-optic property of the element.

TABLE 2

| | |
|---|---|
| Pretilt angle before ultraviolet irradiation (°) | 89.6 |
| Pretilt angle after ultraviolet irradiation (°) | 87.4 |
| $V_{th}$ (V) | 1.65 |

The above results of the pretilt angles show that an alignment-controlling force acting on the liquid crystal compounds was generated by polymerization of the polymerizable compound, and a homeotropic-alignment liquid crystal display element was obtained in which the pretilt angle was fixed in a state where liquid crystal molecules were tilted at 2.2 degrees with respect to the vertical direction.

Furthermore, the content of the unpolymerized polymerizable compound represented by formula (I-8-a) in the element was analyzed by liquid chromatography, but the unpolymerized polymerizable compound was not detected. Thus, it was confirmed that the polymerizable compound represented by formula (I-8-a) could be polymerized without using a polymerization initiator, and that the content of the unpolymerized product remaining after the polymerization was equal to or less than the detection limit.

Comparative Example 1

A polymerizable-compound-containing liquid crystal composition CLC-A was prepared by adding 0.3% of a polymerizable compound represented by formula (A) to 99.7% of the liquid crystal composition LC-1 and uniformly dissolving the polymerizable compound.

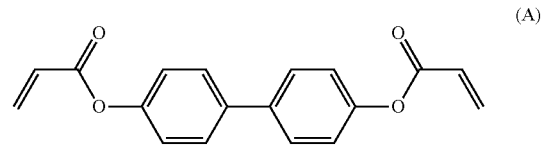 [SMILES: C=CC(=O)Oc1ccc(-c2ccc(OC(=O)C=C)cc2)cc1]

(A)

The polymerizable-compound-containing liquid crystal composition CLC-A was injected, by a vacuum injection method, into a cell having an ITO electrode layer, the cell having a cell gap of 3.5 μm and including polyimide alignment layers that induce a homeotropic alignment. The pretilt angle of this cell was measured, and the liquid crystal cell was then irradiated with ultraviolet light using a high-pressure mercury lamp through a filter that cuts off ultraviolet light of 320 nm or less while applying a square wave of 1.8 V at a frequency of 1 kHz. The irradiation intensity on the surface of the cell was adjusted to 10 mW/cm$^2$, and the irradiation was performed for 600 seconds, thus obtaining a homeotropic-alignment liquid crystal display element in which the polymerizable compound in the polymerizable-compound-containing liquid crystal composition CLC-A was polymerized. The pretilt angle after the ultraviolet irradiation of the element was 89.5 degrees whereas the pretilt angle before the ultraviolet irradiation was 89.6 degrees. Thus, the pretilt angle was not changed, and the liquid crystal molecules were not substantially tilted with respect to the vertical direction. The content of the polymerizable compound represented by formula (A) in the element was analyzed by liquid chromatography. Consequently, the content of the polymerizable compound was not changed as compared with that before ultraviolet irradiation. Thus, the polymerization of the polymerizable compound represented by formula (A) did not proceed. In addition, this polymerizable-compound-containing liquid crystal composition CLC-A was stored in a cold place (at −20° C.) for one week. Consequently, deposition occurred. Thus, it was found that this polymerizable compound represented by formula (A) had a poor compatibility with other liquid crystal compounds.

Example 2

A polymerizable-compound-containing liquid crystal composition CLC-2 was prepared by adding 0.5% of the polymerizable compound represented by formula (I-8-a) to 99.5% of the liquid crystal composition LC-1 and uniformly dissolving the polymerizable compound. The polymerizable-compound-containing liquid crystal composition CLC-2 was injected, by a vacuum injection method, into a cell having an ITO electrode layer, the cell having a cell gap of 3.5 μm and including polyimide alignment layers that induce a homeotropic alignment. The pretilt angle of this cell was measured, and the liquid crystal cell was then irradiated with ultraviolet light using a high-pressure mercury lamp through a filter that cuts off ultraviolet light of 320 nm or less while applying a square wave of 1.8 V at a frequency of 1 kHz. The irradiation intensity on the surface of the cell was adjusted to 10 mW/cm$^2$, and the irradiation was performed for 600 seconds, thus obtaining a homeotropic-alignment liquid crystal display element in which the polymerizable compound in the polymerizable-compound-containing liquid crystal composition CLC-2 was polymerized. The pretilt angle after the ultraviolet irradiation of the element was 86.5 degrees whereas the pretilt angle before the ultraviolet irradiation was 89.5 degrees. Thus, the pretilt angle of the liquid crystal molecules was fixed in a state in which the liquid crystal molecules were tilted with respect to the vertical direction. The content of the unpolymerized polymerizable compound represented by formula (I-8-a) in the element was analyzed by liquid chromatography. The content of the unpolymerized polymerizable compound was equal to or less than the detection limit. Thus, it was confirmed that the polymerizable compound represented by formula (I-8-a) could be polymerized without using a polymerization initiator, and that the content of the unpolymerized product remaining after the polymerization was equal to or less than the detection limit.

Example 3

A polymerizable-compound-containing liquid crystal composition CLC-3 was prepared by adding 0.3% of a polymerizable compound represented by formula (I-12-a) to 99.7% of the liquid crystal composition LC-1 and uniformly dissolving the polymerizable compound.

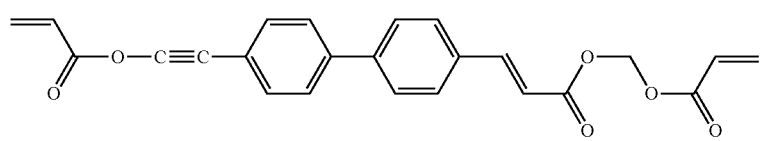

(I-12-a)

It was found that the polymerizable compound represented by formula (I-12-a) did not degrade the liquid crystal properties of the liquid crystal composition added thereto. This polymerizable-compound-containing liquid crystal composition CLC-3 was stored in a cold place (at −20° C.) for one week. Consequently, deposition or the like did not occur. Thus, it was found that the polymerizable compound represented by formula (I-12-a) had a good compatibility with other liquid crystal compounds. The polymerizable-compound-containing liquid crystal composition CLC-3 was injected, by a vacuum injection method, into a cell having an ITO electrode layer, the cell having a cell gap of 3.5 μm and including polyimide alignment layers that induce a homeotropic alignment. The pretilt angle of this cell was measured, and the liquid crystal cell was then irradiated with ultraviolet light using a high-pressure mercury lamp through a filter that cuts off ultraviolet light of 320 nm or less while applying a square wave of 1.8 V at a frequency of 1 kHz. The irradiation intensity on the surface of the cell was adjusted to 10 mW/cm$^2$, and the irradiation was performed for 600 seconds, thus obtaining a homeotropic-alignment liquid crystal display element in which the polymerizable compound in the polymerizable-compound-containing liquid crystal composition CLC-3 was polymerized. The pretilt angle after the ultraviolet irradiation of the element was 87.0 degrees whereas the pretilt angle before the ultraviolet irradiation was 89.8 degrees. Thus, the pretilt angle of the liquid crystal molecules was fixed in a state in which the liquid crystal molecules were tilted with respect to the vertical direction. The content of the unpolymerized polymerizable compound represented by formula (I-12-a) in the element was analyzed by liquid chromatography. The content of the unpolymerized polymerizable compound was equal to or less than the detection limit. Thus, it was confirmed that the polymerizable compound represented by formula (I-12-a) could be polymerized without using a polymerization initiator, and that the content of the unpolymerized product remaining after the polymerization was equal to or less than the detection limit.

Example 4

A polymerizable-compound-containing liquid crystal composition CLC-4 was prepared by adding 0.3% of a polymerizable compound represented by formula (I-70-a) to 99.7%, of the liquid crystal composition LC-1 and uniformly dissolving the polymerizable compound.

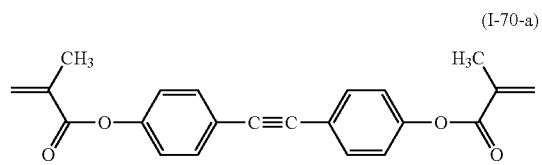 [SMILES: C=C(C)C(=O)Oc1ccc(C#Cc2ccc(OC(=O)C(=C)C)cc2)cc1]

(I-70-a)

It was found that the polymerizable compound represented by formula (I-70-a) did not degrade the liquid crystal properties of the liquid crystal composition added thereto. This polymerizable-compound-containing liquid crystal composition CLC-4 was stored in a cold place (at −20° C.) for one week. Consequently, deposition or the like did not occur. Thus, it was found that the polymerizable compound represented by formula (I-70-a) had a good compatibility with other liquid crystal compounds. The polymerizable-compound-containing liquid crystal composition CLC-4 was injected, by a vacuum injection method, into a cell having an ITO electrode layer, the cell having a cell gap of 3.5 μm and including polyimide alignment layers that induce a homeotropic alignment. The pretilt angle of this cell was measured, and the liquid crystal cell was then irradiated with ultraviolet light using a high-pressure mercury lamp through a filter that cuts off ultraviolet light of 320 nm or less while applying a square wave of 1.8 V at a frequency of 1 kHz. The irradiation intensity on the surface of the cell was adjusted to 10 mW/cm$^2$, and the irradiation was performed for 600 seconds, thus obtaining a homeotropic-alignment liquid crystal display element in which the polymerizable compound in the polymerizable-compound-containing liquid crystal composition CLC-4 was polymerized. The pretilt angle after the ultraviolet irradiation of the element was 87.5 degrees whereas the pretilt angle before the ultraviolet irradiation was 89.7 degrees. Thus, the pretilt angle of the liquid crystal molecules was fixed in a state in which the liquid crystal molecules were tilted with respect to the vertical direction. The content of the unpolymerized polymerizable compound represented by formula (I-70-a) in the element was analyzed by liquid chromatography. The content of the unpolymerized polymerizable compound was equal to or less than the detection limit. Thus, it was confirmed that the polymerizable compound represented by formula (I-70-a) could be polymerized without using a polymerization initiator, and that the content of the unpolymerized product remaining after the polymerization was equal to or less than the detection limit.

Example 5

A polymerizable-compound-containing liquid crystal composition CLC-5 was prepared by adding 0.1% of the polymerizable compound represented by formula (I-70-a) to 99.9% of the liquid crystal composition LC-1 and uniformly dissolving the polymerizable compound. The polymerizable-compound-containing liquid crystal composition CLC-5 was injected, by a vacuum injection method, into a cell having an ITO electrode layer, the cell having a cell gap of 3.5 μm and including polyimide alignment layers that induce a homeotropic alignment. The pretilt angle of this cell was measured, and the liquid crystal cell was then irradiated with ultraviolet light using a high-pressure mercury lamp through a filter that cuts off ultraviolet light of 320 nm or less while applying a square wave of 1.8 V at a frequency of 1 kHz. The irradiation intensity on the surface of the cell was adjusted to 10 mW/cm$^2$, and the irradiation was performed for 600 seconds, thus obtaining a homeotropic-alignment liquid crystal display element in which the polymerizable compound in the polymerizable-compound-containing liquid crystal composition CLC-5 was polymerized. The pretilt angle after the ultraviolet irradiation of the element was 87.9 degrees whereas the pretilt angle before the ultraviolet irradiation was 89.6 degrees. Thus, the pretilt angle of the liquid crystal molecules was fixed in a state in which the liquid crystal molecules were tilted with respect to the vertical direction. The content of the unpolymerized polymerizable compound represented by formula (I-70-a) in the element was analyzed by liquid chromatography. The content of the unpolymerized polymerizable compound was equal to or less than the detection limit. Thus, it was confirmed that the polymerizable compound represented by formula (I-70-a) could be polymerized without using a polymerization initiator, and that the content of the unpolymerized product remaining after the polymerization was equal to or less than the detection limit.

Example 6

A liquid crystal composition LC-2 containing the components below was prepared as a sample containing at least one compound selected from the compounds represented by general formula (II) and at least one compound selected from the compounds represented by general formulae (IIIa), (IIIb), and (IIIc) or at least one compound selected from the compounds represented by general formulae (IVa), (IVb), and (IVc).

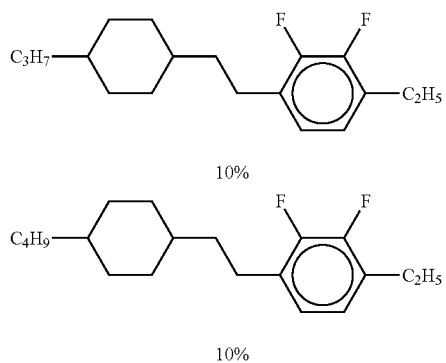

10%

10%

-continued

10%

10%

10%

10%

10%

10%

10%

Table 3 shows the physical properties of the liquid crystal composition LC-2.

TABLE 3

| | |
|---|---|
| $T_{N-I}$ (° C.) | 85 |
| Δε | −3.4 |
| Δn | 0.094 |

A polymerizable-compound-containing liquid crystal composition CLC-6 was prepared by adding 0.3% of the polymerizable compound represented by formula (I-8-a) to 99.7% of the liquid crystal composition LC-2 and uniformly dissolving the polymerizable compound. It was found that the polymerizable compound represented by formula (I-8-a) did not degrade the liquid crystal properties of the liquid crystal composition added thereto. This polymerizable-compound-containing liquid crystal composition CLC-6 was stored in a cold place (at −20° C.) for one week. Consequently, deposition or the like did not occur. Thus, it was found that the polymerizable compound represented by formula (I-8-a) had a good compatibility with other liquid crystal compounds.

The polymerizable-compound-containing liquid crystal composition CLC-6 was injected, by a vacuum injection method, into a cell having an ITO electrode layer, the cell having a cell gap of 3.5 μm and including polyimide alignment layers that induce a homeotropic alignment. The pretilt angle of this cell was measured, and the liquid crystal cell was then irradiated with ultraviolet light using a high-pressure mercury lamp through a filter that cuts off ultraviolet light of 320 nm or less while applying a square wave of 1.8 V at a frequency of 1 kHz. The irradiation intensity on the surface of the cell was adjusted to 10 mW/cm², and the irradiation was performed for 600 seconds, thus obtaining a homeotropic-alignment liquid crystal display element in which the polymerizable compound in the polymerizable-compound-containing liquid crystal composition CLC-6 was polymerized. The pretilt angle after the ultraviolet irradiation of the element was 87.6 degrees whereas the pretilt angle before the ultraviolet irradiation was 89.7 degrees. Thus, the pretilt angle of the liquid crystal molecules was fixed in a state in which the liquid crystal molecules were tilted with respect to the vertical direction. The content of the unpolymerized polymerizable compound represented by formula (I-8-a) in the element was analyzed by liquid chromatography. The content of the unpolymerized polymerizable compound was equal to or less than the detection limit. Thus, it was confirmed that the polymerizable compound represented by formula (I-8-a) could be polymerized without using a polymerization initiator, and that the content of the unpolymerized product remaining after the polymerization was equal to or less than the detection limit.

Example 7

A liquid crystal composition LC-3 containing the components below was prepared as a sample containing at least one compound selected from the compounds represented by general formula (II) and at least one compound selected from the compounds represented by general formulae (IIIa), (IIIb), and (IIIc) or at least one compound selected from the compounds represented by general formulae (IVa), (IVb), and (IVc).

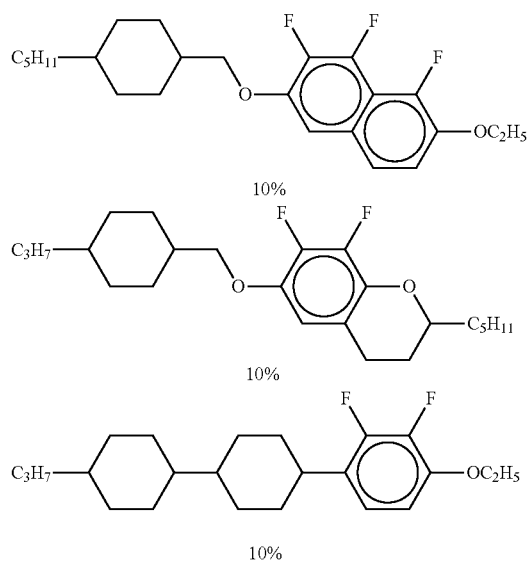

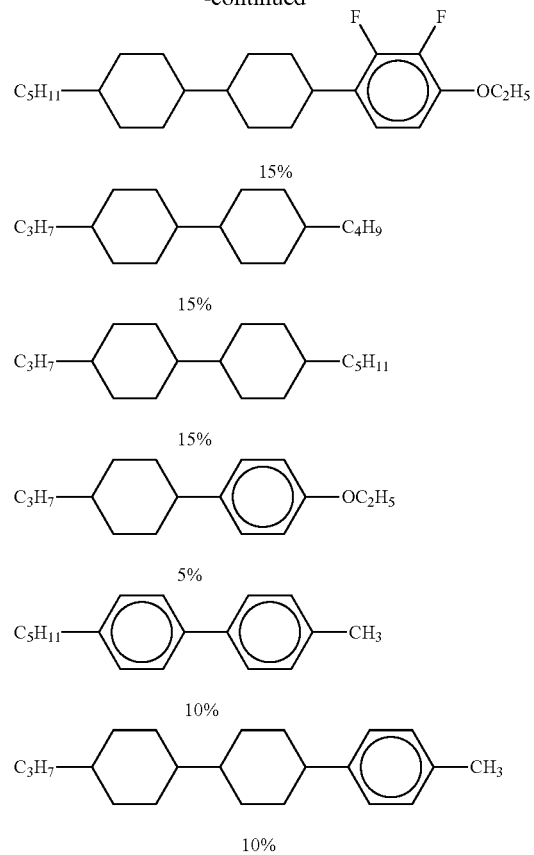

Table 4 shows the physical properties of the liquid crystal composition LC-3.

TABLE 4

| | |
|---|---|
| $T_{N-I}$ (° C.) | 72 |
| Δε | −3.3 |
| Δn | 0.086 |

A polymerizable-compound-containing liquid crystal composition CLC-7 was prepared by adding 0.3% of the polymerizable compound represented by formula (I-8-a) to 99.7% of the liquid crystal composition LC-3 and uniformly dissolving the polymerizable compound. It was found that the polymerizable compound represented by formula (I-8-a) did not degrade the liquid crystal properties of the liquid crystal composition added thereto. This polymerizable-compound-containing liquid crystal composition CLC-7 was stored in a cold place (at −20° C.) for one week. Consequently, deposition or the like did not occur. Thus, it was found that the polymerizable compound represented by formula (I-8-a) had a good compatibility with other liquid crystal compounds. The polymerizable-compound-containing liquid crystal composition CLC-7 was injected, by a vacuum injection method, into a cell having an ITO electrode layer, the cell having a cell gap of 3.5 μm and including polyimide alignment layers that induce a homeotropic alignment. The pretilt angle of this cell was measured, and the liquid crystal cell was then irradiated with ultraviolet light using a high-pressure mercury lamp through a filter that cuts off ultraviolet light of 320 nm or less while applying a square wave of 1.8 V at a frequency of 1 kHz. The irradiation intensity on the surface of the cell was adjusted to 10 mW/cm², and the irradiation was performed for 600 seconds, thus obtaining a homeotropic-alignment liquid crystal display element in which the polymerizable compound in the polymerizable-compound-containing liquid crystal composition CLC-7 was polymerized. The pretilt angle after the ultraviolet irradiation of the element was 87.1 degrees whereas the pretilt angle before the ultraviolet irradiation was 89.4 degrees. Thus, the pretilt angle of the liquid crystal molecules was fixed in a state in which the liquid crystal molecules were tilted with respect to the vertical direction. The content of the unpolymerized polymerizable compound represented by formula (I-8-a) in the element was analyzed by liquid chromatography. The content of the unpolymerized polymerizable compound was equal to or less than the detection limit. Thus, it was confirmed that the polymerizable compound represented by formula (I-8-a) could be polymerized without using a polymerization initiator, and that the content of the unpolymerized product remaining after the polymerization was equal to or less than the detection limit.

Example 8

A liquid crystal composition LC-4 containing the components below was prepared as a sample containing at least one compound selected from the compounds represented by general formula (II) and at least one compound selected from the compounds represented by general formulae (IIIa), (IIIb), and (IIIc) or at least one compound selected from the compounds represented by general formulae (IVa), (IVb), and (IVc).

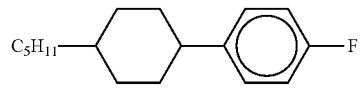

3%

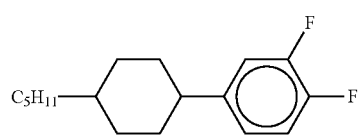

7%

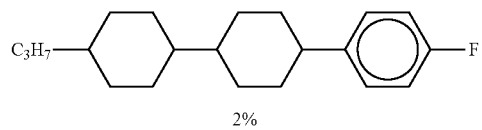

2%

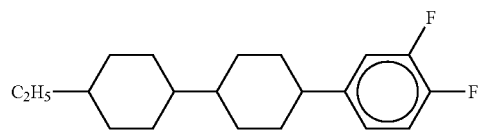

7.5%

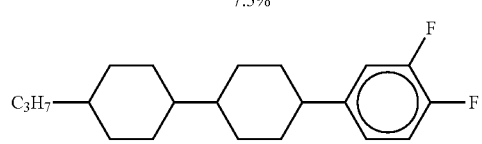

7.5%

-continued

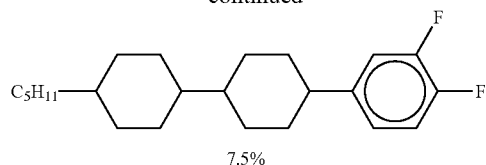

7.5%

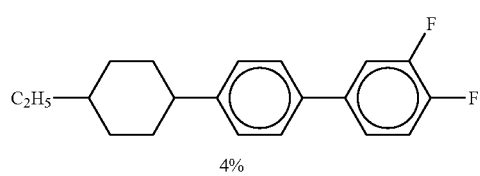

4%

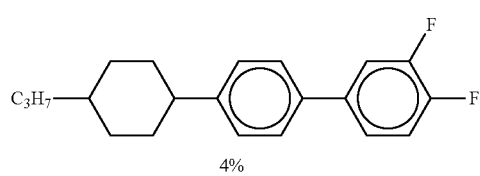

4%

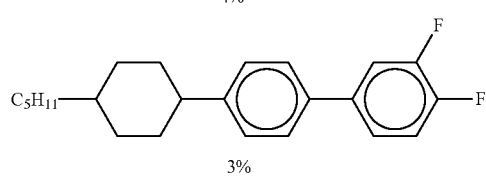

3%

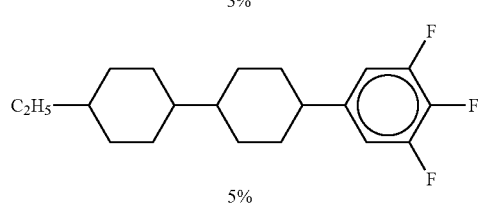

5%

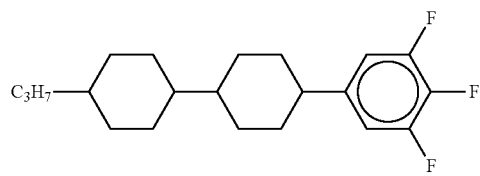

5%

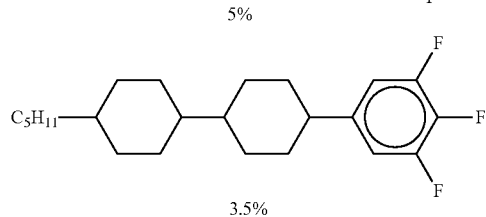

3.5%

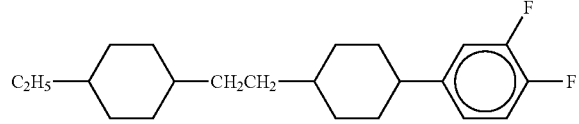

5%

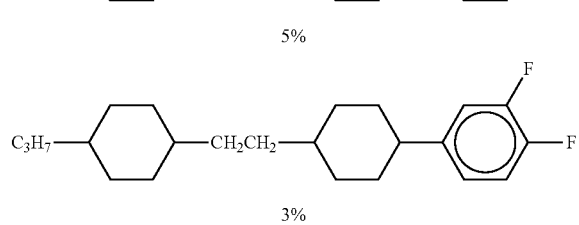

3%

-continued

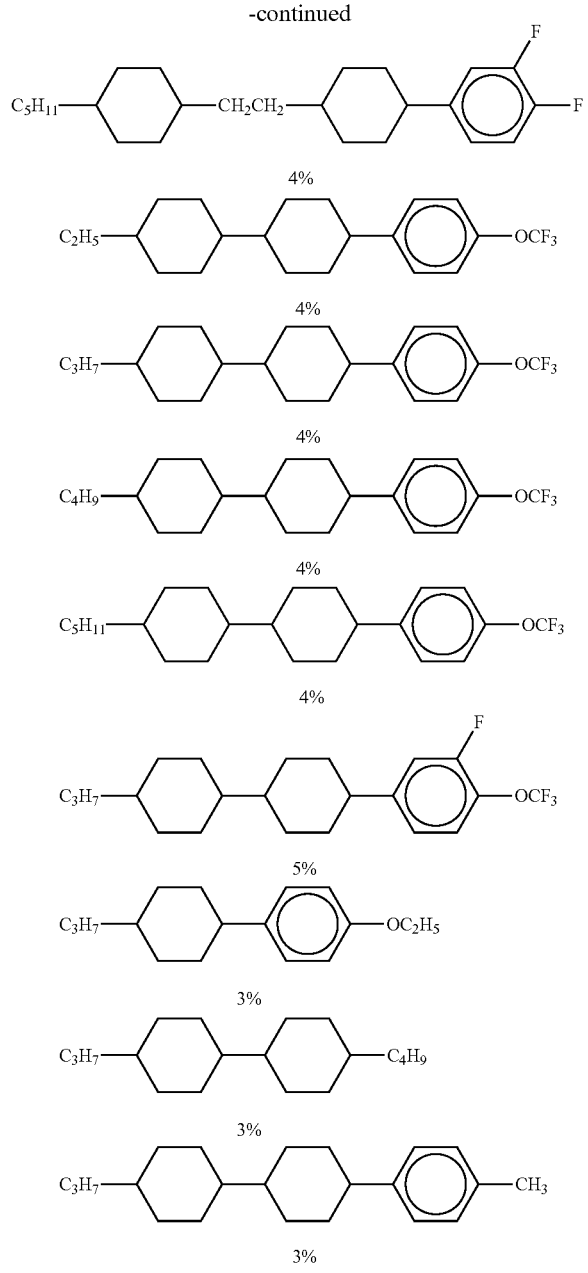

Table 5 shows the physical properties of the liquid crystal composition LC-4.

TABLE 5

| $T_{N-I}$ (° C.) | 85 |
|---|---|
| Δε | 5.5 |
| Δn | 0.090 |

A polymerizable-compound-containing liquid crystal composition CLC-8 was prepared by adding 0.3% of the polymerizable compound represented by formula (I-8-a) to 99.7% of the liquid crystal composition LC-4 and uniformly dissolving the polymerizable compound. It was found that the polymerizable compound represented by formula (I-8-a) did not degrade the liquid crystal properties of the liquid crystal composition added thereto. This polymerizable-compound-containing liquid crystal composition CLC-8 was stored in a cold place (at −20° C.) for one week. Consequently, deposition or the like did not occur. Thus, it was found that the polymerizable compound represented by formula (I-8-a) had a good compatibility with other liquid crystal compounds. The polymerizable-compound-containing liquid crystal composition CLC-8 was injected, by a vacuum injection method, into a cell having an ITO electrode layer, the cell having a cell gap of 3.5 μm and including polyimide alignment layers that induce a homogeneous alignment. The pretilt angle of this cell was measured, and the liquid crystal cell was then irradiated with ultraviolet light using a high-pressure mercury lamp through a filter that cuts off ultraviolet light of 320 nm or less while applying a square wave of 1.8 V at a frequency of 1 kHz. The irradiation intensity on the surface of the cell was adjusted to 10 mW/cm², and the irradiation was performed for 600 seconds, thus obtaining a homogeneous-alignment liquid crystal display element in which the polymerizable compound in the polymerizable-compound-containing liquid crystal composition CLC-8 was polymerized. The pretilt angle after the ultraviolet irradiation of the element was 3.3 degrees whereas the pretilt angle before the ultraviolet irradiation was 0.1 degrees. Thus, a pretilt angle was provided, and the pretilt angle of the liquid crystal molecules was fixed in a state in which the liquid crystal molecules were tilted with respect to the horizontal direction. The content of the unpolymerized polymerizable compound represented by formula (I-8-a) in the element was analyzed by liquid chromatography. The content of the unpolymerized polymerizable compound was equal to or less than the detection limit. Thus, it was confirmed that the polymerizable compound represented by formula (I-8-a) could be polymerized without using a polymerization initiator, and that the content of the unpolymerized product remaining after the polymerization was equal to or less than the detection limit.

Evaluation

A voltage was applied to the liquid crystal display elements after polymerization, the liquid crystal display elements being prepared in Examples 1 to 8 and Comparative Example 1, and the state of image sticking was visually observed with elapsed time. Table 6 shows the results. In Table 6, symbol A represents that no change was observed. Symbol B represents that image sticking was observed, and a larger number of symbol B's represents that the image sticking was more severe.

TABLE 6

|  | After 10 hours | After 50 hours | After 100 hours | After 500 hours |
|---|---|---|---|---|
| Example 1 | A | A | A | A |
| Example 2 |  |  |  |  |
| Example 3 |  |  |  |  |
| Example 4 |  |  |  |  |
| Example 5 |  |  |  |  |
| Example 6 |  |  |  |  |
| Example 7 |  |  |  |  |
| Example 8 |  |  |  |  |
| Comparative Example 1 | A | B | BB | BBB |

In the liquid crystal display element prepared in Comparative Example 1, image sticking occurred after 48 hours from the start of display, and display damage was observed over the substantially entire surface after 168 hours. In contrast, in the liquid crystal display elements prepared in Examples 1 to 8, a satisfactory display state was maintained even after 500 hours had passed. According to these results, it was possible to confirm the high reliability of liquid crystal display elements in which all polymerizable materials were polymerized and consumed, as in the compounds of the present invention. Furthermore, it was found that a decrease in the alignment-controlling force did not occur, and thus the polymers had a sufficiently high rigidity.

What is claimed is:

1. A polymerizable-compound-containing liquid crystal composition comprising:
as a first component, at least one polymerizable compound represented by general formula (I):

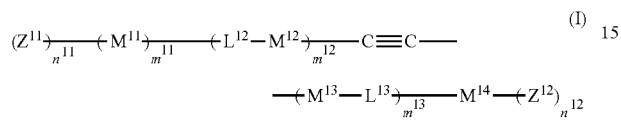

wherein $Z^{11}$ and $Z^{12}$ each independently represent a hydrogen atom, a fluorine atom, a chlorine atom, a cyano group, a thiocyanate group, a trifluoromethoxy group, or an alkyl group having 1 to 12 carbon atoms where a methylene group in the alkyl group may be substituted with an oxygen atom, a sulfur atom, —CO—, —COO—, —OCO—, —OCOO—, —CH=CH—, or —C≡C— as long as oxygen atoms are not directly bonded to each other, $Z^{11}$ represents -$L^{15}$-$S^{15}$—$R^{15}$, or $Z^{12}$ represents -$L^{16}$-$S^{16}$—$R^{16}$, however, at least one of $Z^{11}$ and $Z^{12}$ represents -$L^{15}$-$S^{15}$—$R^{15}$ or -$L^{16}$-$S^{16}$—$R^{16}$ where $R^{15}$ and $R^{16}$ each independently represent any one of formulae (R-1) to (R-15):

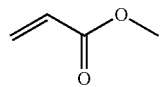 (R-1)

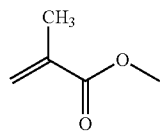 (R-2)

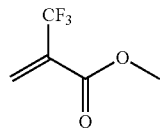 (R-3)

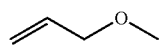 (R-4)

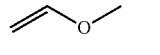 (R-5)

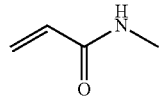 (R-6)

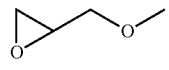 (R-7)

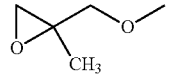 (R-8)

 (R-9)

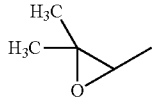 (R-10)

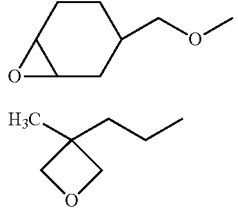 (R-11)

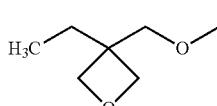 (R-12)

(R-13)

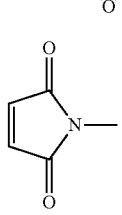 (R-14)

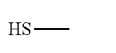 (R-15)

$S^{15}$ and $S^{16}$ each independently represent an alkylene group having 1 to 12 carbon atoms or a single bond, where a methylene group in the alkylene group may be substituted with an oxygen atom, a sulfur atom, —CO—, —COO—, —OCO—, —OCOO—, —CH=CH—, or —C≡C— as long as oxygen atoms are not directly bonded to each other, $L^{12}$, $L^{13}$, $L^{15}$, and $L^{16}$ each independently represent a single bond, —O—, —S—, —CH$_2$—, —OCH$_2$—, —CH$_2$O—, —CO—, —C$_2$H$_4$—, —COO—, —OCO—, —OCOOCH$_2$—, —CH$_2$OCOO—, —CO—NR$^{111}$—, —NR$^{111}$—CO—, —SCH$_2$—, —CH$_2$S—, —CH=CR$^{111}$—COO—, —CH=CR$^{111}$—OCO—, —COO—CR$^{111}$=CH—, —OCO—CR$^{111}$=CH—, —COO—CR$^{111}$=CH—COO—, —COO—CR$^{111}$=CH—OCO—, —OCO—CR$^{111}$=CH—COO—, —OCO—CR$^{111}$=CH—OCO—, —COOC$_2$H$_4$—, —OCOC$_2$H$_4$—, —C$_2$H$_4$OCO—, —C$_2$H$_4$COO—, —CH$_2$COO—, —CH$_2$OCO—, —COOCH$_2$—, —OCOCH$_2$—, —CH=CH—, —CF=CF—, —CF=CH—, —CH=CF—, —CF$_2$—, —CF$_2$O—, —OCF$_2$—, —CF$_2$CH$_2$—, —CH$_2$CF$_2$—, —CF$_2$CF$_2$—, or —C≡C— where R$^{111}$s each independently represent a hydrogen atom or an alkyl group having 1 to 4 carbon atoms, $M^{12}$ and $M^{13}$ each independently represent a 1,4-phenytene group, a 1,4-cyclohexylene group, a pyridine-2,5-diyl group, a pyrimidine-2,5-dlyl group, a naphthalene-2,6-diyl group, a 1,2,3,4-tetrahydronaphthalene-2,6-diyl group, or a 1,3-dioxane-2,5-diyl group, $M^{11}$ and $M^{14}$ each independently represent a 1,4-phenylene group, a benzene-1,3,5-triyl group, a benzene-1,3,4-triyi group, a benzene-1,3,4,5-tetrayl group, a 1,4-cyclohexylene group, a cyclohexane-1,3,5-triyl group, a cyclohexane-1,3,4-triyl group, a cyclohexane-1,3,4,5-tetrayl group, a pyridine-2,5-diyi group, a pyrimidine-2,5-diyl group, a naphthalene-2,6-diyl group, a naphthalene-2,5,6-triyl group, a naphthalene-2,5,6,7-tetrayl group, a 1,2,3,4-tetrahydronaphthalene-2,6-diyl group, a ,1,2,3,4-tetrahydronaphthalene-2,5,6-triyl group, a 1,2,3,4-tetrahydronaphthalene-2,5,6,7-tetrayl group, or a 1,3-dioxane-2,5-diyl group, $M^{11}$, $M^{12}$, $M^{13}$, and $M^{14}$ may each be independently unsubstituted or substituted with an alkyl group having 1 to 12 carbon atoms, a halogenated alkyl group having 1 to 12 carbon atoms, an alkoxy group having 1 to 12 carbon atoms, a halogenated alkoxy group having 1 to 12 carbon atoms, a halogen, a cyano group, or a nitro group, $m^{11}$ and $m^{12}$ each independently represent 0 or 1, $m^{13}$ represents 0, 1, 2, or 3, $n^{11}$ and $n^{12}$ each independently represent 1, 2, or 3, when a plurality of $Z^{11}$s, $Z^{12}$s, $M^{13}$s and/or $L^{13}$s are present, they may be the same or different, $m^{11+m12} + m^{l3}$ represents 1, 7, or 3, and $m^{\geq m12}$;

as a second component, at least one compound represented by general formula (II):

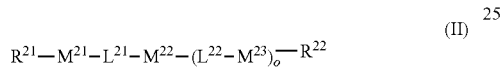

(II)

wherein $R^{21}$ and $R^{22}$ each independently represent an alkyl group having 1 to 10 carbon atoms or an alkenyl group having 2 to 10 carbon atoms, one methylene group or two or more non-adjacent methylene groups in the alkyl group or the alkenyl group may each be substituted with —O— or —S—, and one or more hydrogen atoms in the alkyl group or the alkenyl group may each be substituted with a fluorine atom or a chlorine atom, $M^{21}$, $M^{22}$, and $M^{23}$ each independently represent a group selected from the groups consisting of (a) a trans-1,4-cyclohexylene group (where one methylene group or two or more non-adjacent methylene groups in the trans-1,4-cycloftexylene group may each be substituted with —O— or —S—), (b) a 1,4-phenylene group (where one —CH═or two or more non-adjacent —CH═in the 1,4-phenylene group may each be substituted with a nitrogen atom), a 3-fluoro-1,4-phenyiene group, and a 3,5-difluoro-1,4-phenylene group, and (c) a 1,4-cyclohexenylene group, a 1,4-bicyclo[2.2.2]octyiene group, a piperidine-2,5-diyl group, a naphthalene-2,6-diyl group, a decahydronaphthalene-2,6-diyl group, and a 1,2,3,4-tetrahydronaphthalene-2,6-diyl group, o represents 0, 1, or 2, $L^{21}$ and $L^{22}$ each independently represent a single bond, —CH$_2$CH$_2$—, —(CH$_2$)$_4$—, —OCH$_2$—, —CH$_2$O—, —OCF$_2$—, —CF$_2$O—, —CH═CH—, —CH═N— N═CH—, or —C≡C—, when a plurality of $L^{22}$s and/or $M^{23}$s are present, they may be the same or different; and as a third component, at least one compound selected from the group consisting of compounds represented by general formulae (IIIa), (IIIb), and (IIIc):

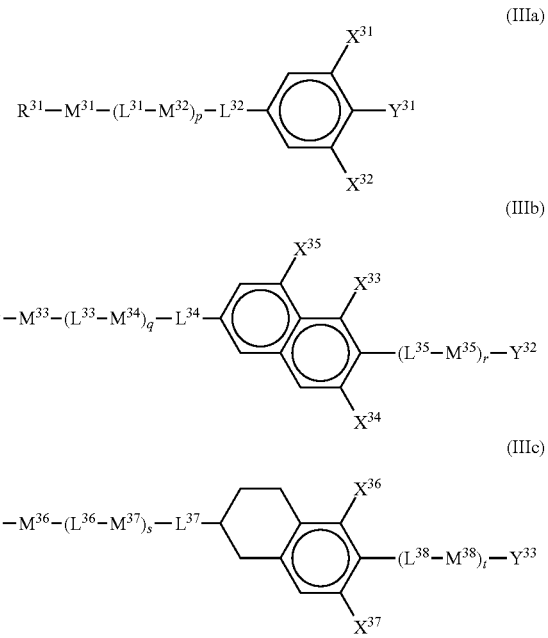

wherein ,$R^{31}$ $R^{32}$, and $R^{33}$ each independently represent an alkyl group having 1 to 10 carbon atoms or an alkenyl group having 2 to 10 carbon atoms, one methylene group or two or more non-adjacent methylene groups in the alkyl group or the alkenyl group may each be substituted with —O— or —S—, and one or more hydrogen atoms in the alkyl group or the alkenyl group may each be substituted with a fluorine atom or a chlorine atom, $M^{31}$, $M^{32}$, $M^{33}$, $M^{34}$, $M^{35}$, $M^{36}$, $M^{37}$, and $M^{38}$ each independently represent a group selected from the groups consisting of (d) a trans 1,4-cyclohexylene group (where one methylene group or two or more non-adjacent methylene groups in the trans-1,4-cyclohexylene group may each be substituted with —O— or —S—), (e) a 1,4-phenylene group (where one —CH═ or two or more non-adjacent —CH═ in the 1,4-phenylene group may each be substituted with a nitrogen atom), a 3-fluoro-,1,4-phenylene group, and a 3,5-difluoro-1,4-phenylene group, and (f) a 1,4-cyclohexerytene group, a 1 4-bicyclo[2.2.2]octylene group, a piperidine-2,5-diyl group, a naphthatene-2,6-diyl group, a 1,2,3,4-tetrahydro apinhalene-2,6-diyl group, and a decahydronaphthatene-2,6-diyl group, a hydrogen atom contained in any of the groups (d), (e), and (f) may be substituted with a cyano group, a fluorine atom, a trifluoromethyl group, a trifluoromethoxy group, or a chlorine atom, $L^{31}$, $L^{32}$, $L^{33}$, $L^{34}$, $L^{35}$, $L^{36}$, $L^{37}$, and $L^{38}$ each independently represent a single bond, —COO—, —OCO—, —CH$_2$CH$_2$—, —(CH$_2$)$_4$—, —OCH$_2$—, —CH$_2$O—, —OCF$_2$—, —CF$_2$O—, or —C≡C—, when a plurality of $M^{32}$s, $M^{34}$s, $M^{35}$s, $M^{37}$s, $M^{38}$s, $L^{31}$s, $L^{33}$s, $L^{35}$s, $L^{36}$s, and/or $L^{38}$s are present, they may be the same or different, $X^{31}$, $X^{32}$, $X^{33}$, $X^{34}$, $X^{35}$, $X^{36}$, and $X^{37}$ each independently represent a hydrogen atom or a fluorine atom, $Y^{31}$, $Y^{32}$, and $Y^{33}$ each independently represent a hydrogen atom, a fluorine atom, a chlorine atom, a cyano group, a thiocyanate group, a trifluoromethoxy group, a trifluoromethyl group, a 2,2,2-trifluoroethyl group, or a difluoromethoxy group, at least one of $X^{31}$, $X^{32}$, and $Y^{31}$ represents a fluorine atom, a chlorine atom, a cyano group, a thiocyanate group, a trifluoromethoxy group, a trifluoromethyl group, a 2,2,2-trifluoroethyl group, or a difluoromethoxy group, or at least one hydrogen atom contained in $M^{31}$ or $M^{32}$ represents a cyano group, a fluorine atom, a trifluoromethyl group, a trifluoromethoxy group, or a chlorine atom, at least one of $X^{33}$, $X^{34}$, $X^{35}$, and $Y^{32}$ represents a fluorine atom, a chlorine atom, a cyano group, a thiocyanate group, a trifluoromethoxy group, a trifluoromethyl group, a 2,2,2-trifluoroethyl group, or a difluoromethoxy group, or at least one hydrogen atom contained in $M^{33}$, $M^{34}$, or $M^{35}$ represents a cyano group, a fluorine atom, a trifluoromethyl group, a trifluoromethoxy group, or a chlorine atom, at least one of $X^{36}$, $X^{37}$, and $Y^{33}$ represents a fluorine atom, a chlorine atom, a cyano group, a thiocyanate group, a trifluoromethoxy group, a trifluoromethyl group, a 2,2,2-trifluoroethyl group, or a difluoromethoxy group, or at least one hydrogen atom contained in $M^{36}$, $M^{37}$, or $M^{38}$ represents a cyano group, a fluorine atom, a trifluoromethyl group, a trifluoromethoxy group, or a chlorine atom, and p, q, r, s, and t each independently represent 0, 1, or 2, but q+r and s+t are each 2 or less), or at least one compound selected from the group consisting of compounds represented by general formulae (IVa),(IVb), and (IVc):

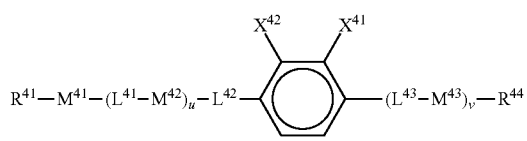

(IVa)

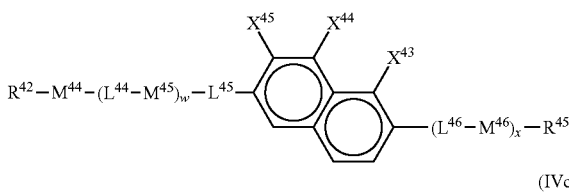

(IVb)

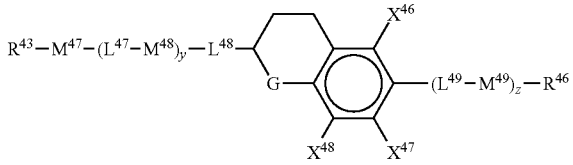

(IVc)

wherein $R^{41}$, $R^{42}$, $R^{43}$, $R^{44}$, $R^{45}$, and $R^{46}$ each independently represent an alkyl group having 1 to 10 carbon atoms or an alkenyl group having 2 to 10 carbon atoms, one methylene group or two or more non-adjacent methylene groups in the alkyl group or the alkenyl group may each be substituted with —O— or —S—, and one or more hydrogen atoms in the alkyl group or the alkenyl group may each be substituted with a fluorine atom or a chlorine atom, $M^{41}$, $M^{42}$, $M^{43}$, $M^{44}$, $M^{45}$, $M^{46}$, $M^{47}$, $M^{48}$, and $M^{49}$ each independently represent a group selected from the groups consisting of (g) a trans-1,4-cyclohexylene group (where one methylene group or two or more non-adjacent methylene groups in the trans-1,4-cyclohexylene group may each be substituted with —O— or —S—), (h) a 1,4-phenylene group (where one —CH═ or two or more non-adjacent —CH═ in the 1,4-phenylene group may each be substituted with a nitrogen atom), and (i) a 1,4-cyclohexenylene group, a 1,4-bicyclo[2.2.2]octylene group, a piperidine-2,5-diyl group, a naphthalene-2,6-diyl group, a 1,2,3,4-tetrahydronaphthalene-2,6-diyl group, and a decahydronaphthalene-2,6-diyl group, a hydrogen atom contained in any of the groups (g), (h), and (i) may he substituted with a cyano group, a fluorine atom, a trifluoromethyl group, a trifluoromethoxy group, or a chlorine atom, $L^{41}$, $L^{42}$, $L^{43}$, $L^{44}$, $L^{45}$, $L^{46}$, $L^{47}$, $L^{48}$, and $L^{49}$ each independently represent a single bond, —COO—, —OCO—, —CH$_2$CH$_2$—, —(CH$_2$)$_4$—, —OCH$_2$—, —CH$_2$O—, —OCF$_2$—, —CF$_2$O—, or —C≡C—, when a plurality of $M^{42}$s, $M^{43}$s, $M^{45}$s, $M^{46}$s, $M^{48}$s, $M^{49}$s, $L^{41}$s, $L^{43}$s, $L^{44}$s, $L^{46}$s, $L^{47}$s and/or $L^{49}$s are present, they may be the same or different, $X^{41}$, $X^{42}$, $X^{43}$, $X^{44}$, $X^{45}$, $X^{46}$, $X^{47}$ and $X^{48}$ each independently represent a hydrogen atom, a trifluoromethyl group, a trifluoromethoxy group, or a fluorine atom, however, at least one of $X^{41}$ and $X^{42}$ represents a fluorine atom, at least one of $X^{43}$, $X^{44}$, and $X^{45}$ represents a fluorine atom, at least one of $X^{46}$, $X^{47}$, and $X^{48}$ represents a fluorine atom, $X^{46}$ and $X^{47}$ do not represent fluorine atoms at the same time, and $X^{46}$ and $X^{48}$ do not represent fluorine atoms at the same time, G represents a methylene group or —O—, and u, v, w, x, y, and z each independently represent 0, 1, or 2, but u+v, w+x, and y+z are each 2 or less.

2. The polymerizable-compound-containing liquid crystal composition according to claim 1, wherein, in general formula (I), $Z^{11}$ represents -$L^{15}$-$S^{15}$—$R^{15}$ and $Z^{12}$ represents -$L^{16}$-$S^{16}$—$R^{16}$.

3. The polymerizable-compound-containing liquid crystal composition according to claim 1, wherein, in general formula (I), $R^{15}$ and $R^{16}$ each independently represent formula (R-1) or (R-2).

4. The polymerizable-compound-containing liquid crystal composition according to claim 1, wherein, in general formula (I), $m^{11}$=$m^{12}$=0.

5. The polymerizable-compound-containing liquid crystal composition according to claim 1, wherein the liquid crystal composition is used in a liquid crystal display element including a pair of substrates, a liquid crystal interposed between the substrates, a transparent electrode, and a polarizer, in which a liquid crystal alignment capability is provided by polymerizing a polymerizable compound contained in the liquid crystal composition.

6. The polymerizable-cornpound-containing liquid crystal composition according to claim 1, wherein the liquid crystal composition contains 0.01% to 2% by mass of the at least one compound selected from the polymerizable compounds represented by general formula (I), 5% to 70% by mass of the at least one compound selected from the compounds represented by general formula (II), and 5% to 70% by mass of the at least one compound selected from the group consisting of the compounds represented by general formulae (Ina), (IIIb), and (IIIc) or the compounds represented by general formulae (IVa), (IVb), and (IVc).

7. The polymerizable-compound-containing liquid crystal composition according to claim 1, wherein the liquid crystal composition contains, as the third component, at least one compound selected from the group consisting of the compounds represented by general formulae (IVa), (IVb), and (IVc).

8. A liquid crystal display element comprising:
   the polymerizable-compound-containing liquid crystal composition according to claim 1,
   wherein a liquid crystal alignment capability is provided by polymerizing the at least one polymerizable compound contained in the polymerizable-compound-containing liquid crystal composition.

9. The liquid crystal display element according to claim 8, wherein a dielectric anisotropy of the polymerizable-compound-containing liquid crystal composition is negative.

\* \* \* \* \*